United States Patent
Nam et al.

(10) Patent No.: US 12,041,000 B2
(45) Date of Patent: Jul. 16, 2024

(54) TECHNIQUES FOR COMMUNICATING DATA CHANNEL TRANSMISSIONS

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Jelena Damnjanovic, Del Mar, CA (US); Olufunmilola Omolade Awoniyi-Oteri, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 17/395,442

(22) Filed: Aug. 5, 2021

(65) Prior Publication Data

US 2023/0041212 A1    Feb. 9, 2023

(51) Int. Cl.
*H04L 5/00* (2006.01)

(52) U.S. Cl.
CPC .......... *H04L 5/0048* (2013.01); *H04L 5/0078* (2013.01)

(58) Field of Classification Search
None
See application file for complete search history.

(56) References Cited

U.S. PATENT DOCUMENTS

| | | |
|---|---|---|
| 11,252,669 B2 | 2/2022 | Annam et al. |
| 11,412,568 B2 | 8/2022 | Babaei et al. |

(Continued)

FOREIGN PATENT DOCUMENTS

| | | |
|---|---|---|
| CA | 3135030 A1 | 10/2020 |
| WO | WO-2020220322 A1 | 11/2020 |

(Continued)

OTHER PUBLICATIONS

Catt: "UE Power Saving Schemes with Power Saving Signal/Channel/Procedures", 3GPP TSG RAN WG1 Ad-Hoc Meeting 1901, R1-1900345, 3rd Generation Partnership Project, Mobile Competence Centre, 650, Route Des Lucioles, F-06921 Sophia-Antipolis Cedex, France, vol. RAN WG1, No. Taipei, Jan. 21, 2019-Jan. 25, 2019 Jan. 12, 2019, XP051575954, 17 Pages, paragraph [2.2.1] figure 3.

(Continued)

*Primary Examiner* — Phirin Sam
(74) *Attorney, Agent, or Firm* — Holland & Hart LLP

(57) ABSTRACT

Methods, systems, and devices for wireless communications are described. A base station may transmit, to a user equipment (UE), a control message in a first control channel occasion associated with a first quasi-colocation (QCL) property, the control message indicating a transmission of a data message within a threshold time period. The UE may receive, from the base station, an indication to skip monitoring of a second control channel occasion within the threshold time period and may receive the data message in accordance with a second QCL property, or drop reception of the data message, based on the indication. Additionally, or alternatively, the base station may transmit a message indicating a unified transmission configuration indicator (TCI) state associated with the second QCL property, and the UE may receive the data message in accordance with the second QCL property based on the unified TCI state.

29 Claims, 26 Drawing Sheets

(56) References Cited

U.S. PATENT DOCUMENTS

| | | |
|---|---|---|
| 2006/0209682 A1 | 9/2006 | Filsfils et al. |
| 2007/0230400 A1 | 10/2007 | Kuchibhotla et al. |
| 2009/0103437 A1 | 4/2009 | Kim et al. |
| 2009/0323634 A1 | 12/2009 | Kim et al. |
| 2010/0034145 A1 | 2/2010 | Kim et al. |
| 2010/0112956 A1 | 5/2010 | Jeong et al. |
| 2010/0118752 A1 | 5/2010 | Suzuki et al. |
| 2010/0272035 A1 | 10/2010 | Park et al. |
| 2010/0297993 A1 | 11/2010 | Heo et al. |
| 2011/0003555 A1 | 1/2011 | Guo |
| 2011/0105173 A1 | 5/2011 | Haim et al. |
| 2011/0199951 A1 | 8/2011 | Kwon et al. |
| 2011/0292854 A1 | 12/2011 | Terry et al. |
| 2011/0317627 A1 | 12/2011 | Kato et al. |
| 2012/0002635 A1 | 1/2012 | Chung et al. |
| 2012/0057490 A1 | 3/2012 | Park et al. |
| 2012/0230319 A1 | 9/2012 | Zaitsu |
| 2012/0315862 A1 | 12/2012 | Okano |
| 2013/0010720 A1 | 1/2013 | Lohr et al. |
| 2013/0028223 A1 | 1/2013 | Kim et al. |
| 2013/0039202 A1 | 2/2013 | Feuersanger et al. |
| 2013/0044674 A1 | 2/2013 | Teyeb et al. |
| 2013/0053082 A1 | 2/2013 | Chai et al. |
| 2013/0114488 A1 | 5/2013 | Fang et al. |
| 2014/0241171 A1 | 8/2014 | Moon |
| 2014/0254538 A1 | 9/2014 | Park et al. |
| 2015/0043485 A1 | 2/2015 | Masuda et al. |
| 2015/0092645 A1 | 4/2015 | Tabet et al. |
| 2015/0117284 A1 | 4/2015 | Baldemair et al. |
| 2015/0119039 A1 | 4/2015 | Virtej et al. |
| 2015/0230112 A1 | 8/2015 | Siomina et al. |
| 2015/0282080 A1 | 10/2015 | Maattanen et al. |
| 2015/0296458 A1 | 10/2015 | Abraham et al. |
| 2015/0327324 A1 | 11/2015 | Wei et al. |
| 2016/0081044 A1 | 3/2016 | Wang et al. |
| 2016/0088532 A1 | 3/2016 | Chen et al. |
| 2016/0095137 A1 | 3/2016 | Chen et al. |
| 2016/0242162 A1 | 8/2016 | Yao et al. |
| 2016/0286601 A1 | 9/2016 | Siomina et al. |
| 2016/0295636 A1 | 10/2016 | Yang et al. |
| 2016/0302224 A1 | 10/2016 | Khairmode et al. |
| 2016/0334994 A1 | 11/2016 | Yokota et al. |
| 2016/0345193 A1 | 11/2016 | Takahashi et al. |
| 2017/0006476 A1 | 1/2017 | Cao et al. |
| 2017/0208619 A1 | 7/2017 | Yang et al. |
| 2017/0303215 A1 | 10/2017 | Kim et al. |
| 2017/0359160 A1 | 12/2017 | Ji et al. |
| 2018/0007686 A1 | 1/2018 | Lyu |
| 2018/0098362 A1 | 4/2018 | Yamauchi |
| 2018/0152961 A1 | 5/2018 | Yamazaki et al. |
| 2018/0152978 A1 | 5/2018 | Jia |
| 2018/0160361 A1 | 6/2018 | Yi et al. |
| 2018/0191478 A1 | 7/2018 | Uhling et al. |
| 2018/0213452 A1 | 7/2018 | Kim et al. |
| 2018/0227329 A1 | 8/2018 | Lv et al. |
| 2018/0279229 A1 | 9/2018 | Dinan et al. |
| 2018/0352511 A1 | 12/2018 | Martin et al. |
| 2019/0028967 A1 | 1/2019 | Ahn et al. |
| 2019/0029026 A1 | 1/2019 | Yun et al. |
| 2019/0174466 A1 | 6/2019 | Zhang et al. |
| 2019/0199477 A1 | 6/2019 | Park et al. |
| 2019/0215117 A1 | 7/2019 | Lee et al. |
| 2019/0215890 A1 | 7/2019 | Choi et al. |
| 2019/0239212 A1 | 8/2019 | Wang et al. |
| 2019/0349120 A1 | 11/2019 | Cheng et al. |
| 2020/0015166 A1 | 1/2020 | Ahn et al. |
| 2020/0015313 A1 | 1/2020 | Reial et al. |
| 2020/0022032 A1 | 1/2020 | Tenny et al. |
| 2020/0022175 A1 | 1/2020 | Xiong et al. |
| 2020/0112919 A1 | 4/2020 | Nam et al. |
| 2020/0112981 A1 | 4/2020 | Sahlin et al. |
| 2020/0145888 A1 | 5/2020 | Paladugu et al. |
| 2020/0228285 A1 | 7/2020 | Wang et al. |
| 2020/0245184 A1 | 7/2020 | Jin et al. |
| 2020/0245333 A1 | 7/2020 | Lin et al. |
| 2020/0305174 A1 | 9/2020 | Ganesan et al. |
| 2020/0314795 A1 | 10/2020 | Wakabayashi et al. |
| 2020/0351026 A1 | 11/2020 | Babaei et al. |
| 2020/0351682 A1* | 11/2020 | Cirik ..................... H04L 5/0091 |
| 2020/0367311 A1 | 11/2020 | Choi et al. |
| 2021/0014010 A1 | 1/2021 | Babaei et al. |
| 2021/0022111 A1 | 1/2021 | Kumar et al. |
| 2021/0037484 A1 | 2/2021 | Zhou et al. |
| 2021/0058955 A1 | 2/2021 | Nam et al. |
| 2021/0084516 A1 | 3/2021 | Rungta et al. |
| 2021/0119742 A1* | 4/2021 | Wu ....................... H04W 76/28 |
| 2021/0120577 A1* | 4/2021 | Jiang ................... H04B 17/309 |
| 2021/0144644 A1 | 5/2021 | Hsieh et al. |
| 2021/0144742 A1 | 5/2021 | Jeon et al. |
| 2021/0168715 A1 | 6/2021 | Huang et al. |
| 2021/0176013 A1 | 6/2021 | Ali et al. |
| 2021/0185609 A1 | 6/2021 | Zhou et al. |
| 2021/0195521 A1 | 6/2021 | Muller et al. |
| 2021/0212103 A1 | 7/2021 | Lin et al. |
| 2021/0227592 A1 | 7/2021 | Frederiksen et al. |
| 2021/0250156 A1 | 8/2021 | Kim et al. |
| 2021/0250899 A1 | 8/2021 | Liu et al. |
| 2021/0258104 A1 | 8/2021 | Ye et al. |
| 2021/0266126 A1 | 8/2021 | Sun et al. |
| 2021/0298065 A1 | 9/2021 | Awoniyi-Oteri et al. |
| 2021/0298114 A1 | 9/2021 | Nam et al. |
| 2021/0298115 A1 | 9/2021 | Shi et al. |
| 2021/0306044 A1 | 9/2021 | Nam et al. |
| 2021/0321383 A1 | 10/2021 | Nam et al. |
| 2021/0321442 A1* | 10/2021 | Jung ..................... H04B 7/0617 |
| 2021/0336819 A1 | 10/2021 | Kim et al. |
| 2021/0344451 A1 | 11/2021 | Hedayat et al. |
| 2021/0345293 A1 | 11/2021 | Park et al. |
| 2021/0360667 A1* | 11/2021 | Moon ................... H04L 5/0051 |
| 2021/0360732 A1 | 11/2021 | Kim et al. |
| 2021/0368479 A1 | 11/2021 | Yu et al. |
| 2021/0392537 A1 | 12/2021 | Da Silva et al. |
| 2021/0400507 A1 | 12/2021 | You et al. |
| 2021/0410067 A1 | 12/2021 | Miao et al. |
| 2021/0410098 A1 | 12/2021 | Bao et al. |
| 2022/0030617 A1* | 1/2022 | Nilsson ................ H04L 5/0007 |
| 2022/0053593 A1 | 2/2022 | Wang et al. |
| 2022/0104122 A1 | 3/2022 | Maleki et al. |
| 2022/0104124 A1 | 3/2022 | Shah et al. |
| 2022/0104135 A1 | 3/2022 | Ryu et al. |
| 2022/0104194 A1* | 3/2022 | Yuan ..................... H04W 72/23 |
| 2022/0104235 A1 | 3/2022 | Wang et al. |
| 2022/0110059 A1 | 4/2022 | Xue et al. |
| 2022/0116183 A1* | 4/2022 | Gao ...................... H04L 1/1812 |
| 2022/0116923 A1 | 4/2022 | Kim et al. |
| 2022/0124622 A1 | 4/2022 | Islam et al. |
| 2022/0124863 A1 | 4/2022 | Nam et al. |
| 2022/0132420 A1 | 4/2022 | Narasimha et al. |
| 2022/0132426 A1 | 4/2022 | Zhou et al. |
| 2022/0132547 A1 | 4/2022 | Ma et al. |
| 2022/0141842 A1 | 5/2022 | Kanamarlapudi et al. |
| 2022/0150831 A1 | 5/2022 | Di Marco et al. |
| 2022/0158774 A1 | 5/2022 | Liu et al. |
| 2022/0166594 A1 | 5/2022 | Zhang et al. |
| 2022/0167457 A1 | 5/2022 | Bhatoolaul et al. |
| 2022/0182938 A1 | 6/2022 | Ye et al. |
| 2022/0182943 A1 | 6/2022 | Maleki et al. |
| 2022/0191721 A1 | 6/2022 | Yi |
| 2022/0191793 A1 | 6/2022 | Murray et al. |
| 2022/0191794 A1 | 6/2022 | Pan et al. |
| 2022/0201516 A1 | 6/2022 | Guo et al. |
| 2022/0201522 A1 | 6/2022 | Tao et al. |
| 2022/0217629 A1 | 7/2022 | Gao et al. |
| 2022/0217707 A1 | 7/2022 | Zhou et al. |
| 2022/0225371 A1 | 7/2022 | Seo et al. |
| 2022/0225469 A1 | 7/2022 | Lee et al. |
| 2022/0232478 A1 | 7/2022 | Huang et al. |
| 2022/0232599 A1 | 7/2022 | Xue et al. |
| 2022/0232600 A1 | 7/2022 | Kim et al. |
| 2022/0232667 A1 | 7/2022 | Back et al. |
| 2022/0239417 A1 | 7/2022 | Cheng et al. |
| 2022/0240284 A1 | 7/2022 | Zhou et al. |
| 2022/0255708 A1 | 8/2022 | Loehr et al. |
| 2022/0256458 A1 | 8/2022 | Noh et al. |

(56) References Cited

U.S. PATENT DOCUMENTS

| | | | |
|---|---|---|---|
| 2022/0256574 A1* | 8/2022 | Shi | H04L 1/1861 |
| 2022/0256622 A1 | 8/2022 | Li | |
| 2022/0256643 A1 | 8/2022 | Reial et al. | |
| 2022/0264517 A1 | 8/2022 | Liu et al. | |
| 2022/0322419 A1* | 10/2022 | Jeon | H04W 72/21 |
| 2022/0330301 A1* | 10/2022 | Huang | H04W 72/1273 |
| 2022/0353698 A1 | 11/2022 | Jang et al. | |
| 2022/0353816 A1* | 11/2022 | Seo | H04W 52/02 |
| 2022/0361218 A1* | 11/2022 | He | H04L 5/0053 |
| 2022/0416969 A1 | 12/2022 | Lee et al. | |
| 2022/0417909 A1* | 12/2022 | Zhu | H04L 5/005 |
| 2023/0007589 A1* | 1/2023 | Lin | H04W 72/0446 |
| 2023/0038515 A1 | 2/2023 | Nam et al. | |
| 2023/0097142 A1 | 3/2023 | Alfarhan et al. | |
| 2023/0155783 A1 | 5/2023 | Liu et al. | |
| 2023/0189284 A1* | 6/2023 | Cheng | H04L 5/0023 370/329 |
| 2023/0209388 A1 | 6/2023 | Hwang et al. | |
| 2023/0276408 A1* | 8/2023 | Zhou | H04W 56/0015 |

FOREIGN PATENT DOCUMENTS

| | | | |
|---|---|---|---|
| WO | WO-2021098053 A1 | 5/2021 | |
| WO | WO-2021133705 A1 | 7/2021 | |

OTHER PUBLICATIONS

Partial International Search Report—PCT/US2022/073606—ISA/EPO—Oct. 25, 2022.
International Search Report and Written Opinion—PCT/US2022/073606—ISA/EPO—Jan. 19, 2023.

* cited by examiner

TECHNIQUES FOR COMMUNICATING DATA CHANNEL TRANSMISSIONS

INTRODUCTION

The following relates to wireless communications, and more specifically to managing data channel communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a UE is described. The method may include receiving, in a first control channel occasion associated with a first quasi-colocation (QCL) property, a control message indicating a transmission of a data message during a time period within a threshold time period. In some examples, the method may further include receiving an indication to skip monitoring of a second control channel occasion during the time period. In some examples, the method may further include receiving the data message in accordance with a second QCL property based on the indication to skip the monitoring of the second control channel occasion.

An apparatus for wireless communication at a UE is described. The apparatus may include a processor and memory coupled to the processor. The processor and memory may be configured to receive, in a first control channel occasion associated with a first QCL property, a control message indicating a transmission of a data message during a time period within a threshold time period. In some examples, the processor and memory may be further configured to receive an indication to skip monitoring of a second control channel occasion during the time period. In some examples, the processor and memory may be further configured to receive the data message in accordance with a second QCL property based on the indication to skip the monitoring of the second control channel occasion.

Another apparatus for wireless communication at a UE is described. The apparatus may include means for receiving, in a first control channel occasion associated with a first QCL property, a control message indicating a transmission of a data message during a time period within a threshold time period. In some examples, the apparatus may further include means for receiving an indication to skip monitoring of a second control channel occasion during the time period. In some examples, the apparatus may further include means for receiving the data message in accordance with a second QCL property based on the indication to skip the monitoring of the second control channel occasion.

A non-transitory computer-readable medium storing code for wireless communication at a UE is described. The code may include instructions executable by a processor to receive, in a first control channel occasion associated with a first QCL property, a control message indicating a transmission of a data message during a time period within a threshold time period. In some examples, the code may further include instructions executable by the processor to receive an indication to skip monitoring of a second control channel occasion during the time period. In some examples, the code may further include instructions executable by the processor to receive the data message in accordance with a second QCL property based on the indication to skip the monitoring of the second control channel occasion.

Some examples of the method, apparatuses, and non-transitory computer-readable medium described herein may further include operations, features, means, or instructions for receiving a message that configures the monitoring of the second control channel occasion, the second control channel occasion associated with the second QCL property, where the second QCL property may be based on the second control channel occasion being configured for monitoring.

In some examples of the method, apparatuses, and non-transitory computer-readable medium described herein, the second QCL property may be the same as the first QCL property based on skipping the monitoring of the second control channel occasion and monitoring the first control channel occasion.

In some examples of the method, apparatuses, and non-transitory computer-readable medium described herein, the second QCL property corresponds to a third control channel occasion monitored during the time period based on the second control channel occasion overlapping in a time domain with the data message and skipping the monitoring of the second control channel occasion.

In some examples of the method, apparatuses, and non-transitory computer-readable medium described herein, receiving the indication may include operations, features, means, or instructions for receiving the indication in a first carrier different from a second carrier associated with the first control channel occasion and the data message, where the second control channel occasion may be associated with the first carrier and the third control channel occasion may be associated with the second carrier.

Some examples of the method, apparatuses, and non-transitory computer-readable medium described herein may further include operations, features, means, or instructions for refraining from dropping reception of the data message based on skipping the monitoring of the second control channel occasion.

Some examples of the method, apparatuses, and non-transitory computer-readable medium described herein may further include operations, features, means, or instructions for receiving a second indication of a time offset within the threshold time period, where the second QCL property may be based on whether the data message may be transmitted before the time offset.

In some examples of the method, apparatuses, and non-transitory computer-readable medium described herein, receiving the data message may include operations, features, means, or instructions for receiving the data message before the time offset. Some examples of the method, apparatuses, and non-transitory computer-readable medium described herein may further include operations, features, means, or instructions for receiving a message that configures the monitoring of the second control channel occasion, the second control channel occasion associated with the second QCL property, where the second QCL property may be based on the second control channel occasion being configured for monitoring and receiving the data message before the time offset.

In some examples of the method, apparatuses, and non-transitory computer-readable medium described herein, receiving the data message may include operations, features, means, or instructions for receiving the data message after the time offset, where the second QCL property may be the same as the first QCL property based on receiving the data message after the time offset and skipping the monitoring of the second control channel occasion.

In some examples of the method, apparatuses, and non-transitory computer-readable medium described herein, receiving the data message may include operations, features, means, or instructions for receiving the data message after the time offset. In some examples of the method, apparatuses, and non-transitory computer-readable medium described herein, receiving the indication may include operations, features, means, or instructions for receiving the indication in a first carrier different from a second carrier associated with the first control channel occasion and the data message, the second control channel occasion associated with the first carrier, where the second QCL property corresponds to a third control channel occasion associated with the second carrier and monitored during the time period based on receiving the data message after the time offset and skipping the monitoring of the second control channel occasion.

Some examples of the method, apparatuses, and non-transitory computer-readable medium described herein may further include operations, features, means, or instructions for transmitting a capability message that indicates a duration for the UE to cancel the monitoring of the second control channel occasion after receiving the indication to skip the monitoring of the second control channel occasion, where a value of the time offset may be based on the duration.

In some examples of the method, apparatuses, and non-transitory computer-readable medium described herein, a value of the time offset may be based on a subcarrier spacing (SCS) associated with the control message, the data message, or both.

In some examples of the method, apparatuses, and non-transitory computer-readable medium described herein, a configuration of a control channel occasion includes a control resource set (CORESET) for the control channel occasion and a search space set for the control channel occasion, the CORESET corresponding to a QCL property for the control channel occasion.

A method for wireless communication at a UE is described. The method may include receiving, in a first control channel occasion, a control message associated with a first QCL property, the control message indicating a transmission of a data message during a time period within a threshold time period. In some examples, the method may further include receiving an indication to skip monitoring of a second control channel occasion during the time period, the second control channel occasion overlapping in a time domain with the data message. In some examples, the method may further include dropping reception of the data message based on the indication to skip the monitoring of the second control channel occasion.

An apparatus for wireless communication at a UE is described. The apparatus may include a processor and memory coupled to the processor. The processor and memory may be configured to receive, in a first control channel occasion, a control message associated with a first QCL property, the control message indicating a transmission of a data message during a time period within a threshold time period. In some examples, the processor and memory may be further configured to receive an indication to skip monitoring of a second control channel occasion during the time period, the second control channel occasion overlapping in a time domain with the data message. In some examples, the processor and memory may be further configured to drop reception of the data message based on the indication to skip the monitoring of the second control channel occasion.

Another apparatus for wireless communication at a UE is described. The apparatus may include means for receiving, in a first control channel occasion, a control message associated with a first QCL property, the control message indicating a transmission of a data message during a time period within a threshold time period. In some examples, the apparatus may further include means for receiving an indication to skip monitoring of a second control channel occasion during the time period, the second control channel occasion overlapping in a time domain with the data message. In some examples, the apparatus may further include means for dropping reception of the data message based on the indication to skip the monitoring of the second control channel occasion.

A non-transitory computer-readable medium storing code for wireless communication at a UE is described. The code may include instructions executable by a processor to receive, in a first control channel occasion, a control message associated with a first QCL property, the control message indicating a transmission of a data message during a time period within a threshold time period. In some examples, the code may further include instructions executable by the processor to receive an indication to skip monitoring of a second control channel occasion during the time period, the second control channel occasion overlapping in a time domain with the data message. In some examples, the code may further include instructions executable by the processor to drop reception of the data message based on the indication to skip the monitoring of the second control channel occasion.

Some examples of the method, apparatuses, and non-transitory computer-readable medium described herein may further include operations, features, means, or instructions for receiving a message that configures the monitoring of the second control channel occasion, where dropping reception of the data message may be based on the second control channel occasion being configured for monitoring.

Some examples of the method, apparatuses, and non-transitory computer-readable medium described herein may further include operations, features, means, or instructions for receiving a second indication of a time offset within the threshold time period, where dropping reception of the data message may be based on a transmission of the data message before the time offset.

Some examples of the method, apparatuses, and non-transitory computer-readable medium described herein may further include operations, features, means, or instructions for transmitting a capability message that indicates a duration for the UE to cancel the monitoring of the second control channel occasion after receiving the indication to skip the monitoring of the second control channel occasion, where a value of the time offset may be based on the duration.

In some examples of the method, apparatuses, and non-transitory computer-readable medium described herein, a value of the time offset may be based on an SCS associated with the control message, the data message, or both.

A method for wireless communication at a UE is described. The method may include receiving an indication of a transmission configuration indicator (TCI) state associated with a first QCL property and receiving a control message indicating a transmission of a data message during a time period within a threshold time period. In some examples, the method may further include receiving the data message in accordance with the first QCL property based on the indication of the TCI state.

An apparatus for wireless communication at a UE is described. The apparatus may include a processor and memory coupled to the processor. The processor and memory may be configured to receive an indication of a TCI state associated with a first QCL property and receive a control message indicating a transmission of a data message during a time period within a threshold time period. In some examples, the processor and memory may be further configured to receive the data message in accordance with the first QCL property based on the indication of the TCI state.

Another apparatus for wireless communication at a UE is described. The apparatus may include means for receiving an indication of a TCI state associated with a first QCL property and means for receiving a control message indicating a transmission of a data message during a time period within a threshold time period. In some examples, the apparatus may further include means for receiving the data message in accordance with the first QCL property based on the indication of the TCI state.

A non-transitory computer-readable medium storing code for wireless communication at a UE is described. The code may include instructions executable by a processor to receive an indication of a TCI state associated with a first QCL property and receive a control message indicating a transmission of a data message during a time period within a threshold time period. In some examples, the code may further include instructions executable by the processor to receive the data message in accordance with the first QCL property based on the indication of the TCI state.

Some examples of the method, apparatuses, and non-transitory computer-readable medium described herein may further include operations, features, means, or instructions for receiving a second control message indicating a transmission of a second data message after the threshold time period and receiving the second data message in accordance with the first QCL property based on the indication of the TCI state.

A method for wireless communication at a base station is described. The method may include transmitting, in a first control channel occasion associated with a first QCL property, a control message to a UE that indicates a transmission of a data message during a time period within a threshold time period. In some examples, the method may further include generating an indication to skip monitoring of a second control channel occasion during the time period. In some examples, the method may further include generating the data message in accordance with a second QCL property, based on the indication to skip the monitoring of the second control channel occasion.

An apparatus for wireless communication at a base station is described. The apparatus may include a processor and memory coupled to the processor. The processor and memory may be configured to transmit, in a first control channel occasion associated with a first QCL property, a control message to a UE that indicates a transmission of a data message during a time period within a threshold time period. In some examples, the processor and memory may be further configured to generate an indication to skip monitoring of a second control channel occasion during the time period. In some examples, the processor and memory may be further configured to generate the data message in accordance with a second QCL property, based on the indication to skip the monitoring of the second control channel occasion.

Another apparatus for wireless communication at a base station is described. The apparatus may include means for transmitting, in a first control channel occasion associated with a first QCL property, a control message to a UE that indicates a transmission of a data message during a time period within a threshold time period. In some examples, the apparatus may further include means for generating an indication to skip monitoring of a second control channel occasion during the time period. In some examples, the apparatus may further include means for generating the data message in accordance with a second QCL property, based on the indication to skip the monitoring of the second control channel occasion.

A non-transitory computer-readable medium storing code for wireless communication at a base station is described. The code may include instructions executable by a processor to transmit, in a first control channel occasion associated with a first QCL property, a control message to a UE that indicates a transmission of a data message during a time period within a threshold time period. In some examples, the code may further include instructions executable by the processor to generate an indication to skip monitoring of a second control channel occasion during the time period. In some examples, the code may further include instructions executable by the processor to generate the data message in accordance with a second QCL property, based on the indication to skip the monitoring of the second control channel occasion.

Some examples of the method, apparatuses, and non-transitory computer-readable medium described herein may further include operations, features, means, or instructions for transmitting the indication to skip monitoring of the second control channel occasion to the UE and transmitting, to the UE, the data message in accordance with the second quasi-colocation property.

Some examples of the method, apparatuses, and non-transitory computer-readable medium described herein may further include operations, features, means, or instructions for transmitting a message that configures the monitoring of the second control channel occasion, the second control channel occasion associated with the second QCL property, where the second QCL property may be based on the second control channel occasion being configured for monitoring.

In some examples of the method, apparatuses, and non-transitory computer-readable medium described herein, the second QCL property may be the same as the first QCL property based on skipping the monitoring of the second control channel occasion and monitoring the first control channel occasion.

In some examples of the method, apparatuses, and non-transitory computer-readable medium described herein, the second QCL property corresponds to a third control channel occasion monitored during the time period based on the second control channel occasion overlapping in a time domain with the data message and skipping the monitoring of the second control channel occasion.

In some examples of the method, apparatuses, and non-transitory computer-readable medium described herein, transmitting the indication may include operations, features, means, or instructions for transmitting the indication in a first carrier different from a second carrier associated with the first control channel occasion and the data message, where the second control channel occasion may be associated with the first carrier and the third control channel occasion may be associated with the second carrier.

Some examples of the method, apparatuses, and non-transitory computer-readable medium described herein may further include operations, features, means, or instructions for transmitting a second indication of a time offset within the threshold time period, where the second QCL property may be based on whether the data message may be transmitted before the time offset.

In some examples of the method, apparatuses, and non-transitory computer-readable medium described herein, transmitting the data message may include operations, features, means, or instructions for transmitting the data message before the time offset. Some examples of the method, apparatuses, and non-transitory computer-readable medium described herein may further include operations, features, means, or instructions for transmitting a message that configures the monitoring of the second control channel occasion, the second control channel occasion associated with the second QCL property, where the second QCL property may be based on the second control channel occasion being configured for monitoring and transmitting the data message before the time offset.

In some examples of the method, apparatuses, and non-transitory computer-readable medium described herein, transmitting the data message may include operations, features, means, or instructions for transmitting the data message after the time offset, where the second QCL property may be the same as the first QCL property based on transmitting the data message after the time offset and skipping the monitoring of the second control channel occasion.

In some examples of the method, apparatuses, and non-transitory computer-readable medium described herein, transmitting the data message may include operations, features, means, or instructions for transmitting the data message after the time offset. In some examples of the method, apparatuses, and non-transitory computer-readable medium described herein, transmitting the indication may include operations, features, means, or instructions for transmitting the indication in a first carrier different from a second carrier associated with the first control channel occasion and the data message, the second control channel occasion associated with the first carrier, where the second QCL property corresponds to a third control channel occasion associated with the second carrier and monitored during the time period based on transmitting the data message after the time offset and skipping the monitoring of the second control channel occasion.

Some examples of the method, apparatuses, and non-transitory computer-readable medium described herein may further include operations, features, means, or instructions for receiving a capability message that indicates a duration for the UE to cancel the monitoring of the second control channel occasion after receiving the indication to skip the monitoring of the second control channel occasion, where a value of the time offset may be based on the duration.

In some examples of the method, apparatuses, and non-transitory computer-readable medium described herein, a value of the time offset may be based on an SCS associated with the control message, the data message, or both.

In some examples of the method, apparatuses, and non-transitory computer-readable medium described herein, a configuration of a control channel occasion includes a CORESET for the control channel occasion and a search space set for the control channel occasion, the CORESET corresponding to a QCL property for the control channel occasion.

DETAILED DESCRIPTION

Figure 1:
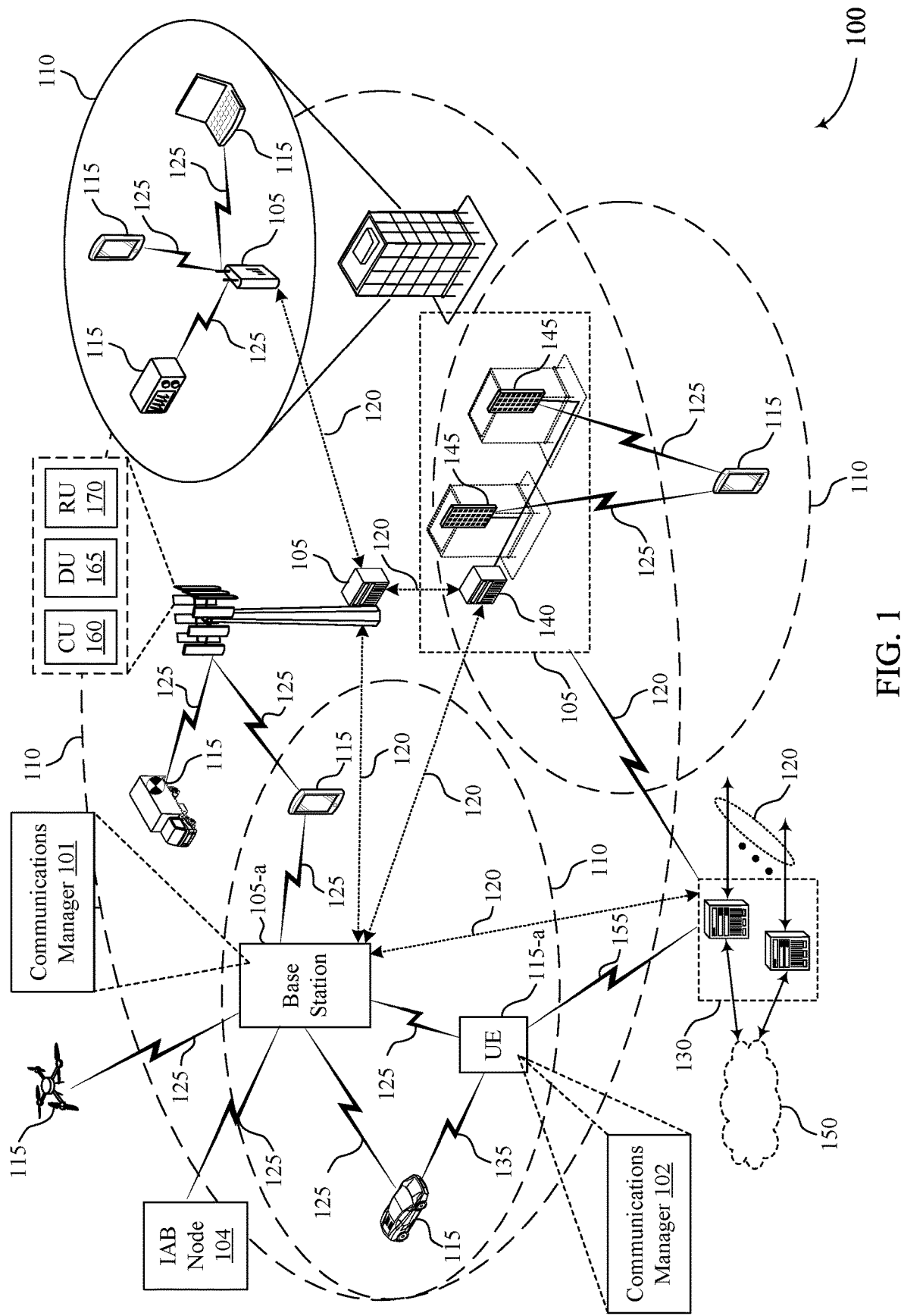
FIGS. 1 and 2 illustrate examples of wireless communications systems that support techniques for communicating data channel transmissions in accordance with one or more aspects of the present disclosure.

Some wireless communications systems may include communication devices, such as a UE and a base station (e.g., an eNodeB (eNB), a next-generation NodeB or a giga-NodeB, either of which may be referred to as a gNB, or some other base station), that may support multiple radio access technologies (RATs). Examples of RATs include 4G systems, such as LTE systems, and 5G systems, which may be referred to as NR systems. In some examples, a UE may continuously monitor communication links for an indication that the UE may receive data. In some other aspects, a UE may be configured to operate according to a discontinuous reception (DRX) mode (e.g., cycle). A DRX cycle consists of an "On period" during which the UE monitors for control information (e.g., during a control channel occasion, such as a physical downlink control channel (PDCCH) occasion) and an "Off period" when the UE enters a power saving state (e.g., power down one or more radio components) to conserve power and extend battery life. In some aspects, the UE may receive control information during a control channel occasion that schedules one or more downlink (e.g., data) transmissions. When this occurs, the UE may exit or refrain from entering the power saving state to receive the one or more downlink transmissions (e.g., and transmit one or more uplink transmissions) and may subsequently enter (e.g., re-enter) the power saving state.

In some aspects, power consumption may be further reduced via PDCCH skipping. To support PDCCH skipping, a base station may transmit an indication to a UE to skip the monitoring of one or more PDCCH occasions. In response, the UE may enter or refrain from exiting a power saving state and skip the monitoring of the one or more PDCCH occasions (e.g., and communication of any corresponding downlink/uplink transmissions), thereby further reducing power consumption by being in a power saving state for a longer period of time. In some cases, however, PDCCH skipping may complicate QCL property assumptions and dropping behaviors associated with data communications that occur in a time window during which the one or more PDCCH occasions are skipped.

For example, a PDCCH transmission may indicate a subsequent transmission of a data message (e.g., a physical downlink shared channel (PDSCH) transmission) and may also indicate a QCL property of the data message if the data message is received after a threshold time period (e.g., corresponding to a timeDurationForQCL parameter). A QCL property of a data message may correspond to a spatial parameter associated with a QCL-TypeD relationship that indicates a relation between two or more directional beams used to communicate signals. In some cases, if the data message is scheduled before the threshold time period expires (e.g., within the threshold time period), the UE may assume that the QCL property of the data message corresponds to a QCL property of a PDCCH occasion that occurs immediately before the data message is received. However, if that PDCCH occasion is skipped, the QCL property of the data message may be unknown. Additionally, or alternatively, if the data message overlaps in time with a PDCCH occasion, the UE may drop the data message to monitor the overlapping PDCCH occasion. However, if the monitoring of the overlapping PDCCH occasion is skipped, the dropping behavior (e.g., whether to drop the data message scheduled by the PDCCH occasion) and QCL property associated with the data message may be unknown.

Techniques, systems, and devices are described herein for communicating data messages in conjunction with PDCCH skipping. For example, a UE may monitor a first control channel occasion (e.g., a first PDCCH occasion) that is associated with a first QCL property. A base station may transmit, to the UE, a control message in the first control channel occasion that indicates a transmission of a data message and a second QCL property of the data message if the data message is received after a threshold time period (e.g., from reception of the control message). The control message may further schedule the transmission of the data message within (e.g., before expiration of) the threshold time period. The UE may receive (e.g., from the base station) an indication to skip the monitoring of a second control channel occasion (e.g., a second PDCCH occasion) that occurs within the threshold time period, where skipping the monitoring of the second control channel occasion may affect the QCL property assumptions and/or dropping behavior associated with the data message. The UE may determine a third QCL property of the data message and/or a dropping behavior for the data message based on skipping the monitoring of the second control channel occasion.

For example, the UE may determine the third QCL property and/or the dropping behavior based on monitored control channel occasions. For instance, the second control channel occasion may be considered unmonitored based on the UE skipping the monitoring of the second control channel occasion. Accordingly, the UE may exclude the second control channel occasion from its QCL property and/or dropping behavior determination. Alternatively, the UE may determine the third QCL property and/or the dropping behavior based on configured control channel occasions. For example, the UE may include the second control channel occasion in its QCL property and/or dropping behavior determination based on the second control channel occasion being configured for monitoring (e.g., prior to receiving the indication to skip the monitoring of the second control channel occasion). In some examples, the UE may receive the data message (e.g., from the base station) in accordance with the determined third QCL property. In some other examples, the UE may drop reception of the data message based on the determined dropping behavior (e.g., if the second control channel occasion is configured to overlap in time with the data message).

Techniques, systems, and devices are further described herein for communicating data messages based on a unified TCI state. For example, a UE may be configured with a unified TCI state framework in which the UE may be configured with at least two TCI states that are associated with a same reference signal. The unified TCI state framework may support beamformed communications between communication devices (e.g., between UEs and base stations). In some examples, a unified TCI state may be a joint common TCI state that indicates a common beam for at least one downlink channel (or downlink reference signal transmission) and at least one uplink channel (or uplink reference signal transmission), a downlink common TCI state that indicates a common beam used for at least two downlink channels, or an uplink common TCI state that indicates a common beam used for at least two uplink channels.

A UE may determine a QCL property associated with a data message based on a unified TCI state indicated by a base station. For example, the UE may receive, from the base station, an indication of a unified TCI state (e.g., via downlink control information (DCI)) that is associated with a first QCL property. The UE may receive data messages in accordance with the QCL property irrespective of when the data messages are received (e.g., and whether any control channel occasions are skipped). For example, the UE may receive a control message that schedules the transmission of a data message in relation to a threshold time period, where receiving the data message outside (e.g., after) the threshold time period may correspond to receiving the data message in accordance with a second QCL property. Based on the indication of the unified TCI state, the UE may receive the data message in accordance with the first QCL property regardless of when the data message is received with respect to the threshold time period (e.g., and regardless of whether any control channel occasions are skipped). For example, the UE may receive the data message in accordance with the first QCL property if the data message is received within the threshold time period or outside the threshold time period (e.g., after the threshold time period expires).

In some aspects, data channel communication management based on PDCCH skipping or unified TCI states (e.g., or both) may reduce processing complexity and increase communication reliability. In some other aspects, data channel communication management based on PDCCH skipping or unified TCI states (e.g., or both) may increase coordination between devices, increase data rates, and increase spectral efficiency.

Aspects of the disclosure are initially described in the context of wireless communications systems. Aspects of the disclosure are additionally described in the context of communication sequences and process flows. Aspects of the disclosure are further illustrated by and described with reference to apparatus diagrams, system diagrams, and flowcharts that relate to techniques for communicating data channel transmissions.

FIG. 1 illustrates an example of a wireless communications system 100 that supports techniques for communicating data channel transmissions in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. In some implementations, the UEs 115 may be or include disaggregated UEs 115 in which one or more of the various functions and communication layers of the UE 115 may be split between multiple physical devices for communication between UEs 115 and base stations 105. In such cases, the disaggregated UE 115 may include the respective physical devices configured to perform various functions and communications, for example to communicate data messages in accordance with determined QCL properties described herein.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to communicate data messages in accordance with determined QCL properties described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to communicate data messages in accordance with determined QCL properties described herein.

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A QCL relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, a synchronization signal block (SSB), or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread then the UE 115 may determine the delay spread for one antenna port (e.g., based on a received reference signal, such as CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar to (or the same as) another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficiently identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a TCI state configuration may include one or more parameters associated with a QCL relationship between transmitted signals. For example, a base station 105 may configure a QCL relationship that provides a mapping between a reference signal and antenna ports of another signal (e.g., a demodulation reference signal (DMRS) antenna port for PDCCH, a DMRS antenna port for PDSCH, a CSI-RS antenna port for CSI-RS, or the like), and the TCI state may be indicated to the UE 115 by the base station 105. In some cases, a set of TCI states may be indicated to a UE 115 via RRC signaling, where some number of TCI states (e.g., a pool of 8 TCI states from of a total of 64 TCI states may be configured via RRC) and a particular TCI state may be indicated via DCI (e.g., within a CORESET). The QCL relationship associated with the TCI state (and further established through higher-layer parameters) may provide the UE 115 with the QCL relationship for respective antenna ports and reference signals transmitted by the base station 105.

In some examples, the wireless communications system 100 may support a unified TCI state framework to indicate QCL information. For example, a unified TCI state may be a joint TCI state, which provides a beam indication for at least one downlink channel and at least one uplink channel. Alternatively, the unified TCI state may be a separate downlink common TCI state, which provides the beam indication for at least two downlink channels. Alternatively, the unified TCI state may be a separate uplink common TCI state, which provides the beam indication for at least two uplink channels. A unified TCI state may include at least one reference signal (e.g., a source reference signal) to provide a reference (e.g., a UE assumption) for determining QCL relationships, spatial filters, or the like, for a target downlink or uplink channel. That is, a UE 115 configured with unified TCI states may determine QCL information or spatial filter information for one or both unified TCI states by relying on one or more reference signals associated with the unified TCI states. For example, an associated reference signal (e.g., a source reference signal) in a number M of unified TCI states may provide common QCL information for at least UE-dedicated reception on a PDSCH and for all or a subset of CORESETs, or all or a subset of CSI-RS resources for CSI acquisition, beam management, tracking, and the like on a particular component carrier. In some examples, applicability of unified TCI indications on a PDSCH may include PDSCH default beams. A UE may select between a number of unified TCI states M=1, and N≥1. In another example, source reference signals in a number N of unified TCI states may provide a reference for determining common uplink transmission spatial filters for at least dynamic grant and configured grant based physical uplink shared channel (PUSCH), and for all or a subset of dedicated physical uplink control channel (PUCCH) resources, or all or a subset of sounding reference signal (SRS) resources in a resource set configured for antenna switching, codebook-based or non-codebook-based uplink transmissions, or the like, on a particular component carrier. In some examples, PUSCH port determination may be based on the unified TCI state (e.g., may be mapped with SRS ports). A UE 115 may select between a number of unified TCI states N=1, and N≥1.

In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an "On Duration" when the UE 115 may monitor for control information on a PDCCH (e.g., for the duration of a drx-onDurationTimer) and an "Off Duration" when the UE 115 may power down radio components (e.g., enter a power saving state). In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle, and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer" (e.g., a drx-InactivityTimer). If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

The wireless communications system 100 may be configured to support data channel communication management based on PDCCH skipping or a unified TCI state, or both. For example, base stations 105 may include a communications manager 101 and UEs 115 may include a communications manager 102 that may support managing data message QCL property assumptions and/or dropping behaviors based on PDCCH skipping or a unified TCI state, or both. The communications manager 101 may be an example of aspects of a communications manager as described in FIGS. 13 through 16. The communications manager 102 may be an example of aspects of a communications manager as described in FIGS. 9 through 12.

By way of example, a UE 115 (e.g., using the communications manager 102) may communicate data messages with a base station 105 (e.g., using the communications manager 101) in conjunction with PDCCH skipping. For example, the UE may monitor a first control channel occasion (e.g., a first PDCCH occasion) that is associated with a first QCL property, where a QCL property may correspond to one or more spatial parameters of a QCL-TypeD relationship. The base station 105 may transmit a control message to the UE 115 in the first control channel occasion that indicates a transmission of a data message and a second QCL property of the data message corresponding to an expiration of a threshold time period (e.g., from reception of the control message). The control message may further schedule the transmission of the data message within the threshold time period. The UE 115 may receive (e.g., from the base station) an indication to skip the monitoring of a second control channel occasion (e.g., a second PDCCH occasion) that occurs within the threshold time period. In some examples, the UE 115 may determine a third QCL property associated with the data message based on the indication (e.g., based on monitored control channel occasions, based on configured control channel occasions) and may receive the data message in accordance with the third QCL property. In some other examples, the UE 115 may determine a dropping behavior associated with the data message based on the indication (e.g., based on whether a configured control channel occasion overlaps in time with the data message) and may drop the data message in accordance with the determined dropping behavior.

Additionally, or alternatively, a UE 115 (e.g., using the communications manager 102) may communicate data messages with a base station 105 (e.g., using the communications manager 101) in conjunction with unified TCI state indications. For example, the UE 115 may receive, from the base station 105, an indication of a unified TCI state (e.g., via DCI) that is associated with a first QCL property. The UE 115 may receive a control message that schedules the transmission of a data message in relation to a threshold time period, where receiving the data message outside (e.g., after) the threshold time period may correspond to receiving the data message in accordance with a second QCL property. Based on the indication of the unified TCI state, the UE 115 may receive the data message in accordance with the first QCL property regardless of when the data message is received with respect to the threshold time period (e.g., and regardless of whether any control channel occasions are skipped). For example, the UE 115 may receive the data message in accordance with the first QCL property if the data message is received within the threshold time period or outside the threshold time period (e.g., after the threshold time period expires).

Figure 2:
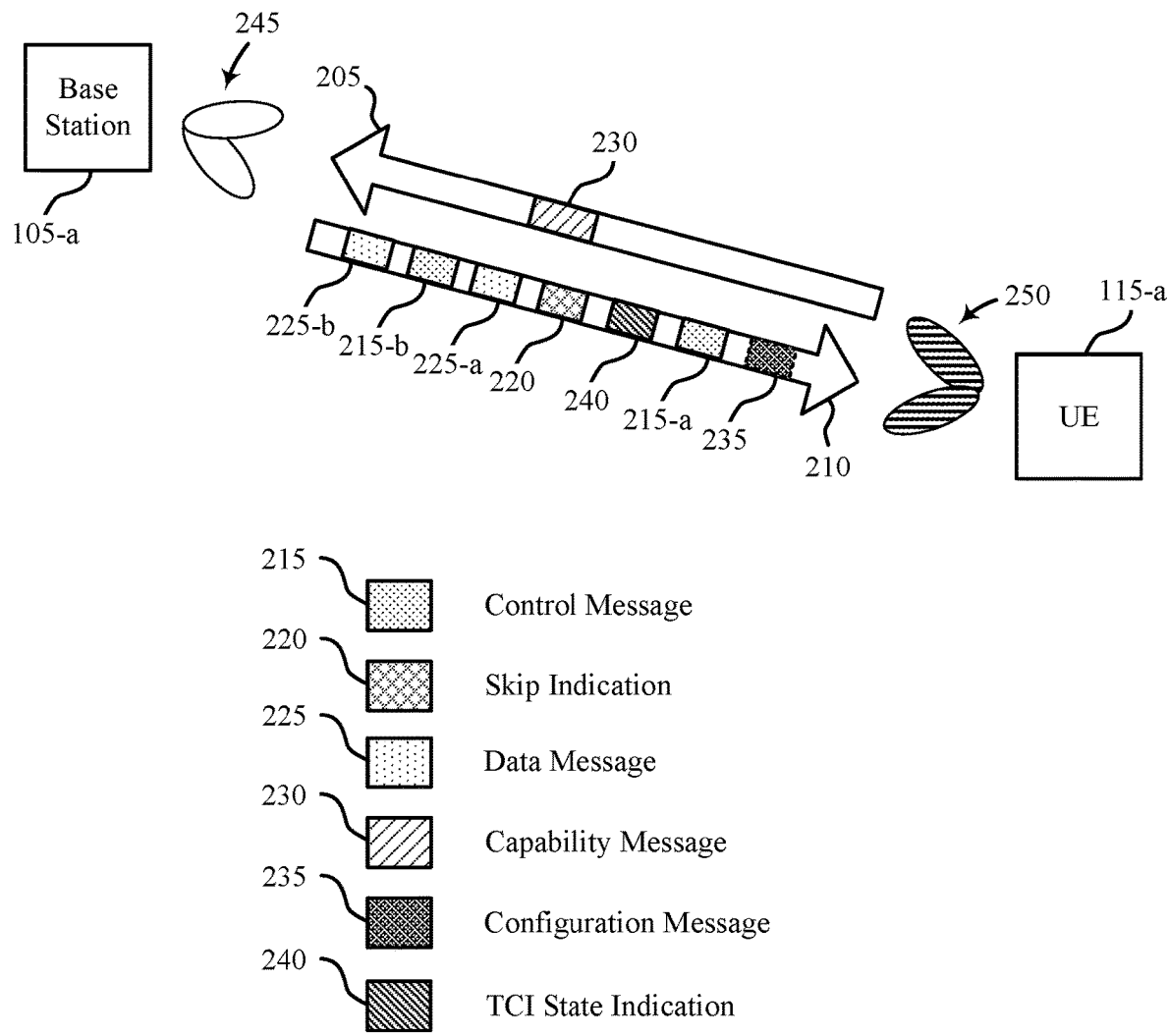

FIG. 2 illustrates an example of a wireless communications system 200 that supports techniques for communicating data channel transmissions in accordance with one or more aspects of the present disclosure. The wireless communications system 200 may implement aspects of the wireless communications system 100 or may be implemented by aspects of the wireless communications system 100. For example, the wireless communications system 200 may include a base station 105-a and a UE 115-a which may respective examples of the corresponding devices described with reference to FIG. 1. In some examples, the wireless communications system 200 may support multiple RATs including 4G systems and 5G systems which may be referred to as NR systems. The wireless communications system 200 may support PDCCH skipping and/or unified TCI state data communication management to reduce processing complexity, increase communication reliability, increase resource utilization, increase coordination between devices, increase data rates, and increase spectral efficiency.

The wireless communications system 200 may support communications between the UE 115-a and the base station 105-a. For example, the UE 115-a may transmit uplink messages to the base station 105-a on a communication link 205 (e.g., which may be an example of a communication link 125) and may receive downlink messages on a communication link 210 (which may be an example of a communication link 125). The wireless communication system 200 may additionally support beamformed communications between the base station 105-a and the UE 115-a. For example, the base station 105-a may transmit and receive messages using one or more of a set of base station beams 245, and the UE 115-a may transmit and receive messages using one or more of a set of UE beams 250.

The UE 115-a and the base station 105-a may support DRX mode operations in accordance with configured DRX cycles, for example, to conserve power and increase battery life. To further conserver power and increase battery life, the UE 115-a and the base station 105-a may support PDCCH skipping in which the base station 105-*a* may indicate for the UE 115-*a* to skip the monitoring of one or more control channel occasions (e.g., PDCCH occasions). For example, the base station 105-*a* may transmit a skip indication 220 to the UE 115-*a* that indicates for the UE 115-*a* to skip the control channel occasions that occur within a time window. However, skipping one or more control channel occasions may complicate QCL property assumptions and dropping behaviors associated with data communications that occur during the time window. For example, the UE 115-*a* may determine QCL properties and/or dropping behaviors for data communications based on parameters associated with monitored control channel occasions (e.g., QCL properties associated with the monitored control channel occasions, time resources associated with the monitored control channel occasions). However, skipping one or more control channel occasions may result in configured but unmonitored control channel occasions, which may result in unknown QCL properties and/or dropping behaviors.

Various aspects of the described techniques support determining QCL properties and/or dropping behaviors for data messages in conjunction with PDCCH skipping. For example, the UE 115-*a* may monitor a first control channel occasion for control information. The first control channel occasion may be associated with a CORESET that is configured for the first control channel occasion, and the UE 115-*a* may monitor the first control channel occasion according to a search space set configured for the first control channel occasion. The CORESET may correspond to a first QCL property. That is, messages received in the CORESET may be received in accordance with the first QCL property. The base station 105-*a* may transmit a control message 215-*a* that indicates (e.g., schedules) a transmission of a data message 225-*a* during a time within a threshold time period (e.g., before the threshold time period expires). In some examples, an expiration of the threshold time period may be associated with a second QCL property for the data message 225-*a*. For instance, the control message 215-*a* may include an indication of the second QCL property, and the UE 115-*a* may assume that the base station 105-*a* may generate and transmit the data message 225-*a* in accordance with the second QCL property if the base station 105-*a* transmits the data message 225-*a* after the threshold time period expires. In some examples, the control message 215-*a* may include a timeDurationForQCL parameter corresponding to the threshold time period.

The base station 105-*a* may generate and transmit the skip indication 220 to the UE 115-*a* that indicates for the UE 115-*a* to skip one or more control channel occasions including a second control channel occasion that occurs within the threshold time period. In some examples, the skip indication 220 may be included in the control message 215-*a*. In some other example, the skip indication 220 may be included in a control message different from the control message 215-*a*. In some cases, skipping the second control channel occasion may affect the QCL property assumption and/or dropping behavior associated with the data message 225-*a* (e.g., based on the second control channel occasion being unmonitored). In response to receiving the skip indication 220, the UE 115-*a* may determine a third QCL property associated with the data message 225-*a* and/or a dropping behavior associated with the data message 225-*a* according to various methods.

In a first example, the UE 115-*a* may determine the third QCL property and/or the dropping behavior based on actually monitored control channel occasions. For example, because the UE 115-*a* skips the monitoring of the second control channel occasion, the second control channel occasion may be considered unmonitored and thus may be excluded from the control channel occasions that the UE 115-*a* actually monitors (e.g., the first control channel occasion). Accordingly, the UE 115-*a* may exclude the second control channel occasion from consideration when determining the third QCL property and/or the dropping behavior. Additional details with regards to determining the third QCL property and/or the dropping behavior based on the actually monitored control channel occasions are described below with reference to FIGS. 3A and 3B.

In a second example, the UE 115-*a* may determine the third QCL property and/or the dropping behavior based on configured control channel occasions. For example, the second control channel occasion may be considered a configured control channel occasion. That is, the UE 115-*a* may be configured to monitor the second control channel occasion and would monitor the second control channel occasion if the base station 105-*a* does not transmit the skip indication 220. In some examples, the base station 105-*a* may transmit a configuration message 235 (e.g., via RRC signaling, via DCI, via a MAC-control element (MAC-CE)) that configures the monitoring of the second control channel occasion. In some examples, the configuration message 235 may configure the DRX mode operations and associated control channel occasions (e.g., the first control channel occasion during a first "On period", the second control channel occasion during a second "On period", and so on). The UE 115-*a* may consider the second control channel occasion when determining the third QCL property and/or the dropping behavior (e.g., based on the configuration message 235 configuring the second control channel occasion for monitoring). Additional details with regards to determining the third QCL property and/or the dropping behavior based on the configured control channel occasions are described below with reference to FIGS. 4A and 4B.

In some examples, the UE 115-*a* may determine the third QCL property and/or the dropping behavior based on an application delay. For example, the application delay may correspond to a time offset (e.g., within the threshold time period) after which the UE 115-*a* may cancel the monitoring of a control channel occasion in response to receiving the skip indication 220. If the UE 115-*a* receives the data message 225-*a* before the time offset, the UE 115-*a* may determine the third QCL property and/or the dropping behavior based on the configured control channel occasions (e.g., based on monitoring the second control channel occasion due to, for example, being unable to cancel the monitoring the second control channel occasion prior to reception of the data message 225-*a*). Alternatively, if the UE 115-*a* receives the data message 225-*a* after the time offset, the UE 115-*a* may determine the third QCL property and/or the dropping behavior based on the actually monitored control channel occasions (e.g., based on skipping the monitoring of the second control channel occasion). In some examples, the base station 105-*a* may indicate the time offset to the UE 115-*a* via the configuration message 235. In some cases, the UE 115-*a* may transmit a capability message 230 (e.g., via RRC signaling) that indicates a capability of the UE 115-*a* to cancel the monitoring of a control channel occasion. For example, the capability message 230 may indicate a duration (e.g., in slots, in milliseconds) for the UE 115-*a* to cancel the monitoring of the second control channel occasion after receiving the skip indication 220. In some examples, a value of the time offset may be based on (e.g., may correspond to) the duration indicated in the capability message 230. In some cases, the value of the time offset may be based on an SCS of the control message 215-*a*, the data message 225-*a*, or both. For example, as SCS increases, the value of the time offset may increase, and vice versa.

The UE 115-*a* may operate in accordance with the determination of the third QCL property and/or the dropping behavior. For example, the UE 115-*a* may determine to refrain from dropping the data message 225-*a* and may receive the data message 225-*a* from the base station 105-*a* in accordance with the third QCL property. Alternatively, the UE 115-*a* may drop the data message 225-*a* based on the determined dropping behavior.

In some examples, the UE 115-*a* may determine the third QCL property for the data message 225-*a* based on a unified TCI state indicated by the base station 105-*a*. For example, the base station 105-*a* may transmit a TCI state indication 240 to the UE 115-*a* which may indicate the unified TCI state to the UE 115-*a*. The unified TCI state may correspond to (e.g., indicate) the third QCL property. Accordingly, the UE 115-*a* may receive the data message 225-*a* in accordance with the third QCL property based on the indication of the unified TCI state. Additionally, the UE 115-*a* may receive data messages transmitted after the threshold time period in accordance with the third QCL property based on the indication of the unified TCI state. For example, the base station 105-*a* may transmit a control message 215-*b* that schedules the transmission of a data message 225-*b* after the threshold time period. The UE 115-*a* may receive the data message 225-*b* in accordance with the third QCL property based on the unified TCI state corresponding to the third QCL property.

Figure 3A:
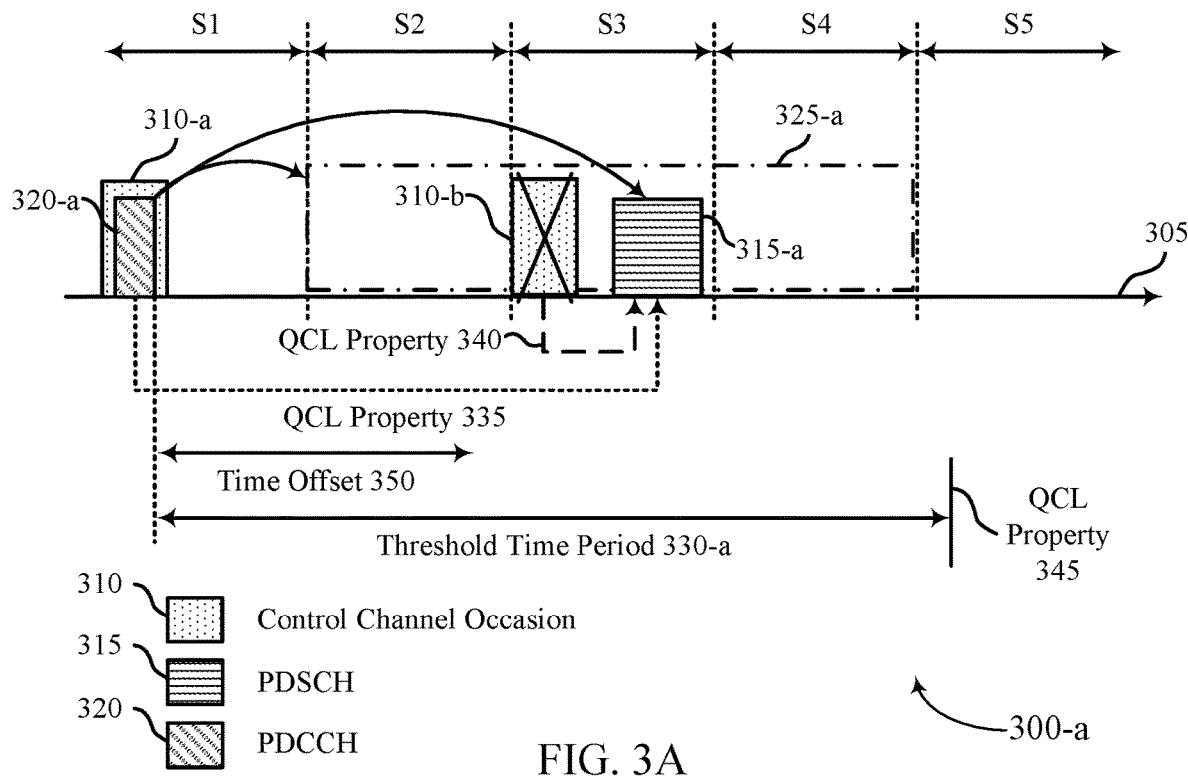
FIGS. 3A, 3B, 4A, 4B, and 5 illustrate examples of communication sequences that support techniques for communicating data channel transmissions in accordance with one or more aspects of the present disclosure.

FIG. 3A illustrates an example of a communication sequence 300-*a* that supports techniques for communicating data channel transmissions in accordance with one or more aspects of the present disclosure. The communication sequence 300-*a* may implement aspects of the wireless communications systems 100 and 200 or may be implemented by aspects of the wireless communications system 100 and 200 as described with reference to FIGS. 1 and 2, respectively. For example, the communication sequence 300-*a* may be implemented by a UE 115 and a base station 105 for QCL property determination in conjunction with PDCCH skipping.

The communication sequence 300-*a* depicts communications between the UE 115 and the base station 105 over a quantity of slots S (e.g., over slots S1, S2, S3, S4, and S5, although other time intervals or slot quantities are possible) and over a carrier 305 (e.g., a component carrier). In the example of FIG. 3A, the UE 115 may monitor a control channel occasion 310-*a* and receive a PDCCH 320-*a* from the base station 105 during the control channel occasion 310-*a*. The PDCCH 320-*a* may indicate for the UE 115 to skip the monitoring of control channel occasions 310 that occur during a time window 325-*a* (e.g., a control channel occasion 310-*b*, other control channel occasions 310 within time window 325-*a* (not shown)). Additionally, the PDCCH 320-*a* may schedule a transmission of a PDSCH 315-*a*. In some examples, the PDCCH 320-*a* may include DCI that schedules the PDSCH 315-*a*, indicates for the UE 115 to perform PDCCH skipping during the time window 325-*a*, or both.

The control channel occasion 310-*a* may be associated with a QCL property 335. For example, the base station 105 may transmit the PDCCH 320-*a* in a CORESET of the control channel occasion 310-*a* (e.g., a search space set of the CORESET), and the CORESET may correspond to the QCL property 335. That is, the UE 115 may receive the PDCCH 320-*a* in accordance with the QCL property 335 based on receiving the PDCCH 320-*a* in the CORESET.

The PDCCH 320-*a* may indicate a threshold time period 330-*a* (e.g., from reception of the PDCCH 320-*a*) that is associated with a QCL property 345. For example, the PDCCH 320-*a* may indicate the QCL property 345 which the UE 115 may use to receive PDSCHs 315 transmitted after the expiration of the threshold time period 330-*a*. In the example of FIG. 3A, the PDCCH 320-*a* may schedule the transmission of the PDSCH 315-*a* within the threshold time period 330-*a*. Accordingly, a QCL property associated with the PDSCH 315-*a* may be different from the QCL property 345.

The UE 115 may determine the QCL property associated with the PDSCH 315-*a* based on actually monitored control channel occasions 310. For example, the PDCCH 320-*a* may indicate for the UE 115 to skip the monitoring of the control channel occasion 310-*b*, which may correspond to a control channel occasion 310 that occurs before and closest to the PDSCH 315-*a* in time. Thus, the control channel occasion 310-*b* may be considered unmonitored by the UE 115 (e.g., and the base station 105). The control channel occasion 310-*b* may be associated with a QCL property 340, which may correspond to a QCL property associated with the PDSCH 315-*a* based on the PDSCH 315-*a* being transmitted within the threshold time period 330-*a*. However, because the control channel occasion 310-*b* is unmonitored, the UE 115 may instead determine the QCL property associated with the PDSCH 315-*a* based on a QCL property of a previously monitored (e.g., non-skipped) control channel occasion 310. For example, the UE 115 may determine that the QCL property associated with the PDSCH 315-*a* is the QCL property 335 based on monitoring the control channel occasion 310-*a* and skipping the monitoring of the control channel occasion 310-*b*. Additionally, the base station 105 may determine that the QCL property associated with the PDSCH 315-*a* is the QCL property 335 based on indicating for the UE 115 to skip the monitoring of the control channel occasion 310-*b*. The UE 115 may receive the PDSCH 315-*a* from the base station 105 in accordance with the QCL property 335 based on the determination.

In some examples, the UE 115 (e.g., and the base station 105) may determine the QCL property associated with the PDSCH 315-*a* based on a time offset 350. For example, the time offset 350 may correspond to a time after which the UE 115 may cancel the monitoring of a control channel occasion 310 in response to receiving the PDCCH 320-*a*. In the example of FIG. 3A, the control channel occasion 310-*b* may occur temporally after the time offset 350, and thus, in some cases, the UE 115 may cancel the monitoring of the control channel occasion 310-*b*. As a result, based on receiving the PDSCH 315-*a* after the time offset 350 (e.g., and canceling the monitoring of the control channel occasion 310-*b*), the UE 115 may determine the QCL property associated with the PDSCH 315-*a* based on the actually monitored control channel occasions 310. That is, the QCL property associated with the PDSCH 315-*a* may correspond to the QCL property 335 based on the PDSCH 315-*a* being received (e.g., and the control channel occasion 310-*b* occurring) after the time offset 350.

Figure 3B:
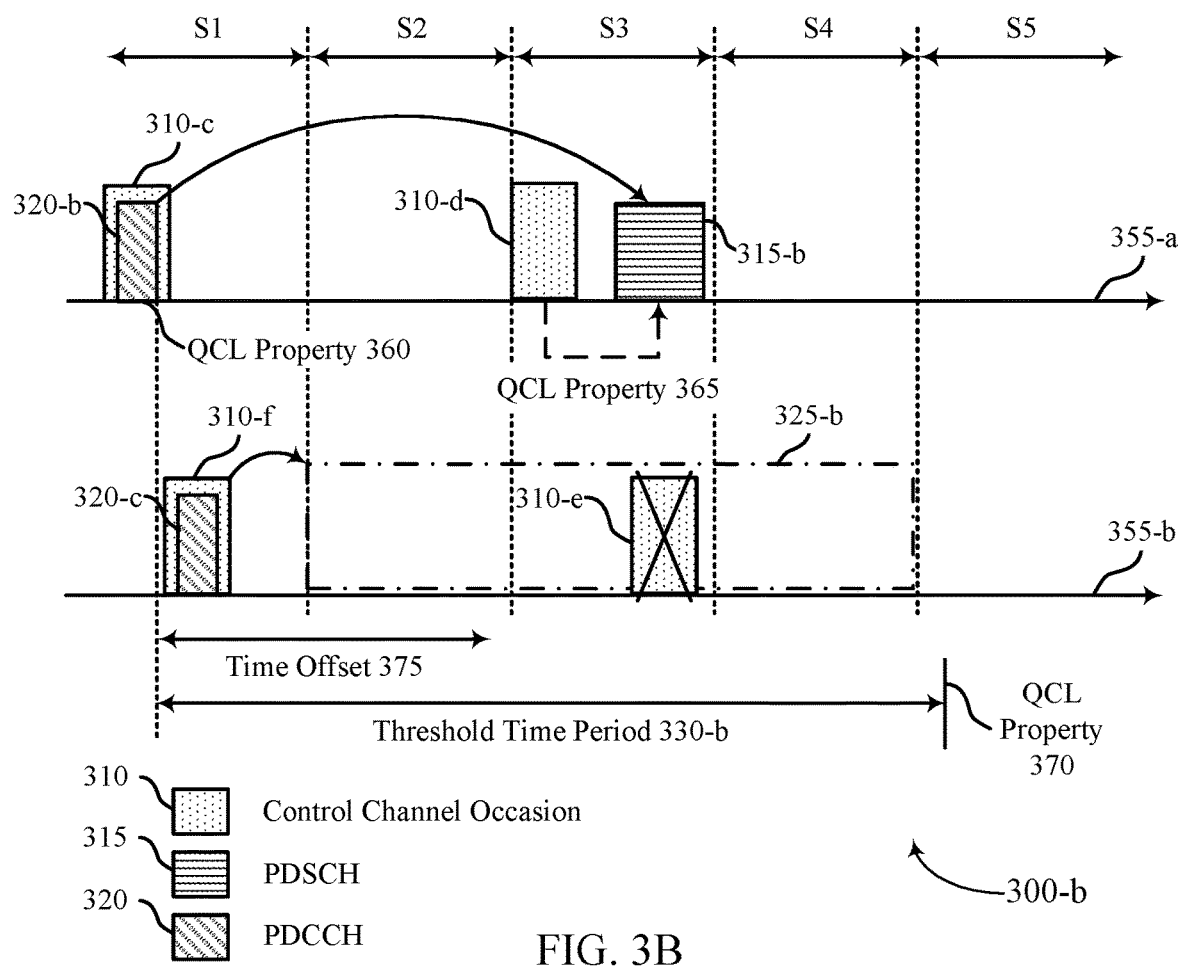

FIG. 3B illustrates an example of a communication sequence 300-*b* that supports techniques for communicating data channel transmissions in accordance with one or more aspects of the present disclosure. The communication sequence 300-*b* may implement aspects of the wireless communications systems 100 and 200 or may be implemented by aspects of the wireless communications system 100 and 200 as described with reference to FIGS. 1 and 2, respectively. For example, the communication sequence 300-*b* may be implemented by a UE 115 and a base station 105 for QCL property and dropping behavior determination in conjunction with PDCCH skipping.

The communication sequence 300-*b* depicts communications between the UE 115 and the base station 105 over a quantity of slots S (e.g., over slots S1, S2, S3, S4, and S5, although other time intervals or slot quantities are possible) and over resources 355-*a* and resources 355-*b*. The resources 355-*a* may correspond to a first set of frequency resources over a first set of time resources (e.g., the slots S), and the resources 355-*b* may correspond to a second set of frequency resources over the first set of time resources. In some examples, the resources 355-*a* may correspond to a first component carrier and the resources 355-*b* may correspond to a second component carrier that overlap in time.

In the example of FIG. 3B, the UE 115 may monitor a control channel occasion 310-*c* and receive a PDCCH 320-*b* from the base station 105 during the control channel occasion 310-*c* (e.g., over the resources 355-*a*, over the first component carrier). The PDCCH 320-*b* may schedule a transmission of a PDSCH 315-*b* (e.g., via DCI) within a threshold time period 330-*b* (e.g., from reception of the PDCCH 320-*b*). The UE 115 may receive an indication to perform PDCCH skipping during a time window 325-*b*. For example, the UE 115 may receive a PDCCH 320-*c* (e.g., over the resources 355-*b*, over the second component carrier) in a control channel occasion 310-*f* (which may or may not overlap in time with the control channel occasion 310-*c*) that indicates for the UE 115 to skip the monitoring of control channel occasions 310 that occur within the time window 325-*b* (e.g., a control channel occasion 310-*e*, other control channel occasions 310 within the time window 325-*b* (not shown)).

The control channel occasion 310-*c* may be associated with a QCL property 360. For example, the base station 105 may transmit the PDCCH 320-*b* in a CORESET of the control channel occasion 310-*c* (e.g., a search space set of the CORESET), and the CORESET may correspond to the QCL property 360. That is, the UE 115 may receive the PDCCH 320-*b* in accordance with the QCL property 360 based on receiving the PDCCH 320-*b* in the CORESET.

The PDCCH 320-*b* may indicate a threshold time period 330-*b* that is associated with a QCL property 370. For example, the PDCCH 320-*b* may indicate the QCL property 370 which the UE 115 may use to receive PDSCHs 315 transmitted after the expiration of the threshold time period 330-*b*. In the example of FIG. 3B, the PDCCH 320-*b* may schedule the transmission of the PDSCH 315-*b* within the threshold time period 330-*b*. Accordingly, a QCL property associated with the PDSCH 315-*b* may be different from the QCL property 370.

The UE 115 may determine a dropping behavior associated with the PDSCH 315-*b* based on actually monitored control channel occasions 310. For example, the PDCCH 320-*c* may indicate for the UE 115 to skip the monitoring of the control channel occasion 310-*e*, which may at least partially overlap in time with the PDSCH 315-*b*. Thus, the control channel occasion 310-*e* may be considered unmonitored by the UE 115 (e.g., and the base station 105). The control channel occasion 310-*e* may be associated with dropping the PDSCH 315-*b*. For example, in some cases, the UE 115 may drop reception of the PDSCH 315-*b* in order to monitor the control channel occasion 310-*e*. However, because the control channel occasion 310-*e* is unmonitored, the UE 115 may instead determine the dropping behavior associated with the PDSCH 315-*b* and a corresponding QCL property associated with the PDSCH 315-*a* as if the control channel occasion 310-*e* did not occur or was non-overlapping in time with the PDSCH 315-*b*. For example, the UE 115 may refrain from dropping reception of (e.g., receive) the PDSCH 315-*b* based on skipping the monitoring of the control channel occasion 310-*e*.

Additionally, the UE 115 may determine the QCL property associated with the PDSCH 315-*b* based on the monitored control channel occasions 310 that occur over the resources 355-*a*. For example, the UE 115 may monitor a control channel occasion 310-*d* associated with a QCL property 365 that corresponds to a control channel occasion 310 that occurs before and closest to the PDSCH 315-*b* in time. The UE 115 may determine that the QCL property associated with the PDSCH 315-*b* is the QCL property 365 based on monitoring the control channel occasion 310-*d* and skipping the monitoring of the control channel occasion 310-*e*. Additionally, the base station 105 may determine that the QCL property associated with the PDSCH 315-*b* is the QCL property 365 based on indicating for the UE 115 to skip the monitoring of the control channel occasion 310-*e*. In some examples, if the UE 115 is configured to also skip the monitoring of the control channel occasion 310-*d*, the UE 115 (e.g., and the base station 105) may determine that the QCL property associated with the PDSCH 315-*b* is the QCL property 360 based on monitoring the control channel occasion 310-*c* and skipping the monitoring of the control channel occasion 310-*d* and the control channel occasion 310-*e*. The UE 115 may receive the PDSCH 315-*b* from the base station 105 in accordance with the QCL property 365 based on the determination.

In some examples, the UE 115 (e.g., and the base station 105) may determine the QCL property and the dropping behavior associated with the PDSCH 315-*b* based on a time offset 375. For example, the time offset 375 may correspond to a time after which the UE 115 may cancel the monitoring of a control channel occasion 310 in response to receiving a PDCCH 320 that indicates for the UE 115 to perform PDCCH skipping. In the example of FIG. 3B, the control channel occasion 310-*e* may occur temporally after the time offset 375, and thus, in some cases, the UE 115 may cancel the monitoring of the control channel occasion 310-*e*. As a result, based on receiving the PDSCH 315-*b* after the time offset 375 (e.g., and canceling the monitoring of the control channel occasion 310-*e*), the UE 115 may determine the QCL property associated with the PDSCH 315-*b* based on the actually monitored control channel occasions 310. That is, the QCL property associated with the PDSCH 315-*b* may correspond to the QCL property 365 based on the PDSCH 315-*b* being received (e.g., and the control channel occasion 310-*e* occurring) after the time offset 375.

Figure 4A:
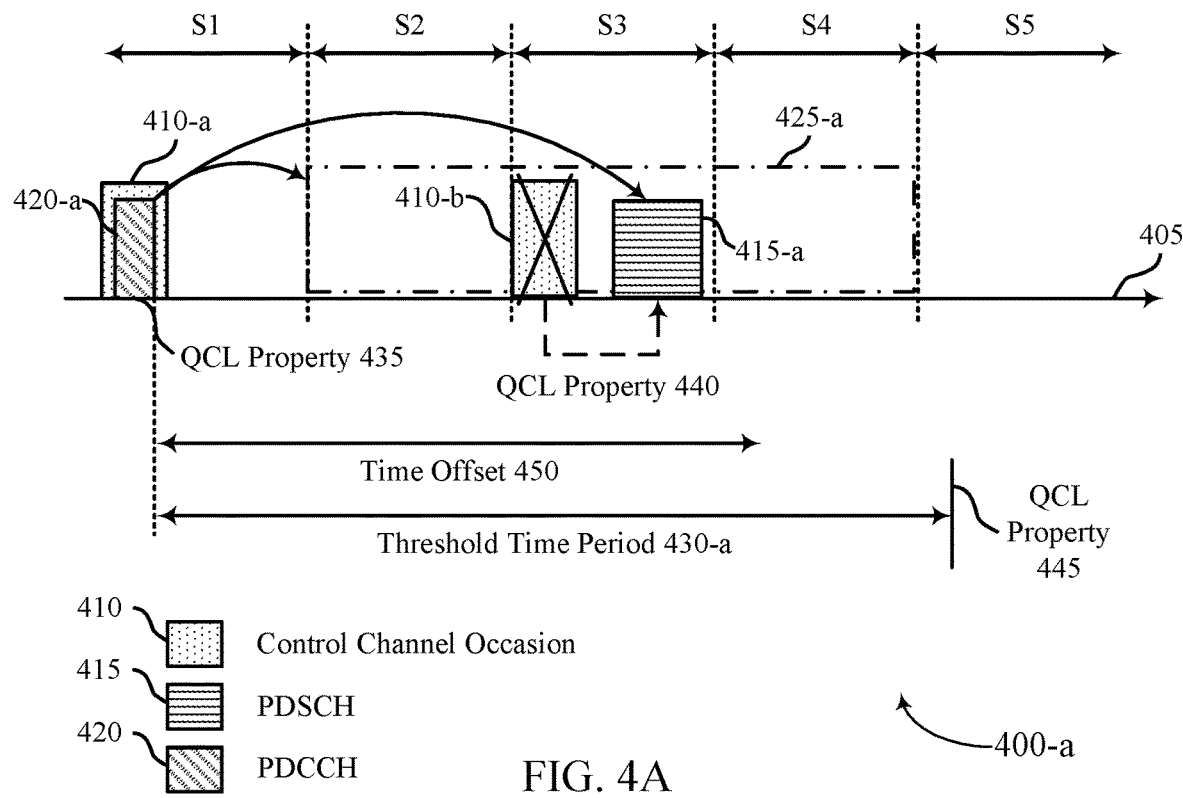

FIG. 4A illustrates an example of a communication sequence 400-*a* that supports techniques for communicating data channel transmissions in accordance with one or more aspects of the present disclosure. The communication sequence 300-*a* may implement aspects of the wireless communications systems 100 and 200 or may be implemented by aspects of the wireless communications system 100 and 200 as described with reference to FIGS. 1 and 2, respectively. For example, the communication sequence 400-*a* may be implemented by a UE 115 and a base station 105 for QCL property determination in conjunction with PDCCH skipping.

The communication sequence 400-*a* depicts communications between the UE 115 and the base station 105 over a quantity of slots S (e.g., over slots S1, S2, S3, S4, and S5, although other time intervals or slot quantities are possible) and over a carrier 405 (e.g., a component carrier). In the example of FIG. 4A, the UE 115 may monitor a control channel occasion 410-*a* and receive a PDCCH 420-*a* from the base station 105 during the control channel occasion 410-*a*. The PDCCH 420-*a* may indicate for the UE 115 to skip the monitoring of control channel occasions 410 that occur during a time window 425-*a* (e.g., a control channel occasion 410-*b*, other control channel occasions 410 within time window 425-*a* (not shown)). Additionally, the PDCCH 420-*a* may schedule a transmission of a PDSCH 415-*a*. In some examples, the PDCCH 420-*a* may include DCI that schedules the PDSCH 415-*a*, indicates for the UE 115 to perform PDCCH skipping during the time window 425-*a*, or both.

The control channel occasion 410-*a* may be associated with a QCL property 435. For example, the base station 105 may transmit the PDCCH 420-*a* in a CORESET of the control channel occasion 410-*a* (e.g., a search space set of the CORESET), and the CORESET may correspond to the QCL property 435. That is, the UE 115 may receive the PDCCH 420-*a* in accordance with the QCL property 435 based on receiving the PDCCH 420-*a* in the CORESET.

The PDCCH 420-*a* may indicate a threshold time period 430-*a* (e.g., from reception of the PDCCH 420-*a*) that is associated with a QCL property 445. For example, the PDCCH 420-*a* may indicate the QCL property 445, which the UE 115 may use to receive PDSCHs 415 transmitted after the expiration of the threshold time period 430-*a*. In the example of FIG. 4A, the PDCCH 420-*a* may schedule the transmission of the PDSCH 415-*a* within the threshold time period 430-*a*. Accordingly, a QCL property associated with the PDSCH 415-*a* may be different from the QCL property 445.

The UE 115 may determine the QCL property associated with the PDSCH 415-*a* based on configured control channel occasions 410. For example, the PDCCH 420-*a* may indicate for the UE 115 to skip the monitoring of the control channel occasion 410-*b*, which may correspond to a control channel occasion 410 that occurs before and closest to the PDSCH 415-*a* in time. Thus, the control channel occasion 410-*b* may be considered unmonitored by the UE 115 (e.g., and the base station 105). However, the control channel occasion 410-*b* may be a configured control channel occasion 410 based on the UE 115 being configured to monitor the control channel occasion 410-*b* (e.g., prior to receiving the PDCCH 420-*a*). The control channel occasion 410-*b* may be associated with a QCL property 440, and the UE 115 may determine that the QCL property associated with the PDSCH 415-*a* is the QCL property 440 based on the control channel occasion 410-*b* being previously configured for monitoring (e.g., despite skipping the monitoring of the control channel occasion 410-*b*). Additionally, the base station 105 may determine that the QCL property associated with the PDSCH 415-*a* is the QCL property 440 based the control channel occasion 410-*b* being configured for monitoring. The UE 115 may receive the PDSCH 415-*a* from the base station 105 in accordance with the QCL property 440 based on the determination.

In some examples, the UE 115 (e.g., and the base station 105) may determine the QCL property associated with the PDSCH 415-*a* based on a time offset 450. For example, the time offset 450 may correspond to a time after which the UE 115 may cancel the monitoring of a control channel occasion 410 in response to receiving the PDCCH 420-*a*. In the example of FIG. 4A, the control channel occasion 410-*b* may occur temporally before the time offset 450, and thus, in some cases, the UE 115 may be unable to cancel the monitoring of the control channel occasion 410-*b*. As a result, based on receiving the PDSCH 415-*a* before the time offset 450 (e.g., and being unable to cancel monitoring of the control channel occasion 410-*b*), the UE 115 may determine the QCL property associated with the PDSCH 315-*b* based on the configured control channel occasions 310. That is, the QCL property associated with the PDSCH 315-*b* may correspond to the QCL property 440 based on the PDSCH 315-*b* being received (e.g., and the control channel occasion 310-*b* occurring) before the time offset 450.

Figure 4B:
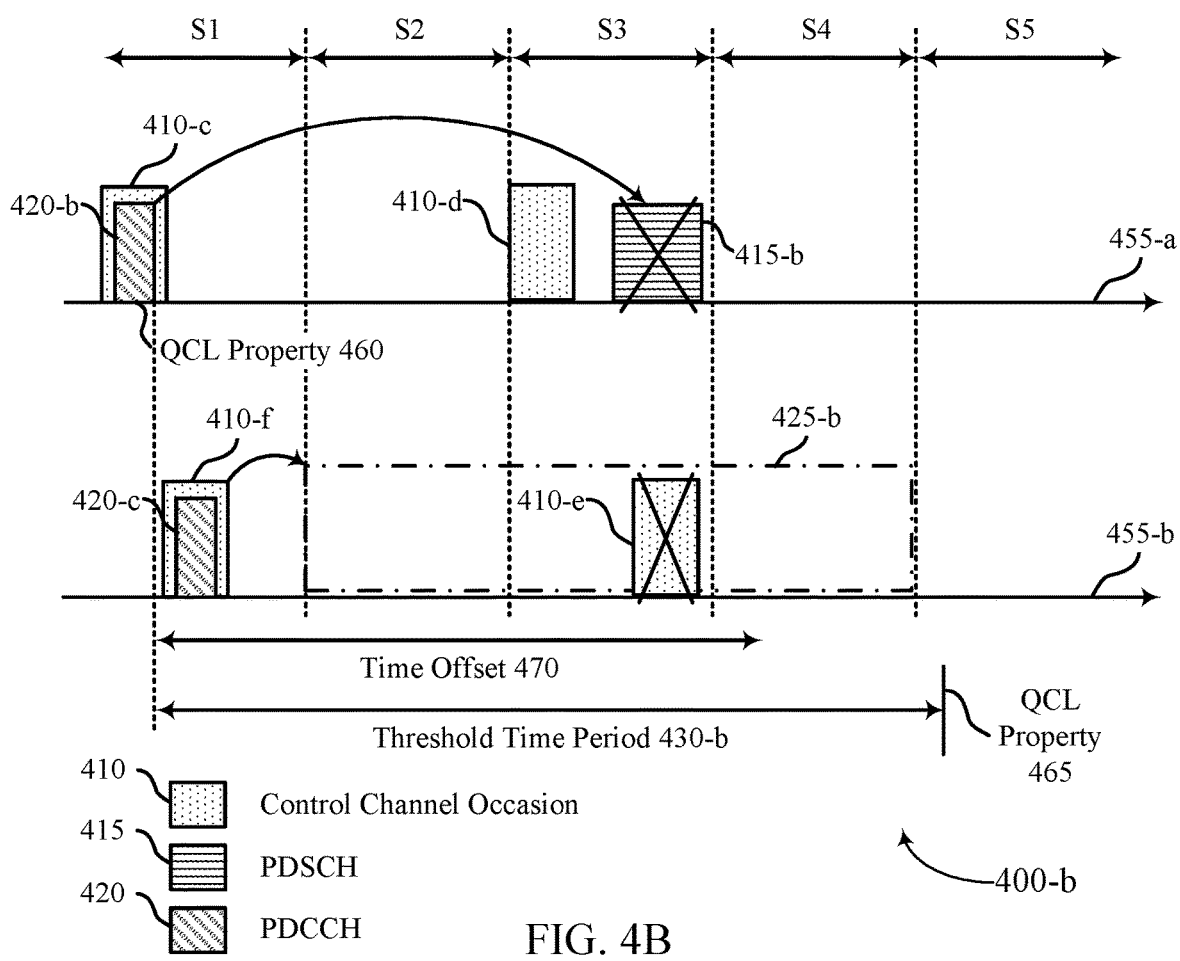

FIG. 4B illustrates an example of a communication sequence 400-*b* that supports techniques for communicating data channel transmissions in accordance with one or more aspects of the present disclosure. The communication sequence 400-*b* may implement aspects of the wireless communications systems 100 and 200 or may be implemented by aspects of the wireless communications system 100 and 200 as described with reference to FIGS. 1 and 2, respectively. For example, the communication sequence 400-*b* may be implemented by a UE 115 and a base station 105 for dropping behavior determination in conjunction with PDCCH skipping.

The communication sequence 400-*b* depicts communications between the UE 115 and the base station 105 over a quantity of slots S (e.g., over slots S1, S2, S3, S4, and S5, although other time intervals or slot quantities are possible) and over resources 455-*a* and resources 455-*b*. The resources 455-*a* may correspond to a first set of frequency resources over a first set of time resources (e.g., the slots S), and the resources 455-*b* may correspond to a second set of frequency resources over the first set of time resources. In some examples, the resources 455-*a* may correspond to a first component carrier and the resources 455-*b* may correspond to a second component carrier that overlap in time.

In the example of FIG. 4B, the UE 115 may monitor a control channel occasion 410-*b* and receive a PDCCH 420-*b* from the base station 105 during the control channel occasion 410-*c* (e.g., over the resources 455-*a*, over the first component carrier). The PDCCH 420-*b* may schedule a transmission of a PDSCH 415-*b* (e.g., via DCI) within a threshold time period 430-*b* (e.g., from reception of the PDCCH 420-*b*). The UE 115 may receive an indication to perform PDCCH skipping during a time window 425-*b*. For example, the UE 115 may receive a PDCCH 420-*c* (e.g., over the resources 455-*b*, over the second component carrier) in a control channel occasion 410-*f* (which may or may not overlap in time with the control channel occasion 410-*c*) that indicates for the UE 115 to skip the monitoring of control channel occasions 410 that occur within the time window 425-*b* (e.g., a control channel occasion 410-*e*, other control channel occasions 410 within the time window 425-*b* (not shown)).

The control channel occasion 410-*c* may be associated with a QCL property 360. For example, the base station 105 may transmit the PDCCH 320-*b* in a CORESET of the control channel occasion 410-*c* (e.g., a search space set of the CORESET), and the CORESET may correspond to the QCL property 460. That is, the UE 115 may receive the PDCCH 420-*b* in accordance with the QCL property 460 based on receiving the PDCCH 420-*b* in the CORESET.

The PDCCH 420-*b* may indicate a threshold time period 430-*b* that is associated with a QCL property 465. For example, the PDCCH 420-*b* may indicate the QCL property 465 which the UE 115 may use to receive PDSCHs 415 transmitted after the expiration of the threshold time period 430-*b*. In the example of FIG. 4B, the PDCCH 420-*b* may schedule the transmission of the PDSCH 415-*b* within the threshold time period 430-*b*. Accordingly, a QCL property associated with the PDSCH 415-*b* may be different from the QCL property 465.

The UE 115 may determine a dropping behavior associated with the PDSCH 415-*b* based on configured control channel occasions 310. For example, the PDCCH 420-*c* may indicate for the UE 115 to skip the monitoring of the control channel occasion 410-*e*, which may at least partially overlap in time with the PDSCH 415-*b*. Thus, the control channel occasion 410-*e* may be considered unmonitored by the UE 115 (e.g., and the base station 105). However, the control channel occasion 410-*e* may be a configured control channel occasion 410 based on the UE 115 being configured to monitor the control channel occasion 410-*e* (e.g., prior to receiving the PDCCH 420-*b*). The control channel occasion 410-*e* may be associated with dropping the PDSCH 415-*b*. For example, in some cases, the UE 115 may drop reception of the PDSCH 415-*b* in order to monitor the control channel occasion 410-*e*. Here, the UE 115 may determine the dropping behavior associated with the PDSCH 415-*b* as if the control channel occasion 410-*e* was monitored (e.g., despite skipping the monitoring of the control channel occasion 410-*e*). For example, the UE 115 may drop reception of the PDSCH 415-*b* based on the control channel occasion 410-*e* being configured for monitoring (e.g., and overlapping in time with the PDSCH 415-*b*).

In some examples, the UE 115 (e.g., and the base station 105) may determine the dropping behavior associated with the PDSCH 415-*a* based on a time offset 470. For example, the time offset 470 may correspond to a time after which the UE 115 may cancel the monitoring of a control channel occasion 410 in response to receiving a PDCCH 420 that indicates for the UE 115 to perform PDCCH skipping. In the example of FIG. 4B, the control channel occasion 410-*e* may occur temporally before the time offset 470, and thus, in some cases, the UE 115 may be unable to cancel the monitoring of the control channel occasion 410-*e*. As a result, based on the PDSCH 415-*b* being transmitted before the time offset 470 (e.g., and being unable to cancel the monitoring of the control channel occasion 410-*e*), the UE 115 may determine the dropping behavior associated with the PDSCH 415-*b* based on the configured control channel occasions 410. That is, the UE 115 may determine to drop reception of the PDSCH 415-*b* based on the PDSCH 315-*b* being transmitted (e.g., and the control channel occasion 410-*e* occurring) before the time offset 470.

Figure 5:
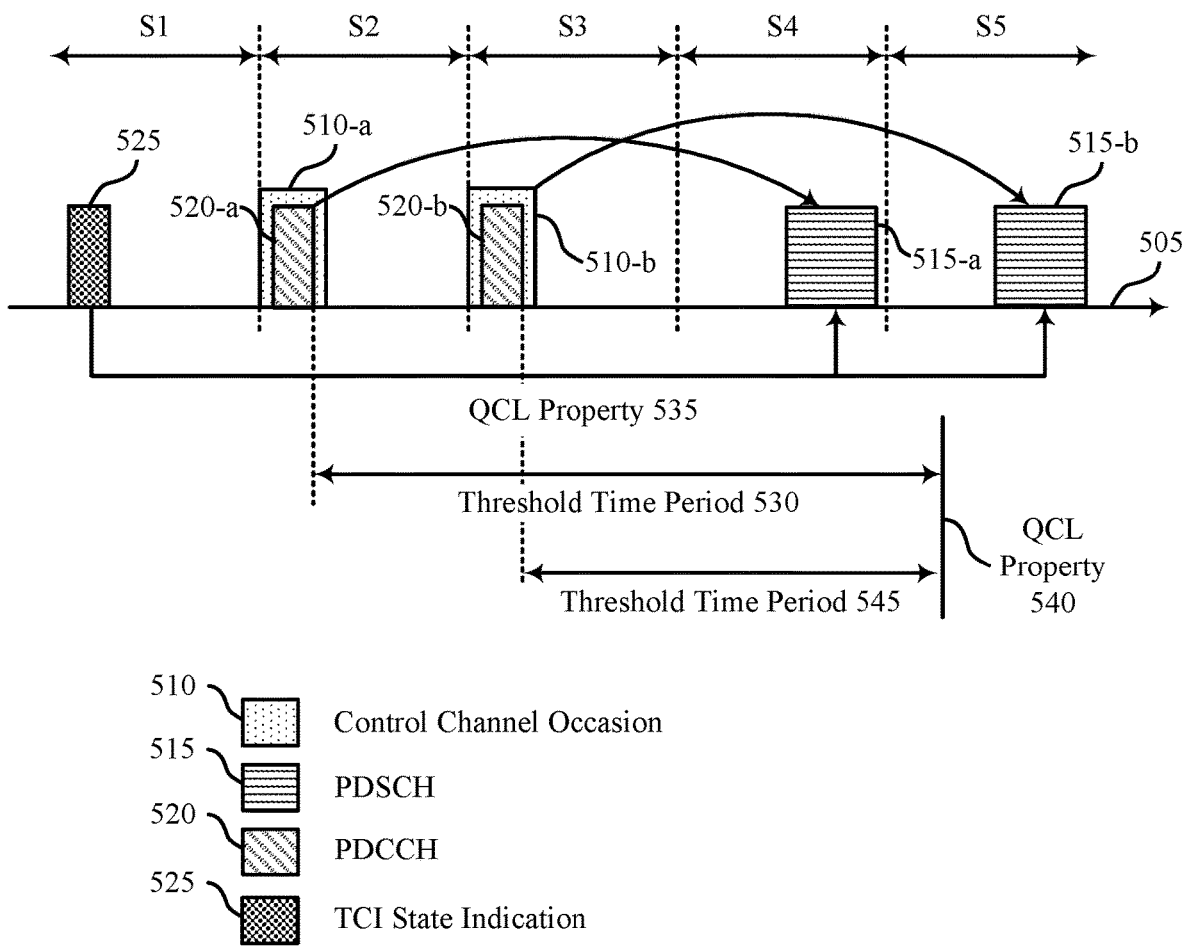

FIG. 5 illustrates an example of a communication sequence 500 that supports techniques for communicating data channel transmissions in accordance with one or more aspects of the present disclosure. The communication sequence 500 may implement aspects of the wireless communications systems 100 and 200 or may be implemented by aspects of the wireless communications system 100 and 200 as described with reference to FIGS. 1 and 2, respectively. For example, the communication sequence 500 may be implemented by a UE 115 and a base station 105 for QCL property determination in conjunction with unified TCI state indications.

The communication sequence 500 depicts communications between the UE 115 and the base station 105 over a quantity of slots S (e.g., over slots S1, S2, S3, S4, and S5, although other time intervals or slot quantities are possible) and over a carrier 505 (e.g., a component carrier). In the example of FIG. 5, the UE 115 may monitor a control channel occasion 510-*a* and receive a PDCCH 520-*a* from the base station 105 during the control channel occasion 510-*a*. The PDCCH 520-*a* may schedule a transmission of a PDSCH 515-*a* within a threshold time period 530 (e.g., from reception of the PDCCH 520-*a*). In some examples, the PDCCH 520-*a* may include DCI that schedules the PDSCH 515-*a*. In some examples, the threshold time period 530 may be associated with a QCL property 540. For example, the PDCCH 520-*a* may indicate the QCL property 540, which, in some cases, the UE 115 may use to receive PDSCHs 515 transmitted after the expiration of the threshold time period 530. In the example of FIG. 5, the PDCCH 520-*a* may schedule the transmission of the PDSCH 515-*a* within the threshold time period 530. Accordingly, a QCL property associated with the PDSCH 515-*a* may be different from the QCL property 540.

The UE 115 may additionally receive a TCI state indication 525 (e.g., from the base station 105) that indicates a unified TCI state. In some examples, the UE 115 may receive the TCI state indication 525 in a control channel occasion 510 (not shown). In some cases, the UE 115 may receive the TCI state indication 525 via RRC signaling or DCI. The unified TCI state may be associated with a QCL property 535, which the UE 115 may use in reception of PDSCHs 515.

For example, the UE 115 may determine the QCL property associated with the PDSCH 515 to be the QCL property 535 that is associated with the unified TCI state. Accordingly, the UE 115 may receive (e.g., and the base station 105 may transmit) the PDSCH 515-*a* in accordance with the QCL property 535 based on the TCI state indication 525 indicating the unified TCI state.

The UE 115 may additionally determine a QCL property associated with PDSCHs 515 transmitted after an expiration of a threshold time period based on the unified TCI state. For example, the UE 115 may monitor a control channel occasion 510-*b* and may receive a PDCCH 520-*b* from the base station 105 during the control channel occasion 510-*b*. The PDCCH 520-*b* may schedule the transmission of a PDSCH 515-*b* outside (e.g., after) a threshold time period 545 (e.g., from reception of the PDCCH 520-*b*) indicated by the PDCCH 520-*b*, where the threshold time period 545 (e.g., an expiration of the threshold time period 545) is associated with the QCL property 540. Here, the UE 115 may determine that the QCL property associated with the PDSCH 515-*b* is the QCL property 535 based on receiving the TCI state indication 525 (e.g., despite receiving the PDSCH 515-*b* after the threshold time period 545) and may receive the PDSCH 515-*b* from the base station in accordance with the QCL property 535.

In some examples, the PDCCH 520-*a* and the PDCCH 520-*b* may exclude an indication of the threshold time period 530 and the threshold time period 545, respectively, based on implementing a unified TCI state framework to indicate QCL properties for PDSCH 515 reception (e.g., based on receiving the TCI state indication 525).

Figure 6:
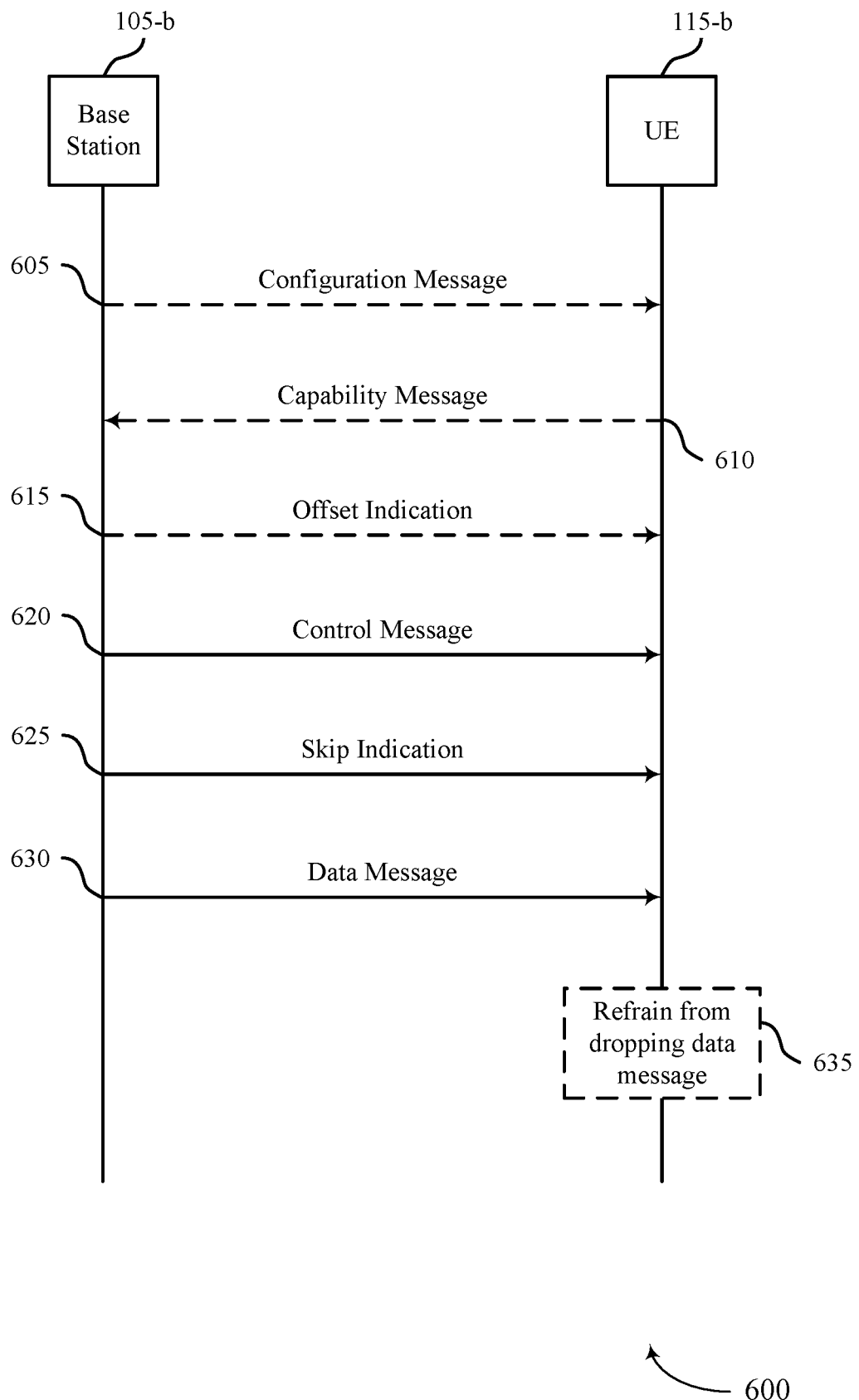
FIGS. 6 through 8 illustrate examples of process flows that support techniques for communicating data channel transmissions in accordance with one or more aspects of the present disclosure.

FIG. 6 illustrates an example of a process flow 600 that supports techniques for communicating data channel transmissions in accordance with one or more aspects of the present disclosure. The process flow 600 may implement aspects of the wireless communications systems 100 and 200 or may be implemented by aspects of the wireless communications system 100 and 200 as described with reference to FIGS. 1 and 2, respectively. For example, the process flow 600 may be implemented by a base station 105-*b* and a UE 115-*b* to support QCL property and/or dropping behavior determinations for data messages to reduce processing complexity, increase communication reliability, and increase resource utilization. The process flow 600 may further be implemented by the base station 105-b and the UE 115-b to increase coordination between devices, increase data rates, and increase spectral efficiency.

The base station 105-b and the UE 115-b may be examples of a base station 105 and a UE 115, respectively, as described with reference to FIGS. 1 and 2. In the following description of the process flow 600, the operations may be performed in different orders or at different times. Some operations may also be omitted from the process flow 600, and other operations may be added to the process flow 600.

At 605, the base station 105-b may transmit a configuration message to the UE 115-b. In some cases, the configuration message may configure the UE 115-b to monitor one or more control channel occasions (e.g., in accordance with DRX mode operations). In some examples, the base station 105-b may transmit the configuration message via RRC signaling. In some examples, the configuration message may indicate a time offset that the UE 115-b may use in determining QCL properties and/or dropping behaviors for data messages received from the base station 105-b when PDCCH skipping is configured.

At 610, the UE 115-b may transmit a capability message (e.g., via RRC signaling) to the base station 105-b that that indicates a capability of the UE 115-b to cancel the monitoring of a control channel occasion. For example, the capability message may indicate a duration (e.g., in slots, in milliseconds) for the UE 115-b to cancel the monitoring of a control channel occasion after receiving an indication to skip the monitoring of one or more control channel occasions. In some examples, a value of the time offset (e.g., indicated by the configuration message) may be based on (e.g., correspond to) the duration.

At 615, the base station 105-b may transmit an offset indication to the UE 115-b that indicates (e.g., the value of) the time offset. For example, in response to receiving the capability message, the base station 105-b may transmit the offset indication that indicates the time offset. In some cases, the base station 105-b may exclude the indication of the time offset from the configuration message (e.g., based on transmitting the offset indication). In some examples, the value of time offset may be based on a SCS associated with communications between the UE 115-b and the base station 105-b.

At 620, the base station 105-b may transmit a control message to the UE 115-b in a first control channel occasion. The UE 115-b may monitor the first control channel occasion and may receive the control message based on the monitoring. The first control channel occasion may be associated with a first QCL property. For example, the UE 115-b may receive the first control channel occasion in accordance with the first QCL property. The control message may schedule the transmission of a data message within a threshold time period (e.g., from reception of the control message) and may indicate a second QCL property associated with the data message that may be used if the data message is received after the threshold time period.

At 625, the base station 105-b may transmit a skip indication to the UE 115-b that indicates for the UE 115-b to skip the monitoring of a second control channel occasion that occurs within the threshold time period. For example, the skip indication may indicate for the UE 115-b to perform PDCCH skipping for a time window that spans at least the second control channel occasion. In some examples, the UE 115-b may skip the monitoring of the second control channel occasion in response to receiving the skip indication.

At 630, the UE 115-b may receive the scheduled data message in accordance with a third QCL property based on the skip indication. In some examples, the third QCL property may be based on the control channel occasions for which the UE 115-b is configured to monitor (e.g., the second control channel occasion being configured by the configuration message). In some other examples, the third QCL property may be based on the control channel occasions that are actually monitored by the UE 115-b. In some examples, the third QCL property may be based on whether the data message is received before or after the time offset. For example, if the data message is received before the time offset, the third QCL property may be based on the configured control channel occasions. Alternatively, if the data message is received after the time offset, the third QCL property may be based on the actually monitored control channel occasions.

At 635, the UE 115-b may refrain from dropping the scheduled data message. For example, the second control channel occasion may overlap in time with the scheduled data message, and the UE 115-b may refrain from dropping reception of the scheduled data message based on skipping the monitoring of the second control channel occasion.

Figure 7:
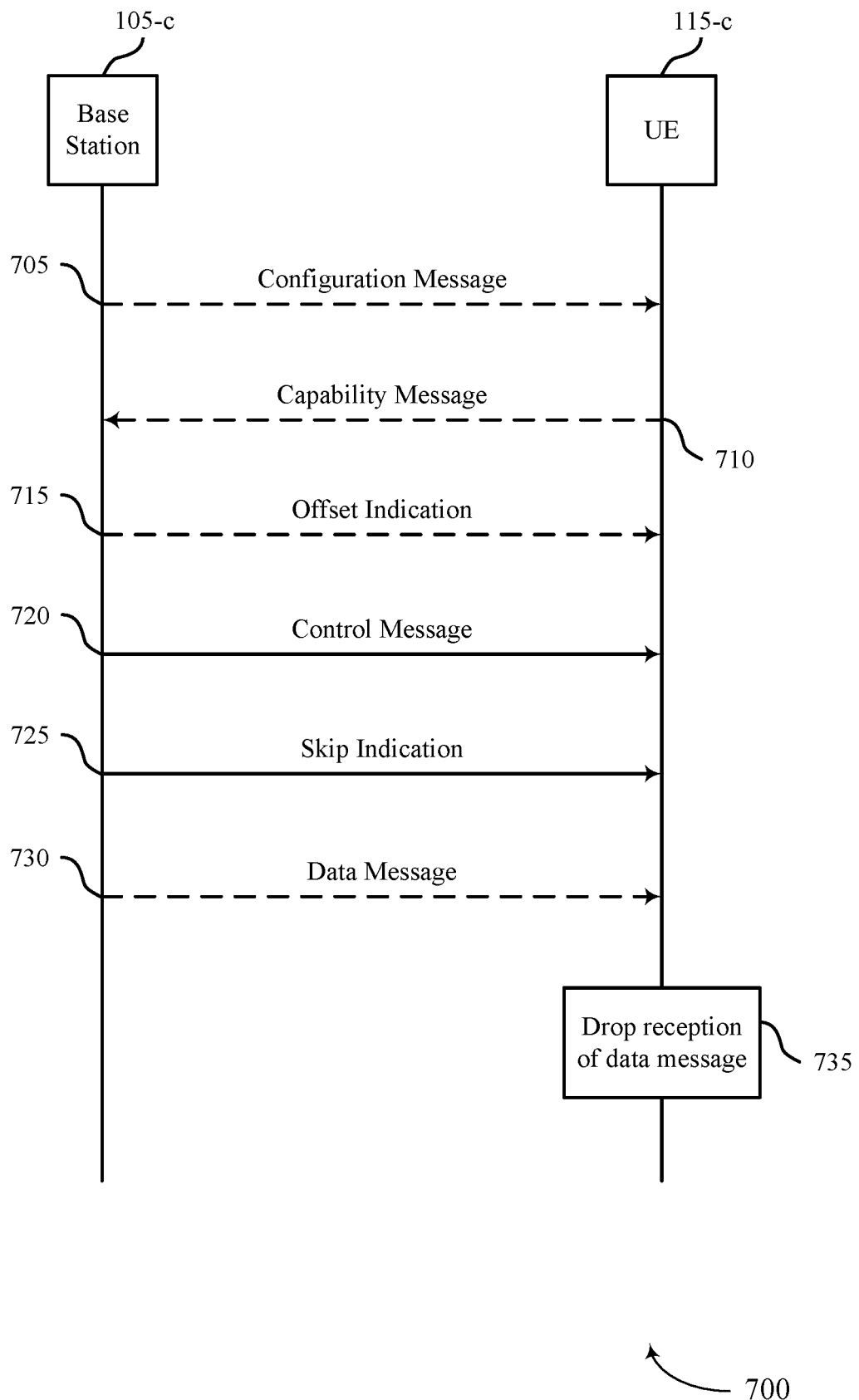

FIG. 7 illustrates an example of a process flow 700 that supports techniques for communicating data channel transmissions in accordance with one or more aspects of the present disclosure. The process flow 700 may implement aspects of the wireless communications systems 100 and 200 or may be implemented by aspects of the wireless communications system 100 and 200 as described with reference to FIGS. 1 and 2, respectively. For example, the process flow 700 may be implemented by a base station 105-c and a UE 115-c to support QCL property and/or dropping behavior determinations for data messages to reduce processing complexity, increase communication reliability, and increase resource utilization. The process flow 700 may further be implemented by the base station 105-c and the UE 115-c to increase coordination between devices, increase data rates, and increase spectral efficiency.

The base station 105-c and the UE 115-c may be examples of a base station 105 and a UE 115, respectively, as described with reference to FIGS. 1 and 2. In the following description of the process flow 700, the operations may be performed in different orders or at different times. Some operations may also be omitted from the process flow 700, and other operations may be added to the process flow 700.

At 705, the base station 105-c may transmit a configuration message to the UE 115-b. In some cases, the configuration message may configure the UE 115-b to monitor one or more control channel occasions (e.g., in accordance with DRX mode operations). In some examples, the base station 105-c may transmit the configuration message via RRC signaling. In some examples, the configuration message may indicate a time offset that the UE 115-c may use in determining QCL properties and/or dropping behaviors for data messages received from the base station 105-c when PDCCH skipping is configured.

At 710, the UE 115-c may transmit a capability message (e.g., via RRC signaling) to the base station 105-c that that indicates a capability of the UE 115-c to cancel the monitoring of a control channel occasion. For example, the capability message may indicate a duration (e.g., in slots, in milliseconds) for the UE 115-c to cancel the monitoring of a control channel occasion after receiving an indication to skip the monitoring of one or more control channel occasions. In some examples, a value of the time offset (e.g., indicated by the configuration message) may be based on (e.g., correspond to) the duration.

At 715, the base station 105-c may transmit an offset indication to the UE 115-c that indicates (e.g., the value of) the time offset. For example, in response to receiving the capability message, the base station 105-c may transmit the offset indication that indicates the time offset. In some cases, the base station 105-c may exclude the indication of the time offset from the configuration message (e.g., based on transmitting the offset indication). In some examples, the value of time offset may be based on a SCS associated with communications between the UE 115-c and the base station 105-c.

At 720, the base station 105-c may transmit a control message to the UE 115-c in a first control channel occasion. The UE 115-c may monitor the first control channel occasion and may receive the control message based on the monitoring. The first control channel occasion may be associated with a first QCL property. For example, the UE 115-c may receive the first control channel occasion in accordance with the first QCL property. The control message may schedule the transmission of a data message within a threshold time period (e.g., from reception of the control message) and may indicate a second QCL property associated with the data message that may be used if the data message is received after the threshold time period.

At 725, the base station 105-c may transmit a skip indication to the UE 115-c that indicates for the UE 115-c to skip the monitoring of a second control channel occasion that occurs within the threshold time period. For example, the skip indication may indicate for the UE 115-c to perform PDCCH skipping for a time window that spans at least the second control channel occasion. Here, the second control channel occasion may overlap in time with the data message. In some examples, the data message be scheduled for transmission in a first carrier (e.g., first component carrier) and the second control channel occasion may occur on a second carrier (e.g., second component carrier). In some examples, the UE 115-b may skip the monitoring of the second control channel occasion in response to receiving the skip indication.

At 730, the base station 105-c may transmit the data message to the UE 115-c. In some examples, the base station 105-c may refrain from transmitting the data message based on the second control channel occasion overlapping in time with the data message and the UE 115-c determining a dropping behavior for the data based on configured control channel occasions. In some cases, the base station 105-c may transmit the data message before the time offset.

At 735, the UE 115-c may drop reception of the data message. For example, the UE 115-c may be configured to determine a dropping behavior for the data message based on control channel occasions for which the UE 115-c is configured to monitor (e.g., via the configuration message). Accordingly, based on the second control channel occasion overlapping at least partially in time with the data message, the UE 115-c may drop reception of the data message (e.g., despite being configured to skip the monitoring of the second control channel occasion). In some examples, the UE 115-c may determine the dropping behavior based on configured monitoring control channel occasions due to receiving the data message before the time offset.

Figure 8:
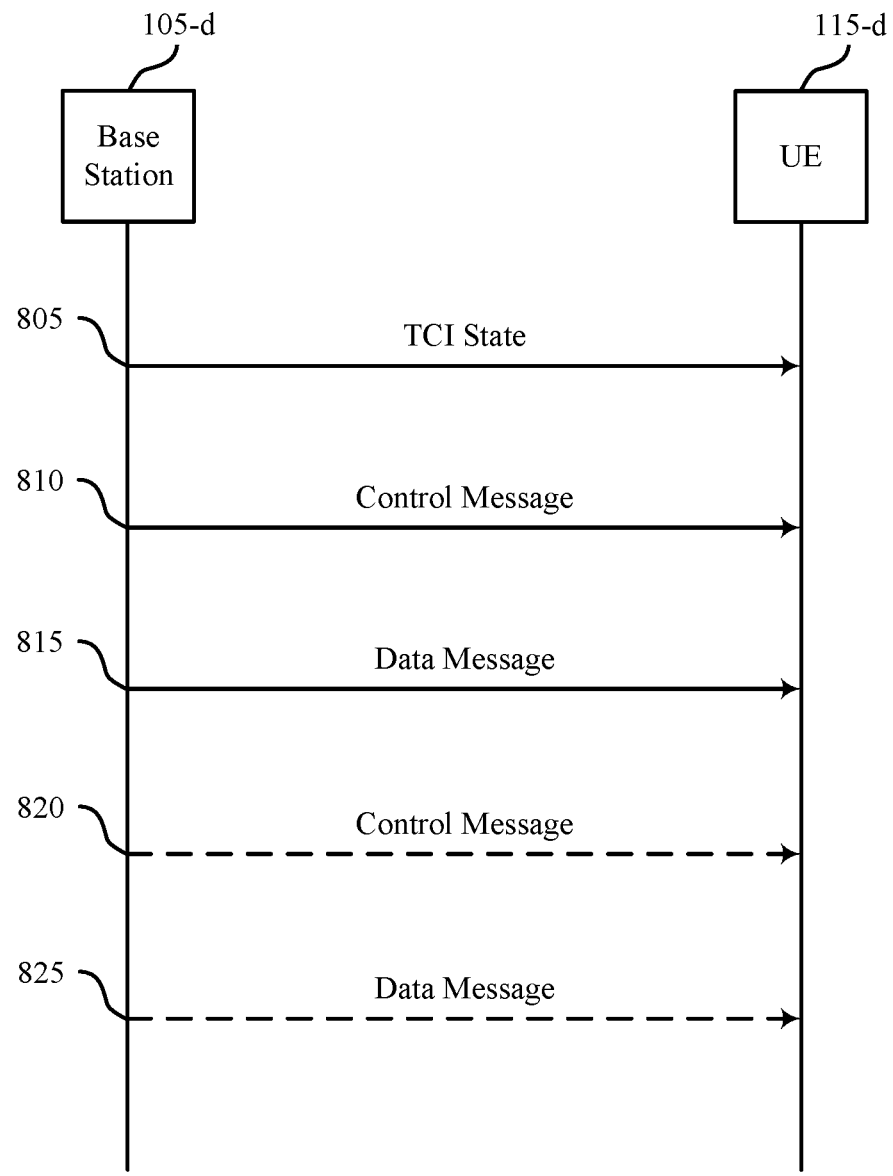

FIG. 8 illustrates an example of a process flow 800 that supports techniques for communicating data channel transmissions in accordance with one or more aspects of the present disclosure. The process flow 800 may implement aspects of the wireless communications systems 100 and 200 or may be implemented by aspects of the wireless communications system 100 and 200 as described with reference to FIGS. 1 and 2, respectively. For example, the process flow 800 may be implemented by a base station 105-d and a UE 115-d to support QCL property determinations for data messages to reduce processing complexity, increase communication reliability, and increase resource utilization. The process flow 800 may further be implemented by the base station 105-d and the UE 115-d to increase coordination between devices, increase data rates, and increase spectral efficiency.

The base station 105-d and the UE 115-d may be examples of a base station 105 and a UE 115, respectively, as described with reference to FIGS. 1 and 2. In the following description of the process flow 800, the operations may be performed in different orders or at different times. Some operations may also be omitted from the process flow 800, and other operations may be added to the process flow 800.

At 805, the base station 105-d may transmit an indication of a unified TCI state to the UE 115-d. The unified TCI state may be associated with a first QCL property. For example, the UE 115-d may determine the first QCL property from the unified TCI state.

At 810, the base station 105-d may transmit a control message to the UE 115-d that schedules the transmission of a data message within a threshold time period (e.g., from reception of the control message). In some examples, the control message may indicate the threshold time period and a second QCL property associated with the data message that may be used if the data message is received after the threshold time period. In some examples, the control message may exclude the indication of the threshold time period and the second QCL property based on transmitting the indication of the unified TCI state.

At 815, the base station 105-d may transmit and the UE 115-d may receive the data message in accordance with the first QCL property based on the indication of the unified TCI state.

At 820, the base station 105-d may transmit a second control message that schedules the transmission of a second data message outside (e.g., after) the threshold time period.

At 825, the base station 105-d may transmit and the UE 115-d may receive the second data message in accordance with the first QCL property based on the unified TCI state (e.g., despite communicating the second data message after the threshold time period).

Figure 9:
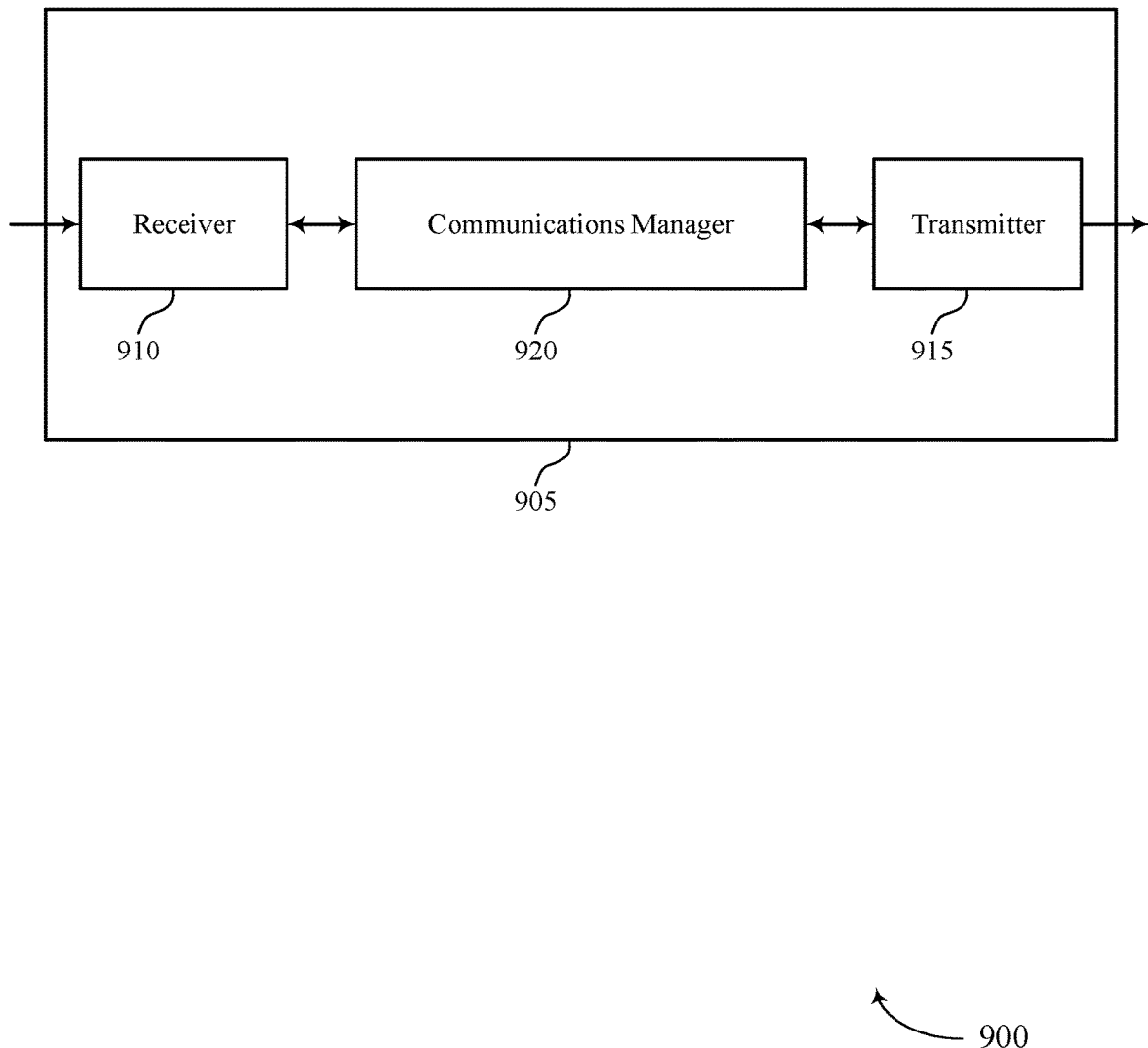
FIGS. 9 and 10 show block diagrams of devices that support techniques for communicating data channel transmissions in accordance with one or more aspects of the present disclosure.

FIG. 9 shows a block diagram 900 of a device 905 that supports techniques for communicating data channel transmissions in accordance with one or more aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for communicating data channel transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for communicating data channel transmissions). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for communicating data channel transmissions as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for receiving a control message in a first control channel occasion associated with a first QCL property, the control message indicating a transmission of a data message during a time period within a threshold time period. The communications manager 920 may be configured as or otherwise support a means for receiving an indication to skip monitoring of a second control channel occasion during the time period. The communications manager 920 may be configured as or otherwise support a means for receiving the data message in accordance with a second QCL property based on the indication to skip the monitoring of the second control channel occasion.

Additionally or alternatively, the communications manager 920 may support wireless communication at a UE in accordance with examples as disclosed herein. For example, the communications manager 920 may be configured as or otherwise support a means for receiving, in a first control channel occasion, a control message associated with a first QCL property, the control message indicating a transmission of a data message during a time period within a threshold time period. The communications manager 920 may be configured as or otherwise support a means for receiving an indication to skip monitoring of a second control channel occasion during the time period, the second control channel occasion overlapping in a time domain with the data message. The communications manager 920 may be configured as or otherwise support a means for dropping reception of the data message based on the indication to skip the monitoring of the second control channel occasion.

Additionally or alternatively, the communications manager 920 may support wireless communication at a UE in accordance with examples as disclosed herein. For example, the communications manager 920 may be configured as or otherwise support a means for receiving an indication of a TCI state associated with a first QCL property. The communications manager 920 may be configured as or otherwise support a means for receiving a control message indicating a transmission of a data message during a time period within a threshold time period. The communications manager 920 may be configured as or otherwise support a means for receiving the data message in accordance with the first QCL property based on the indication of the TCI state.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing complexity and more efficient utilization of communication resources, among other benefits, by supporting data channel communication management (e.g., in conjunction with PDCCH skipping, via TCI state indication).

Figure 10:
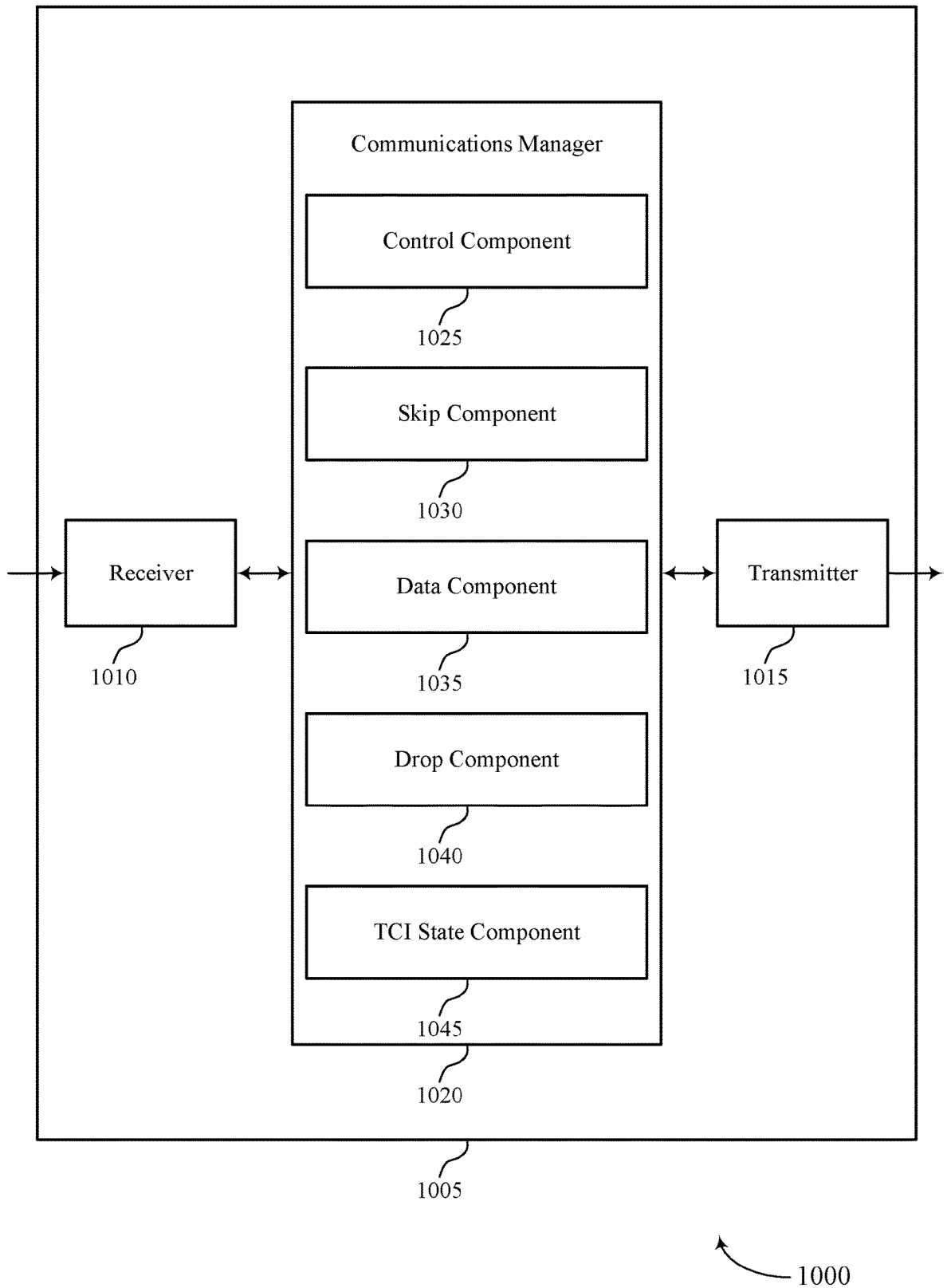

FIG. 10 shows a block diagram 1000 of a device 1005 that supports techniques for communicating data channel transmissions in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for communicating data channel transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for communicating data channel transmissions). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for communicating data channel transmissions as described herein. For example, the communications manager 1020 may include a control component 1025, a skip component 1030, a data component 1035, a drop component 1040, a TCI state component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The control component 1025 may be configured as or otherwise support a means for receiving a control message in a first control channel occasion associated with a first QCL property, the control message indicating a transmission of a data message during a time period within a threshold time period. The skip component 1030 may be configured as or otherwise support a means for receiving an indication to skip monitoring of a second control channel occasion during the time period. The data component 1035 may be configured as or otherwise support a means for receiving the data message in accordance with a second QCL property based on the indication to skip the monitoring of the second control channel occasion.

Additionally or alternatively, the communications manager 1020 may support wireless communication at a UE in accordance with examples as disclosed herein. The control component 1025 may be configured as or otherwise support a means for receiving, in a first control channel occasion, a control message associated with a first QCL property, the control message indicating a transmission of a data message during a time period within a threshold time period. The skip component 1030 may be configured as or otherwise support a means for receiving an indication to skip monitoring of a second control channel occasion during the time period, the second control channel occasion overlapping in a time domain with the data message. The drop component 1040 may be configured as or otherwise support a means for dropping reception of the data message based on the indication to skip the monitoring of the second control channel occasion.

Additionally or alternatively, the communications manager 1020 may support wireless communication at a UE in accordance with examples as disclosed herein. The TCI state component 1045 may be configured as or otherwise support a means for receiving an indication of a TCI state associated with a first QCL property. The control component 1025 may be configured as or otherwise support a means for receiving a control message indicating a transmission of a data message during a time period within a threshold time period. The data component 1035 may be configured as or otherwise support a means for receiving the data message in accordance with the first QCL property based on the indication of the TCI state.

Figure 11:
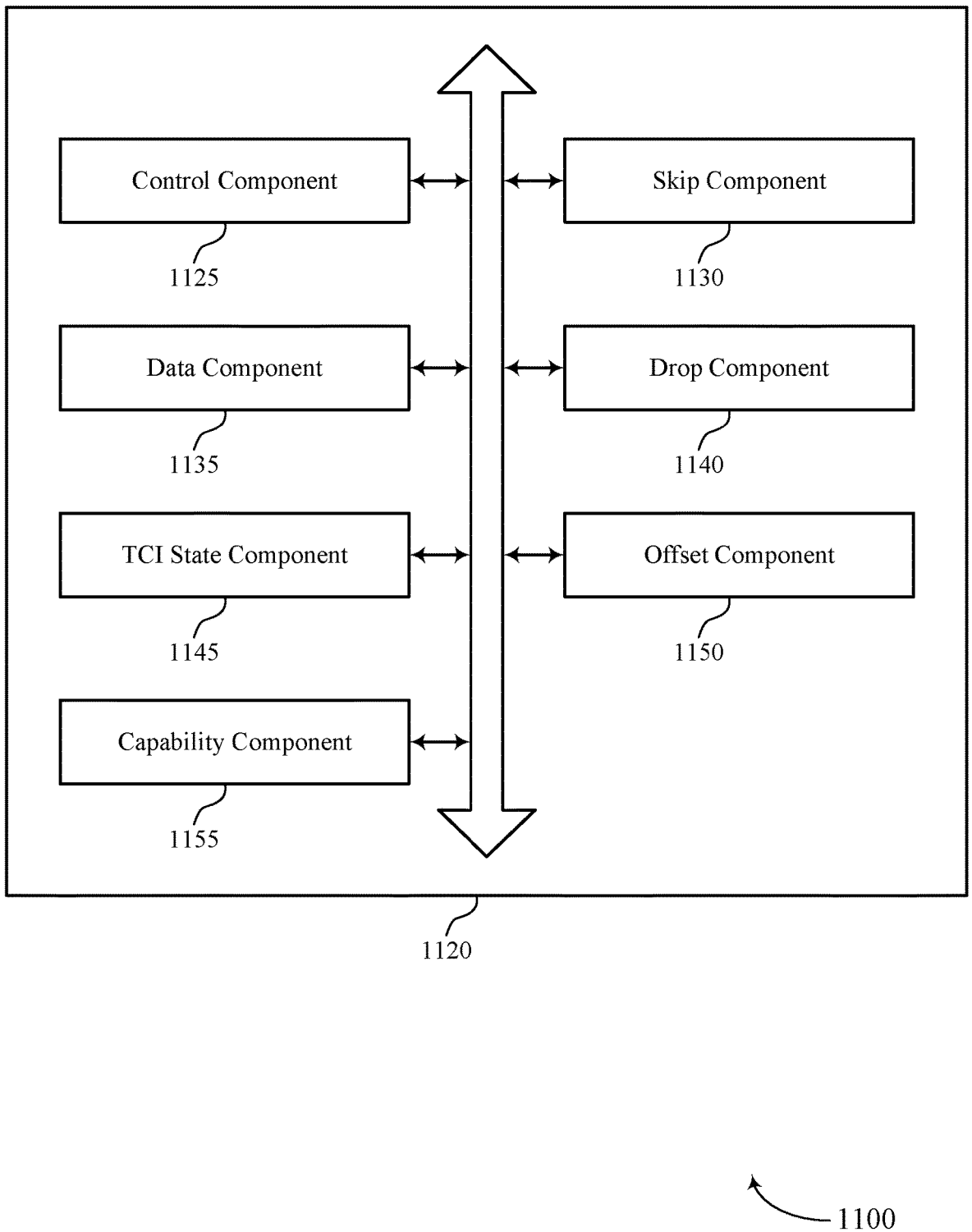
FIG. 11 shows a block diagram of a communications manager that supports techniques for communicating data channel transmissions in accordance with one or more aspects of the present disclosure.

FIG. 11 shows a block diagram 1100 of a communications manager 1120 that supports techniques for communicating data channel transmissions in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for communicating data channel transmissions as described herein. For example, the communications manager 1120 may include a control component 1125, a skip component 1130, a data component 1135, a drop component 1140, a TCI state component 1145, an offset component 1150, a capability component 1155, or any combination thereof. Each of these components may communicate, directly or indirectly, with one another (e.g., via one or more buses).

The communications manager 1120 may support wireless communication at a UE in accordance with examples as disclosed herein. The control component 1125 may be configured as or otherwise support a means for receiving a control message in a first control channel occasion associated with a first QCL property, the control message indicating a transmission of a data message during a time period within a threshold time period. The skip component 1130 may be configured as or otherwise support a means for receiving an indication to skip monitoring of a second control channel occasion during the time period. The data component 1135 may be configured as or otherwise support a means for receiving the data message in accordance with a second QCL property based on the indication to skip the monitoring of the second control channel occasion.

In some examples, the control component 1125 may be configured as or otherwise support a means for receiving a message that configures the monitoring of the second control channel occasion, the second control channel occasion associated with the second QCL property, where the second QCL property is based on the second control channel occasion being configured for monitoring.

In some examples, the second QCL property is the same as the first QCL property based on skipping the monitoring of the second control channel occasion and monitoring the first control channel occasion.

In some examples, the second QCL property corresponds to a third control channel occasion monitored during the time period based on the second control channel occasion overlapping in a time domain with the data message and skipping the monitoring of the second control channel occasion.

In some examples, to support receiving the indication, the skip component 1130 may be configured as or otherwise support a means for receiving the indication in a first carrier different from a second carrier associated with the first control channel occasion and the data message, where the second control channel occasion is associated with the first carrier and the third control channel occasion is associated with the second carrier.

In some examples, the drop component 1140 may be configured as or otherwise support a means for refraining from dropping reception of the data message based on skipping the monitoring of the second control channel occasion.

In some examples, the offset component 1150 may be configured as or otherwise support a means for receiving a second indication of a time offset within the threshold time period, where the second QCL property is based on whether the data message is received before the time offset.

In some examples, to support receiving the data message, the data component 1135 may be configured as or otherwise support a means for receiving the data message before the time offset. In some examples, the control component 1125 may be configured as or otherwise support a means for receiving a message that configures the monitoring of the second control channel occasion, the second control channel occasion associated with the second QCL property, where the second QCL property is based on the second control channel occasion being configured for monitoring and receiving the data message before the time offset.

In some examples, to support receiving the data message, the data component 1135 may be configured as or otherwise support a means for receiving the data message after the time offset, where the second QCL property is the same as the first QCL property based on receiving the data message after the time offset and skipping the monitoring of the second control channel occasion.

In some examples, to support receiving the data message, the data component 1135 may be configured as or otherwise support a means for receiving the data message after the time offset. In some examples, to receive the indication, the skip component 1130 may be configured as or otherwise support a means for receiving the indication in a first carrier different from a second carrier associated with the first control channel occasion and the data message, the second control channel occasion associated with the first carrier, where the second QCL property corresponds to a third control channel occasion associated with the second carrier and monitored during the time period based on receiving the data message after the time offset and skipping the monitoring of the second control channel occasion.

In some examples, the capability component 1155 may be configured as or otherwise support a means for transmitting a capability message that indicates a duration for the UE to cancel the monitoring of the second control channel occasion after receiving the indication to skip the monitoring of the second control channel occasion, where a value of the time offset is based on the duration.

In some examples, a value of the time offset is based on an SCS associated with the control message, the data message, or both.

In some examples, a configuration of a control channel occasion includes a CORESET for the control channel occasion and a search space set for the control channel occasion, the CORESET corresponding to a QCL property for the control channel occasion.

Additionally or alternatively, the communications manager 1120 may support wireless communication at a UE in accordance with examples as disclosed herein. In some examples, the control component 1125 may be configured as or otherwise support a means for receiving, in a first control channel occasion, a control message associated with a first QCL property, the control message indicating a transmission of a data message during a time period within a threshold time period. In some examples, the skip component 1130 may be configured as or otherwise support a means for receiving an indication to skip monitoring of a second control channel occasion during the time period, the second control channel occasion overlapping in a time domain with the data message. The drop component 1140 may be configured as or otherwise support a means for dropping reception of the data message based on the indication to skip the monitoring of the second control channel occasion.

In some examples, the control component 1125 may be configured as or otherwise support a means for receiving a message that configures the monitoring of the second control channel occasion, where dropping reception of the data message is based on the second control channel occasion being configured for monitoring.

In some examples, the offset component 1150 may be configured as or otherwise support a means for receiving a second indication of a time offset within the threshold time period, where dropping reception of the data message is based on the data message being transmitted before the time offset.

In some examples, the capability component 1155 may be configured as or otherwise support a means for transmitting a capability message that indicates a duration for the UE to cancel the monitoring of the second control channel occasion after receiving the indication to skip the monitoring of the second control channel occasion, where a value of the time offset is based on the duration.

In some examples, a value of the time offset is based on an SCS associated with the control message, the data message, or both.

Additionally or alternatively, the communications manager 1120 may support wireless communication at a UE in accordance with examples as disclosed herein. The TCI state component 1145 may be configured as or otherwise support a means for receiving an indication of a TCI state associated with a first QCL property. In some examples, the control component 1125 may be configured as or otherwise support a means for receiving a control message indicating a transmission of a data message during a time period within a threshold time period. In some examples, the data component 1135 may be configured as or otherwise support a means for receiving the data message in accordance with the first QCL property based on the indication of the TCI state.

In some examples, the control component 1125 may be configured as or otherwise support a means for receiving a second control message indicating a transmission of a second data message after the threshold time period. In some examples, the data component 1135 may be configured as or otherwise support a means for receiving the second data message in accordance with the first QCL property based on the indication of the TCI state.

Figure 12:
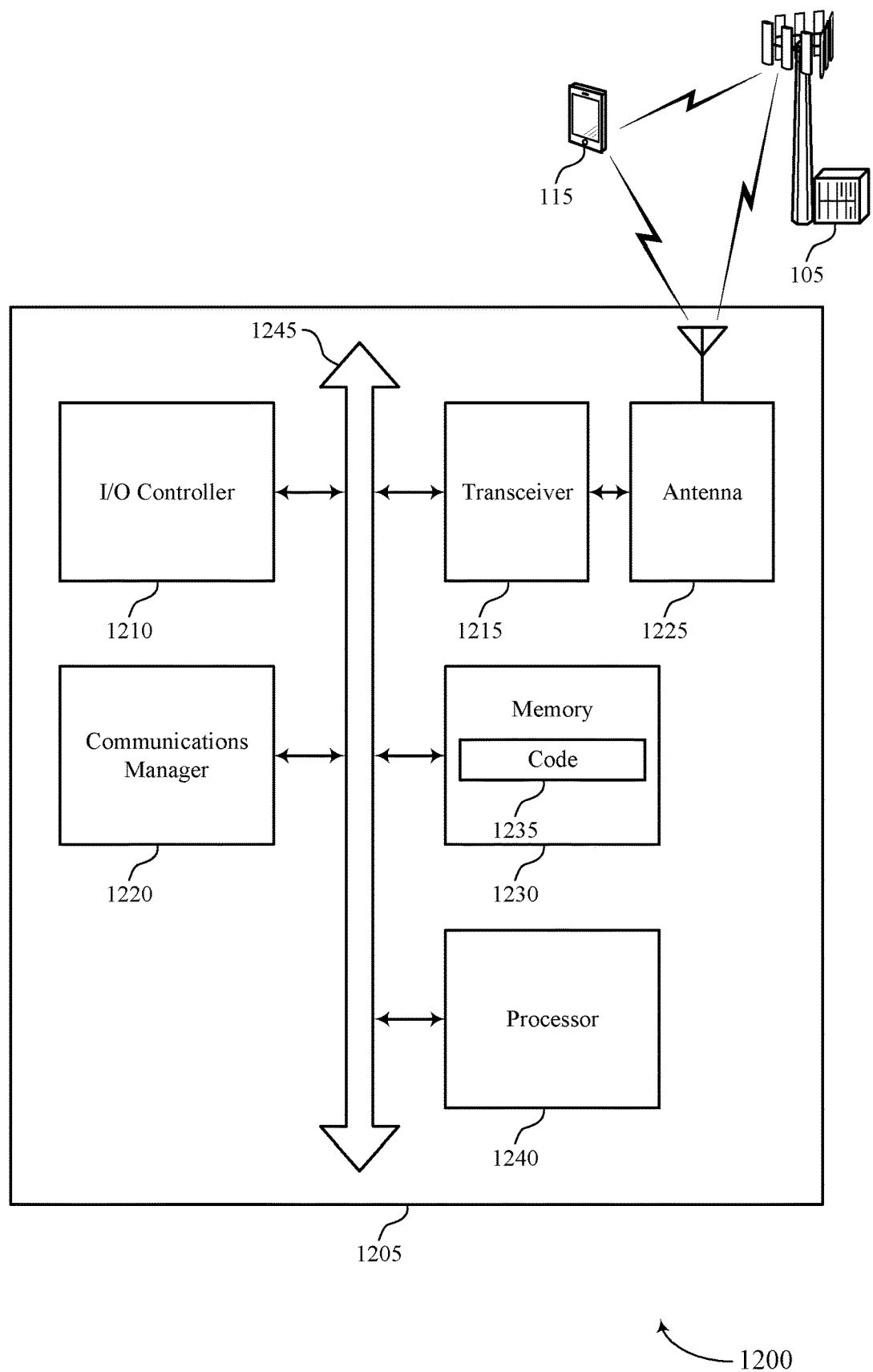
FIG. 12 shows a diagram of a system including a device that supports techniques for communicating data channel transmissions in accordance with one or more aspects of the present disclosure.

FIG. 12 shows a diagram of a system 1200 including a device 1205 that supports techniques for communicating data channel transmissions in accordance with one or more aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for communicating data channel transmissions). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a UE in accordance with examples as disclosed herein. For example, the communications manager 1220 may be configured as or otherwise support a means for receiving a control message in a first control channel occasion associated with a first QCL property, the control message indicating a transmission of a data message during a time period within a threshold time period. The communications manager 1220 may be configured as or otherwise support a means for receiving an indication to skip monitoring of a second control channel occasion during the time period. The communications manager 1220 may be configured as or otherwise support a means for receiving the data message in accordance with a second QCL property based on the indication to skip the monitoring of the second control channel occasion.

Additionally or alternatively, the communications manager 1220 may support wireless communication at a UE in accordance with examples as disclosed herein. For example, the communications manager 1220 may be configured as or otherwise support a means for receiving, in a first control channel occasion, a control message associated with a first QCL property, the control message indicating a transmission of a data message during a time period within a threshold time period. The communications manager 1220 may be configured as or otherwise support a means for receiving an indication to skip monitoring of a second control channel occasion during the time period, the second control channel occasion overlapping in a time domain with the data message. The communications manager 1220 may be configured as or otherwise support a means for dropping reception of the data message based on the indication to skip the monitoring of the second control channel occasion.

Additionally or alternatively, the communications manager 1220 may support wireless communication at a UE in accordance with examples as disclosed herein. For example, the communications manager 1220 may be configured as or otherwise support a means for receiving an indication of a TCI state associated with a first QCL property. The communications manager 1220 may be configured as or otherwise support a means for receiving a control message indicating a transmission of a data message during a time period within a threshold time period. The communications manager 1220 may be configured as or otherwise support a means for receiving the data message in accordance with the first QCL property based on the indication of the TCI state.

By including or configuring the communications manager 1220 in accordance with examples as described herein, the device 1205 may support techniques for increased communication reliability, reduced processing complexity more efficient utilization of communication resources, increased coordination between devices, increased data rates, and increased spectral efficiency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for communicating data channel transmissions as described herein, or the processor 1240 and the memory 1230 may be otherwise configured to perform or support such operations.

Figure 13:
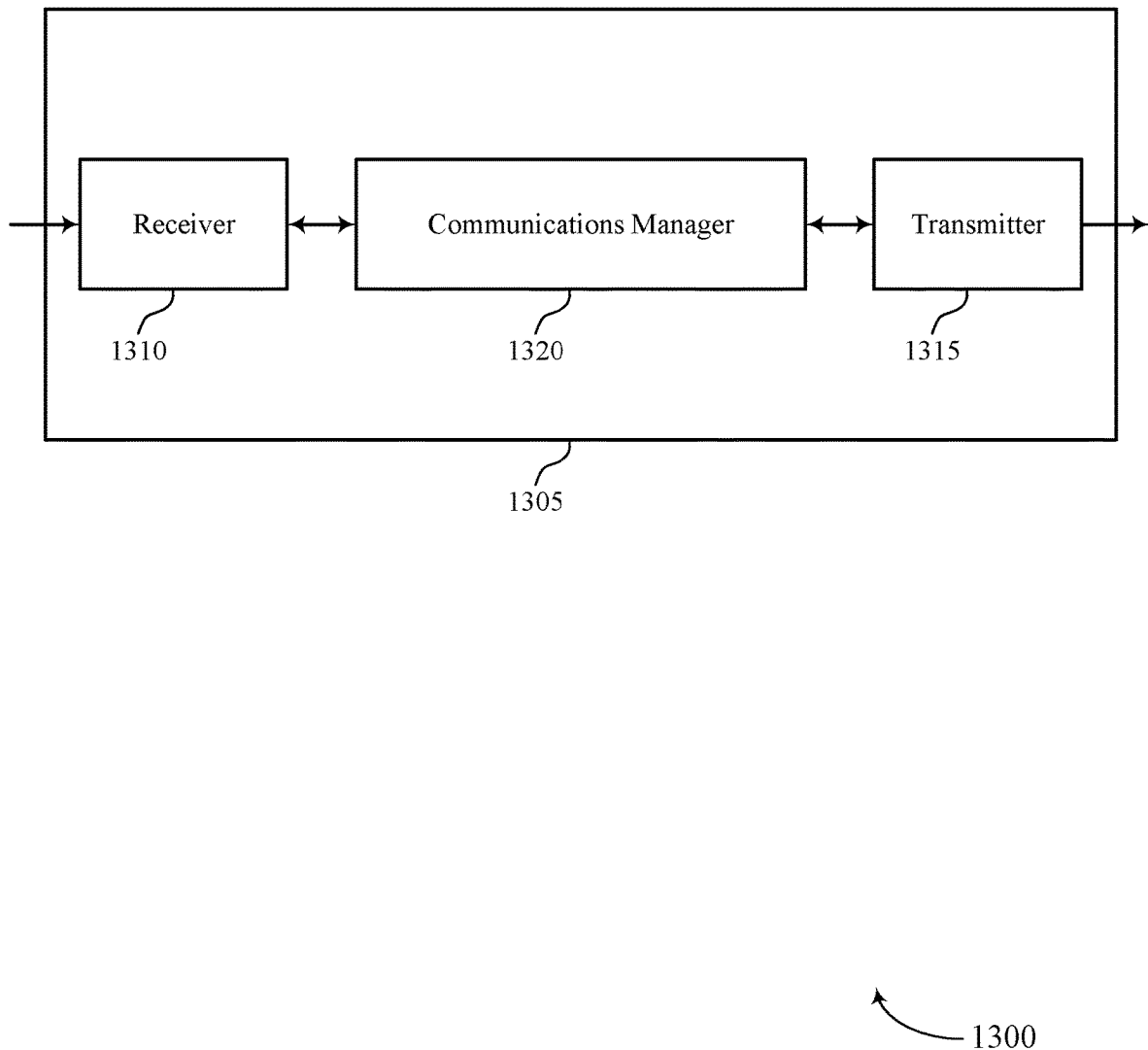
FIGS. 13 and 14 show block diagrams of devices that support techniques for communicating data channel transmissions in accordance with one or more aspects of the present disclosure.

FIG. 13 shows a block diagram 1300 of a device 1305 that supports techniques for communicating data channel transmissions in accordance with one or more aspects of the present disclosure. The device 1305 may be an example of aspects of a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to techniques for communicating data channel transmissions). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to techniques for communicating data channel transmissions). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of techniques for communicating data channel transmissions as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. For example, the communications manager 1320 may be configured as or otherwise support a means for transmitting, in a first control channel occasion associated with a first QCL property, a control message to a UE that indicates a transmission of a data message during a time period within a threshold time period. The communications manager 1320 may be configured as or otherwise support a means for generating an indication to skip monitoring of a second control channel occasion during the time period. The communications manager 1320 may be configured as or otherwise support a means for generating the data message in accordance with a second QCL property based on the indication to skip the monitoring of the second control channel occasion.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for reduced processing complexity and more efficient utilization of communication resources, among other benefits, by supporting data channel communication management (e.g., in conjunction with PDCCH skipping, via TCI state indication).

Figure 14:
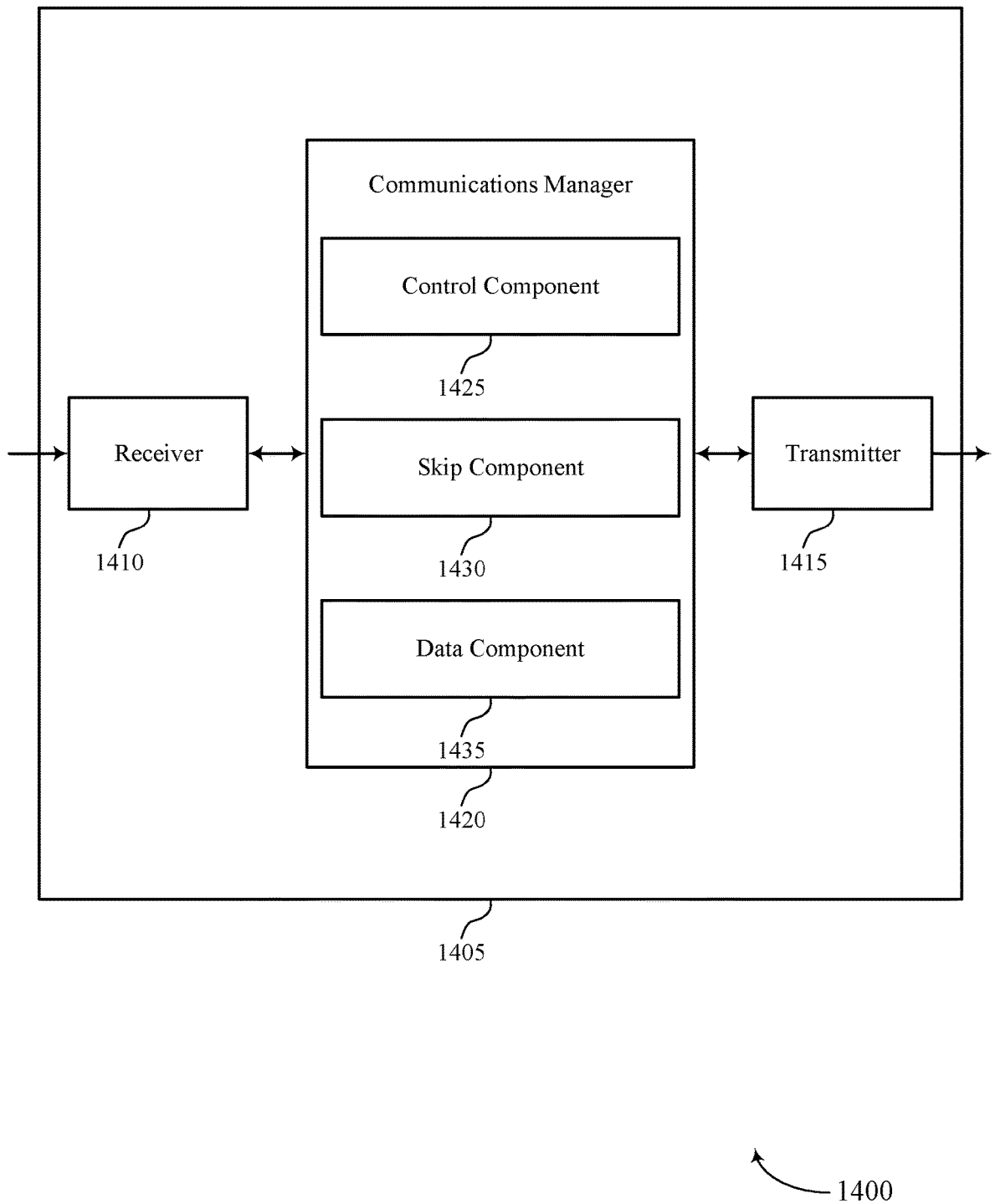

FIG. 14 shows a block diagram 1400 of a device 1405 that supports techniques for communicating data channel transmissions in accordance with one or more aspects of the present disclosure. The device 1405 may be an example of aspects of a device 1305 or a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to techniques for communicating data channel transmissions). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to techniques for communicating data channel transmissions). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of techniques for communicating data channel transmissions as described herein. For example, the communications manager 1420 may include a control component 1425, a skip component 1430, a data component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a base station in accordance with examples as disclosed herein. The control component 1425 may be configured as or otherwise support a means for transmitting, in a first control channel occasion associated with a first QCL property, a control message to a UE that indicates a transmission of a data message during a time period within a threshold time period. The skip component 1430 may be configured as or otherwise support a means for generating an indication to skip monitoring of a second control channel occasion during the time period. The data component 1435 may be configured as or otherwise support a means for generating the data message in accordance with a second QCL property based on the indication to skip the monitoring of the second control channel occasion.

Figure 15:
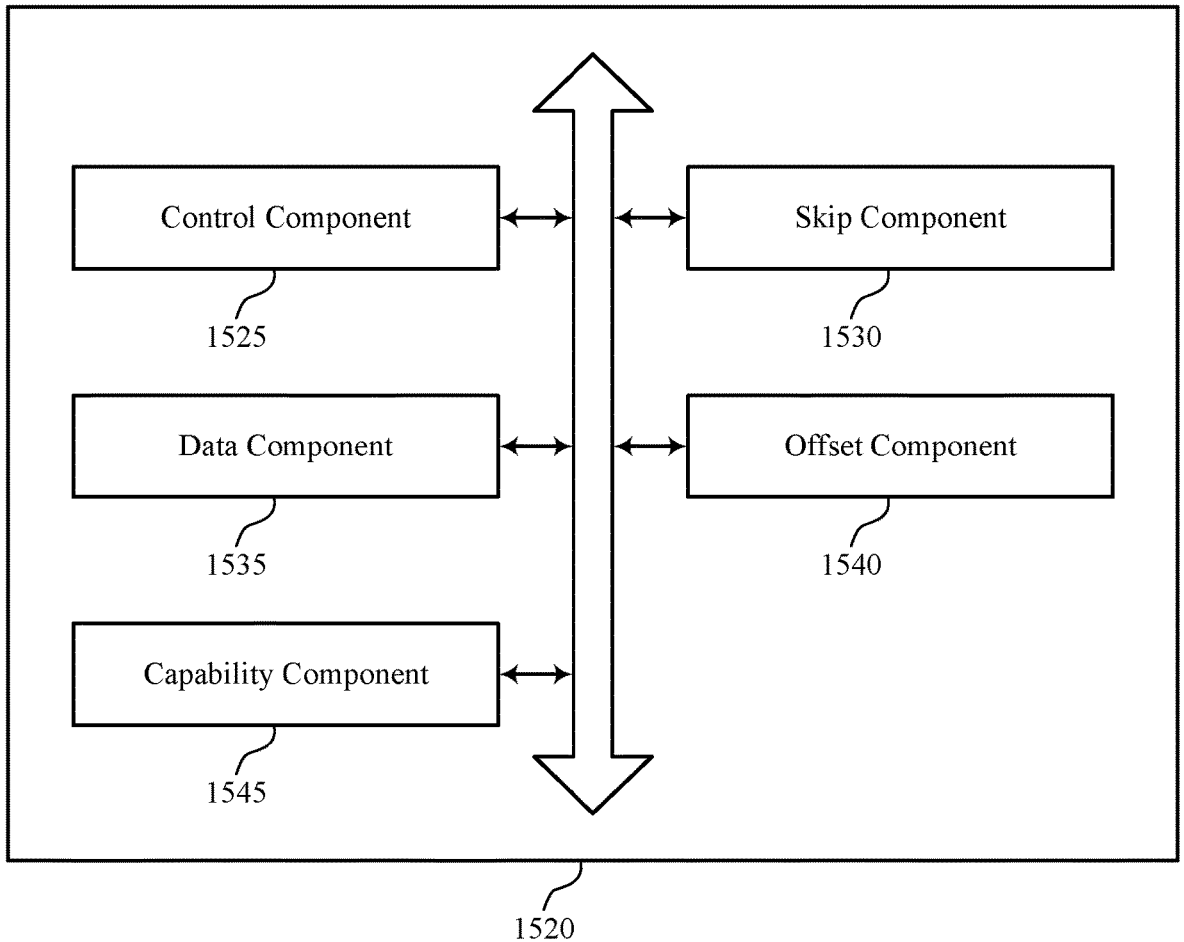
FIG. 15 shows a block diagram of a communications manager that supports techniques for communicating data channel transmissions in accordance with one or more aspects of the present disclosure.

FIG. 15 shows a block diagram 1500 of a communications manager 1520 that supports techniques for communicating data channel transmissions in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for communicating data channel transmissions as described herein. For example, the communications manager 1520 may include a control component 1525, a skip component 1530, a data component 1535, an offset component 1540, a capability component 1545, or any combination thereof. Each of these components may communicate, directly or indirectly, with one another (e.g., via one or more buses).

The communications manager 1520 may support wireless communication at a base station in accordance with examples as disclosed herein. The control component 1525 may be configured as or otherwise support a means for transmitting, in a first control channel occasion associated with a first QCL property, a control message to a UE that indicates a transmission of a data message during a time period within a threshold time period. The skip component 1530 may be configured as or otherwise support a means for generating an indication to skip monitoring of a second control channel occasion during the time period. The data component 1535 may be configured as or otherwise support a means for generating the data message in accordance with a second QCL property based on the indication to skip the monitoring of the second control channel occasion.

In some examples, the skip component 1530 may be configured as or otherwise support a means for transmitting the indication to skip monitoring of the second control channel occasion to the UE. In some examples, the data component 1535 may be configured as or otherwise support a means for transmitting, to the UE, the data message in accordance with the second quasi-colocation property In some examples, the control component 1525 may be configured as or otherwise support a means for transmitting a message that configures the monitoring of the second control channel occasion, the second control channel occasion associated with the second QCL property, where the second QCL property is based on the second control channel occasion being configured for monitoring.

In some examples, the second QCL property is the same as the first QCL property based on skipping the monitoring of the second control channel occasion and monitoring the first control channel occasion.

In some examples, the second QCL property corresponds to a third control channel occasion monitored during the time period based on the second control channel occasion overlapping in a time domain with the data message and skipping the monitoring of the second control channel occasion.

In some examples, to support transmitting the indication, the skip component 1530 may be configured as or otherwise support a means for transmitting the indication in a first carrier different from a second carrier associated with the first control channel occasion and the data message, where the second control channel occasion is associated with the first carrier and the third control channel occasion is associated with the second carrier.

In some examples, the offset component 1540 may be configured as or otherwise support a means for transmitting a second indication of a time offset within the threshold time period, where the second QCL property is based on whether the data message is transmitted before the time offset.

In some examples, to support transmitting the data message, the data component 1535 may be configured as or otherwise support a means for transmitting the data message before the time offset. In some examples, the control component 1525 may be configured as or otherwise support a means for transmitting a message that configures the monitoring of the second control channel occasion, the second control channel occasion associated with the second QCL property, where the second QCL property is based on the second control channel occasion being configured for monitoring and transmitting the data message before the time offset.

In some examples, to support transmitting the data message, the data component 1535 may be configured as or otherwise support a means for transmitting the data message after the time offset, where the second QCL property is the same as the first QCL property based on transmitting the data message after the time offset and skipping the monitoring of the second control channel occasion.

In some examples, to support transmitting the data message, the data component 1535 may be configured as or otherwise support a means for transmitting the data message after the time offset. In some examples, to transmit the indication, the skip component 1530 may be configured as or otherwise support a means for transmitting the indication in a first carrier different from a second carrier associated with the first control channel occasion and the data message, the second control channel occasion associated with the first carrier, where the second QCL property corresponds to a third control channel occasion associated with the second carrier and monitored during the time period based on transmitting the data message after the time offset and skipping the monitoring of the second control channel occasion.

In some examples, the capability component 1545 may be configured as or otherwise support a means for receiving a capability message that indicates a duration for the UE to cancel the monitoring of the second control channel occasion after receiving the indication to skip the monitoring of the second control channel occasion, where a value of the time offset is based on the duration.

In some examples, a value of the time offset is based on an SCS associated with the control message, the data message, or both.

In some examples, a configuration of a control channel occasion includes a CORESET for the control channel occasion and a search space set for the control channel occasion, the CORESET corresponding to a QCL property for the control channel occasion.

Figure 16:
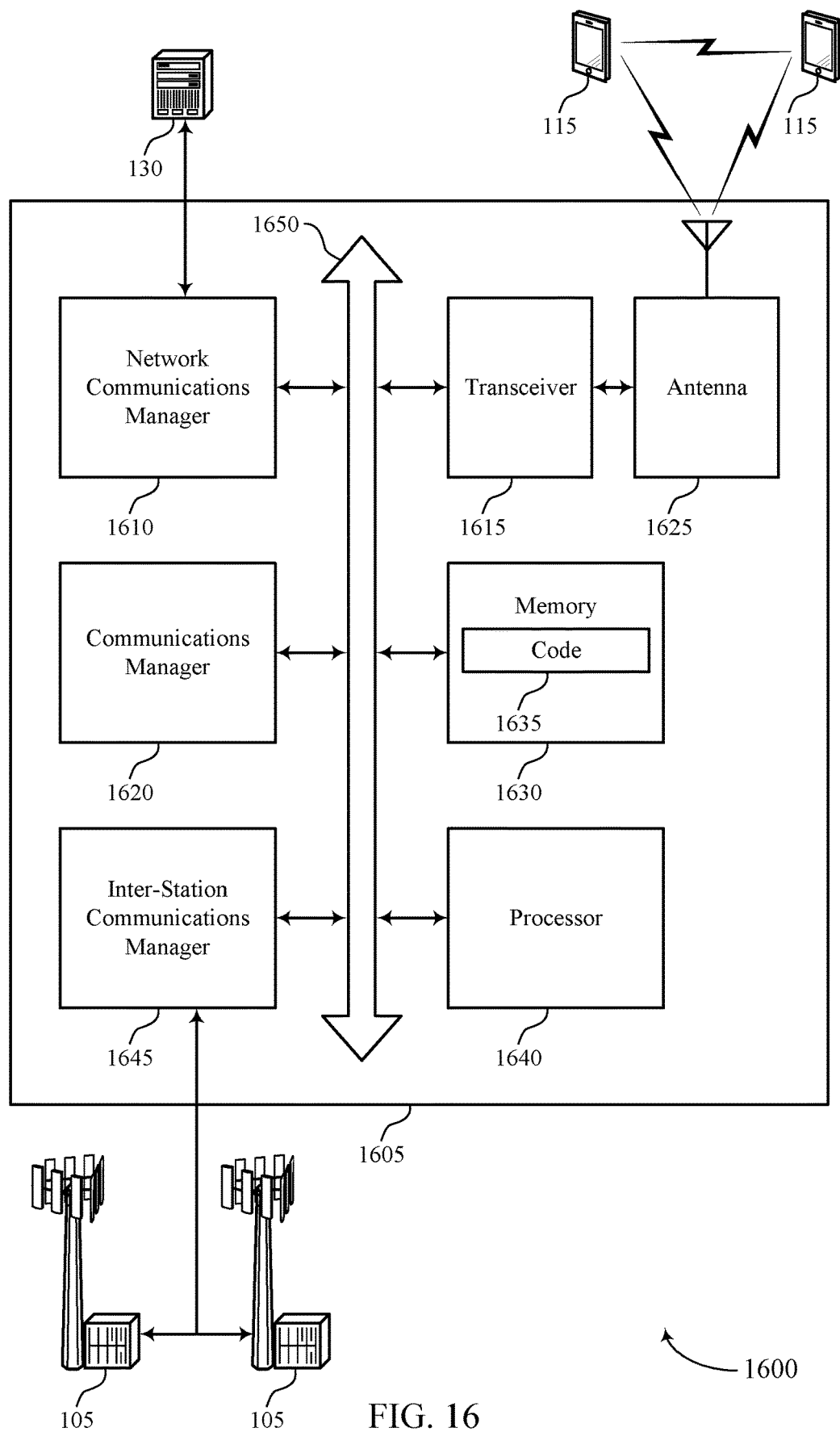
FIG. 16 shows a diagram of a system including a device that supports techniques for communicating data channel transmissions in accordance with one or more aspects of the present disclosure.

FIG. 16 shows a diagram of a system 1600 including a device 1605 that supports techniques for communicating data channel transmissions in accordance with one or more aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting techniques for communicating data channel transmissions). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at a base station in accordance with examples as disclosed herein. For example, the communications manager 1620 may be configured as or otherwise support a means for transmitting, in a first control channel occasion associated with a first QCL property, a control message to a UE that indicates a transmission of a data message during a time period within a threshold time period. The communications manager 1620 may be configured as or otherwise support a means for generating an indication to skip monitoring of a second control channel occasion during the time period. The communications manager 1620 may be configured as or otherwise support a means for generating the data message in accordance with a second QCL property based on the indication to skip the monitoring of the second control channel occasion.

By including or configuring the communications manager 1620 in accordance with examples as described herein, the device 1605 may support techniques for increased communication reliability, reduced processing complexity more efficient utilization of communication resources, increased coordination between devices, increased data rates, and increased spectral efficiency.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of techniques for communicating data channel transmissions as described herein, or the processor 1640 and the memory 1630 may be otherwise configured to perform or support such operations.

Figure 17:
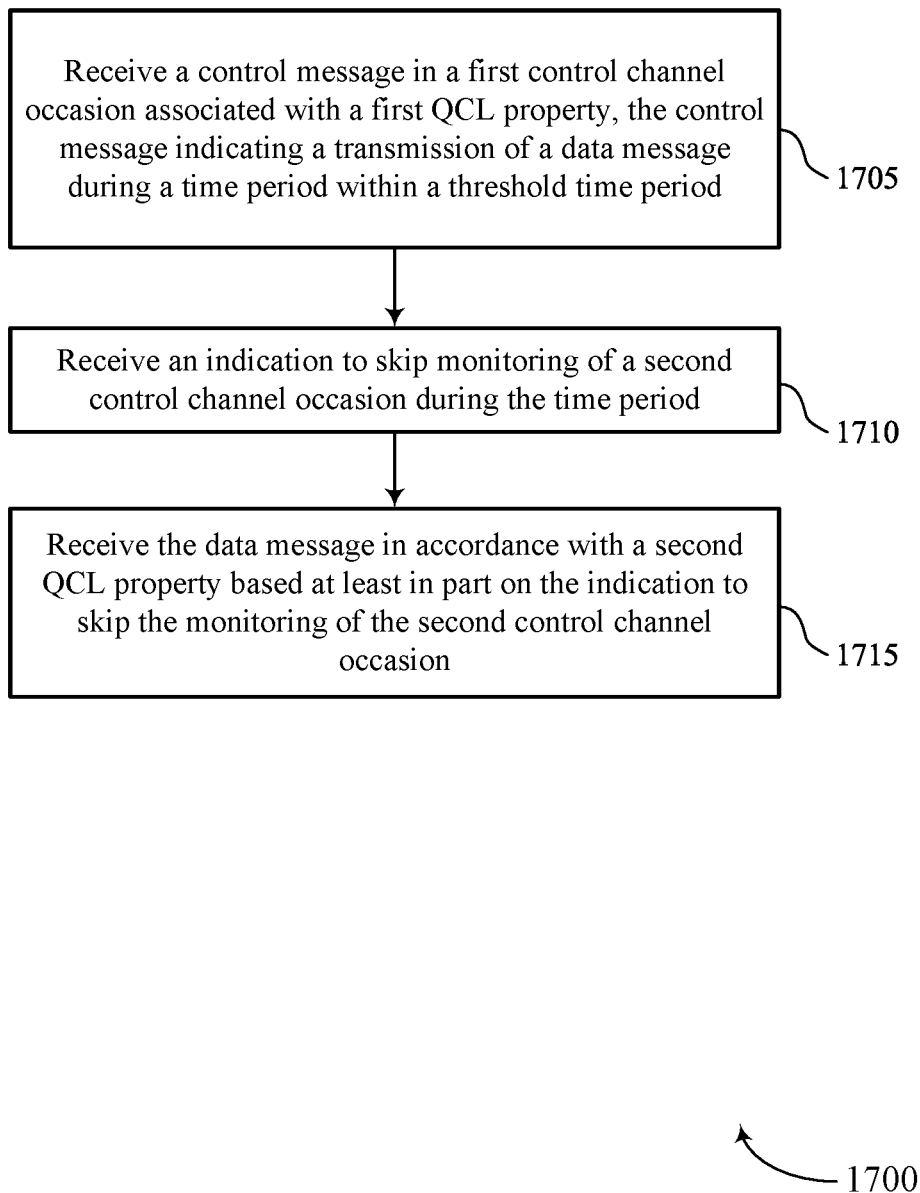
FIGS. 17 through 26 show flowcharts illustrating methods that support techniques for communicating data channel transmissions in accordance with one or more aspects of the present disclosure.

FIG. 17 shows a flowchart illustrating a method 1700 that supports techniques for communicating data channel transmissions in accordance with one or more aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1705, the method may include receiving a control message in a first control channel occasion associated with a first QCL property, the control message indicating a transmission of a data message during a time period within a threshold time period. The operations of 1705 may be performed in accordance with examples as disclosed herein. In some examples, aspects of the operations of 1705 may be performed by a control component 1125 as described with reference to FIG. 11.

At 1710, the method may include receiving an indication to skip monitoring of a second control channel occasion during the time period. The operations of 1710 may be performed in accordance with examples as disclosed herein. In some examples, aspects of the operations of 1710 may be performed by a skip component 1130 as described with reference to FIG. 11.

At 1715, the method may include receiving the data message in accordance with a second QCL property based on the indication to skip the monitoring of the second control channel occasion. The operations of 1715 may be performed in accordance with examples as disclosed herein. In some examples, aspects of the operations of 1715 may be performed by a data component 1135 as described with reference to FIG. 11.

Figure 18:
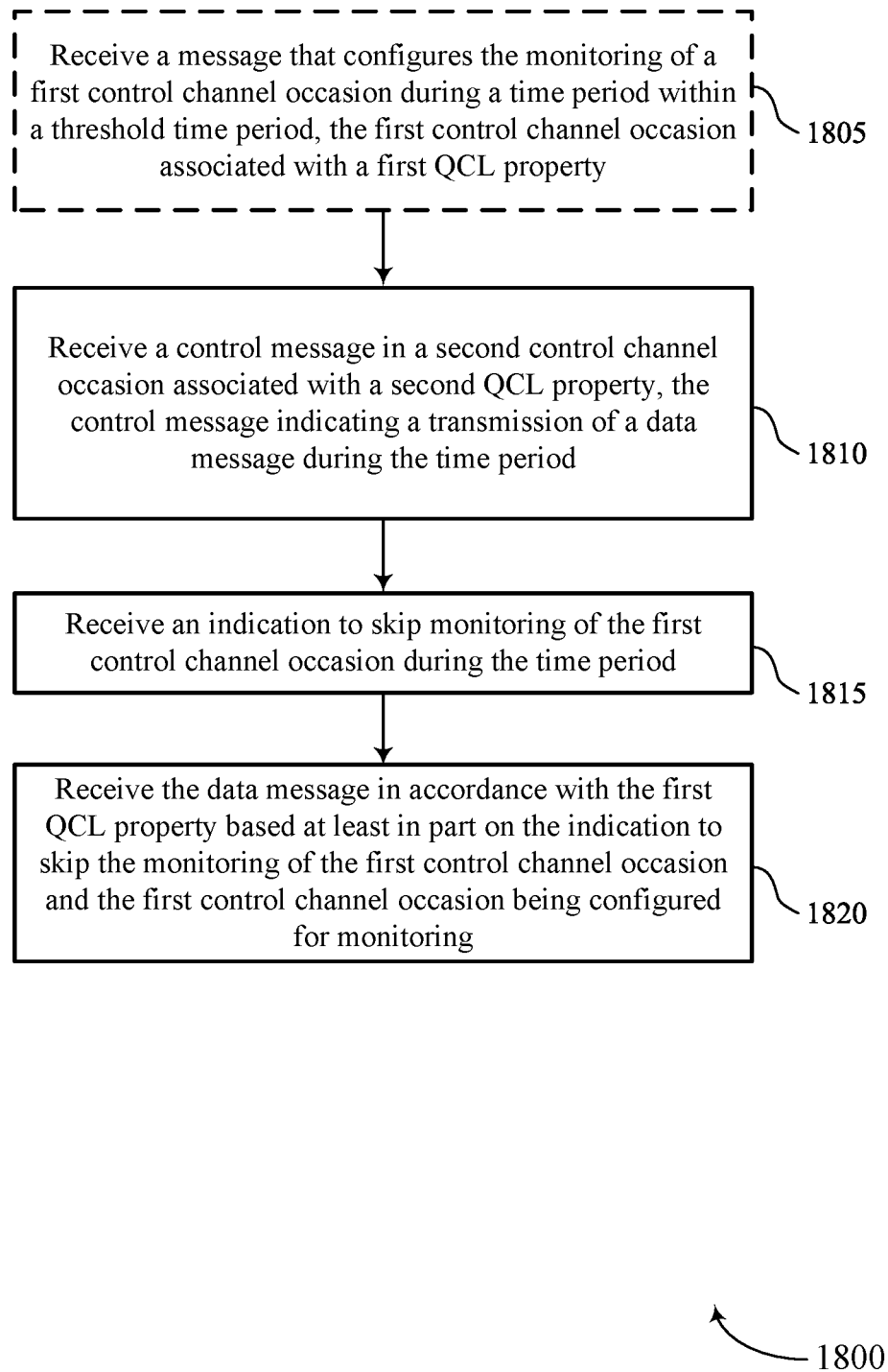

FIG. 18 shows a flowchart illustrating a method 1800 that supports techniques for communicating data channel transmissions in accordance with one or more aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1805, the method may include receiving a message that configures the monitoring of a first control channel occasion during a time period within a threshold time period, the first control channel occasion associated with a first QCL property. The operations of 1805 may be performed in accordance with examples as disclosed herein. In some examples, aspects of the operations of 1805 may be performed by a control component 1125 as described with reference to FIG. 11.

At 1810, the method may include receiving a control message in a second control channel occasion associated with a second QCL property, the control message indicating a transmission of a data message during the time period. The operations of 1810 may be performed in accordance with examples as disclosed herein. In some examples, aspects of the operations of 1810 may be performed by a control component 1125 as described with reference to FIG. 11.

At 1815, the method may include receiving an indication to skip monitoring of the first control channel occasion during the time period. The operations of 1815 may be performed in accordance with examples as disclosed herein. In some examples, aspects of the operations of 1815 may be performed by a skip component 1130 as described with reference to FIG. 11.

At 1820, the method may include receiving the data message in accordance with the first QCL property based on the indication to skip the monitoring of the first control channel occasion and the first control channel occasion being configured for monitoring. The operations of 1820 may be performed in accordance with examples as disclosed herein. In some examples, aspects of the operations of 1820 may be performed by a data component 1135 as described with reference to FIG. 11.

Figure 19:
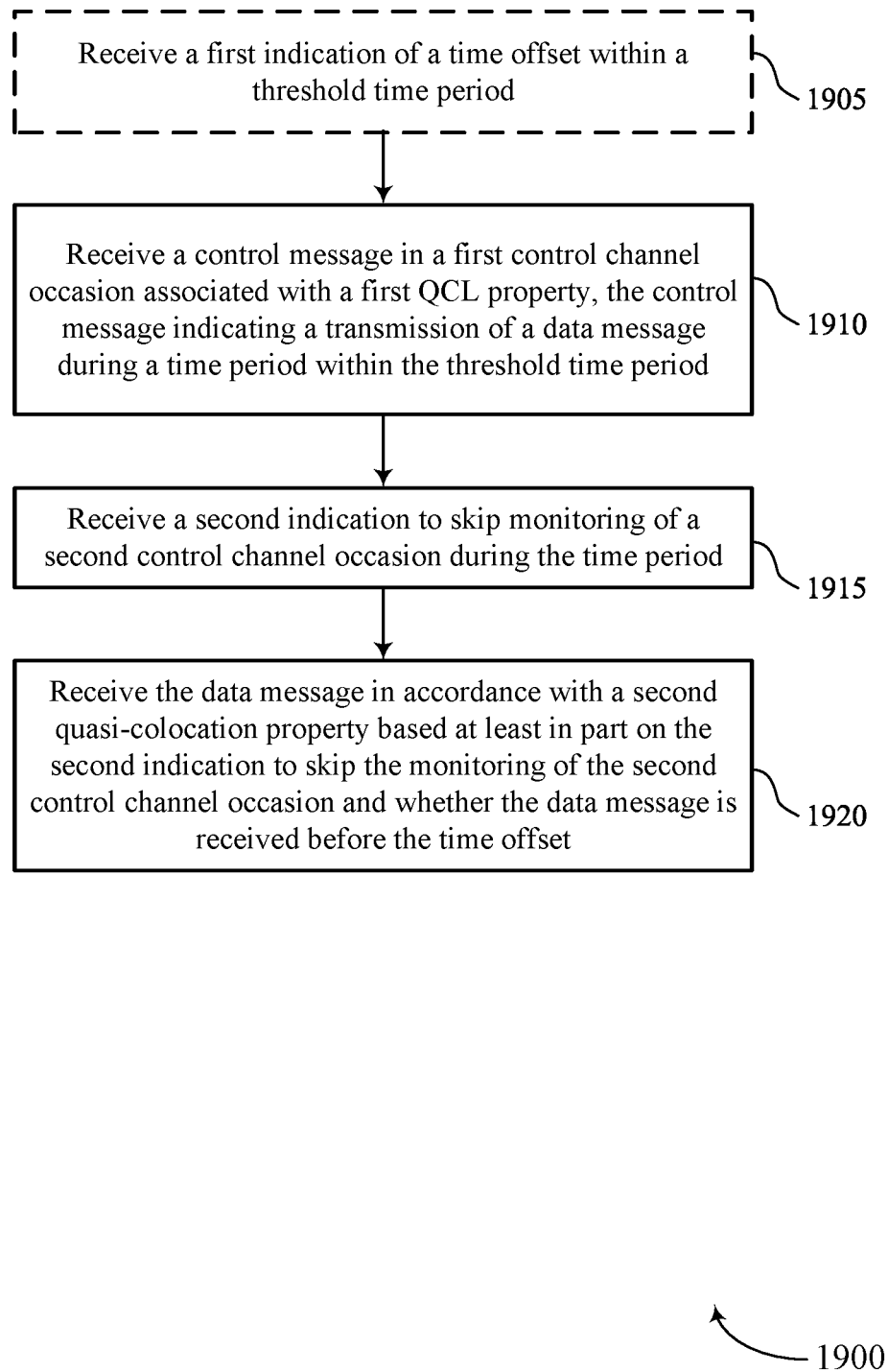

FIG. 19 shows a flowchart illustrating a method 1900 that supports techniques for communicating data channel transmissions in accordance with one or more aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 1905, the method may include receiving a first indication of a time offset within a threshold time period. The operations of 1905 may be performed in accordance with examples as disclosed herein. In some examples, aspects of the operations of 1905 may be performed by an offset component 1150 as described with reference to FIG. 11.

At 1910, the method may include receiving a control message in a first control channel occasion associated with a first QCL property, the control message indicating a transmission of a data message during a time period within the threshold time period. The operations of 1910 may be performed in accordance with examples as disclosed herein. In some examples, aspects of the operations of 1910 may be performed by a control component 1125 as described with reference to FIG. 11.

At 1915, the method may include receiving an indication to skip monitoring of a second control channel occasion during the time period. The operations of 1915 may be performed in accordance with examples as disclosed herein. In some examples, aspects of the operations of 1915 may be performed by a skip component 1130 as described with reference to FIG. 11.

At 1920, the method may include receiving the data message in accordance with a second QCL property based on the second indication to skip the monitoring of the second control channel occasion and whether the data message is received before the time offset. The operations of 1920 may be performed in accordance with examples as disclosed herein. In some examples, aspects of the operations of 1920 may be performed by a data component 1135 as described with reference to FIG. 11.

Figure 20:
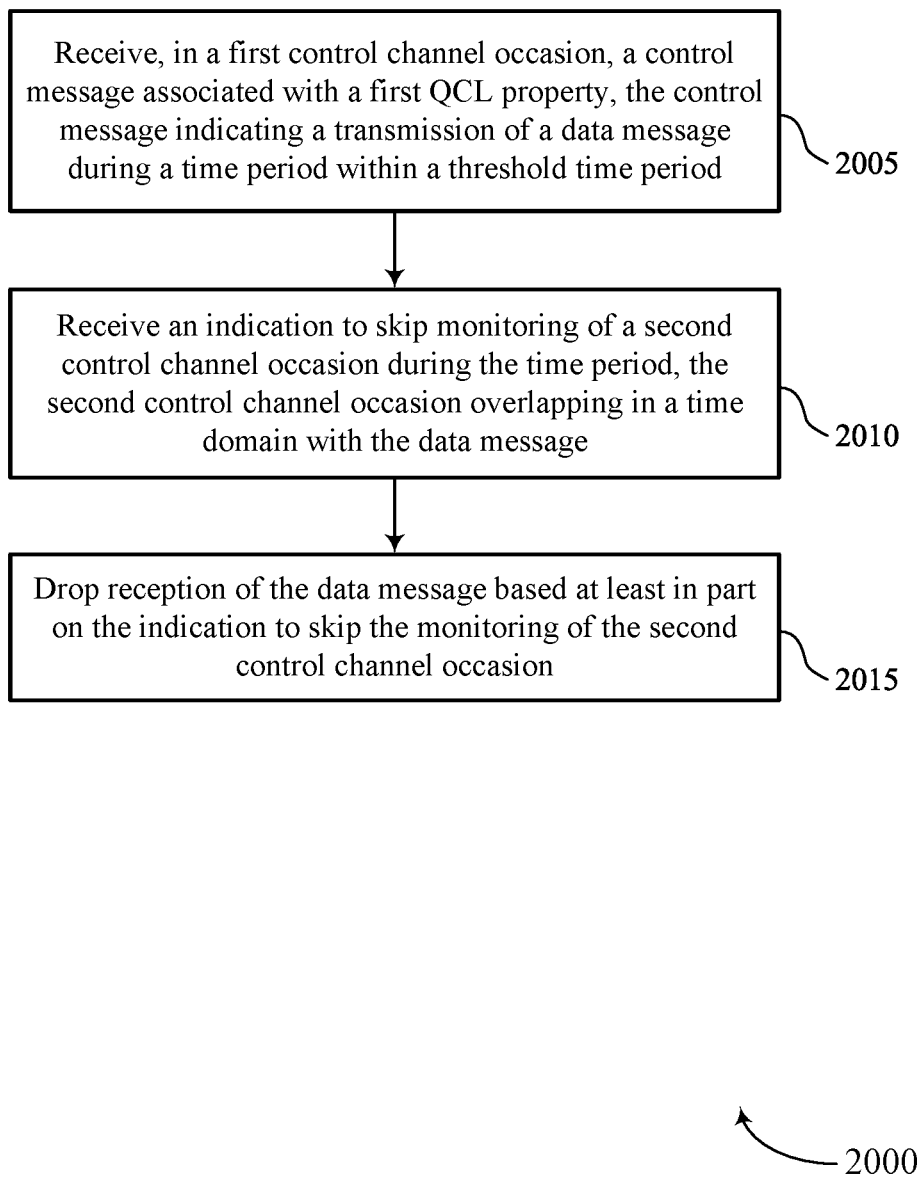

FIG. 20 shows a flowchart illustrating a method 2000 that supports techniques for communicating data channel transmissions in accordance with one or more aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2005, the method may include receiving, in a first control channel occasion, a control message associated with a first QCL property, the control message indicating a transmission of a data message during a time period within a threshold time period. The operations of 2005 may be performed in accordance with examples as disclosed herein. In some examples, aspects of the operations of 2005 may be performed by a control component 1125 as described with reference to FIG. 11.

At 2010, the method may include receiving an indication to skip monitoring of a second control channel occasion during the time period, the second control channel occasion overlapping in a time domain with the data message. The operations of 2010 may be performed in accordance with examples as disclosed herein. In some examples, aspects of the operations of 2010 may be performed by a skip component 1130 as described with reference to FIG. 11.

At 2015, the method may include dropping reception of the data message based on the indication to skip the monitoring of the second control channel occasion. The operations of 2015 may be performed in accordance with examples as disclosed herein. In some examples, aspects of the operations of 2015 may be performed by a drop component 1140 as described with reference to FIG. 11.

Figure 21:
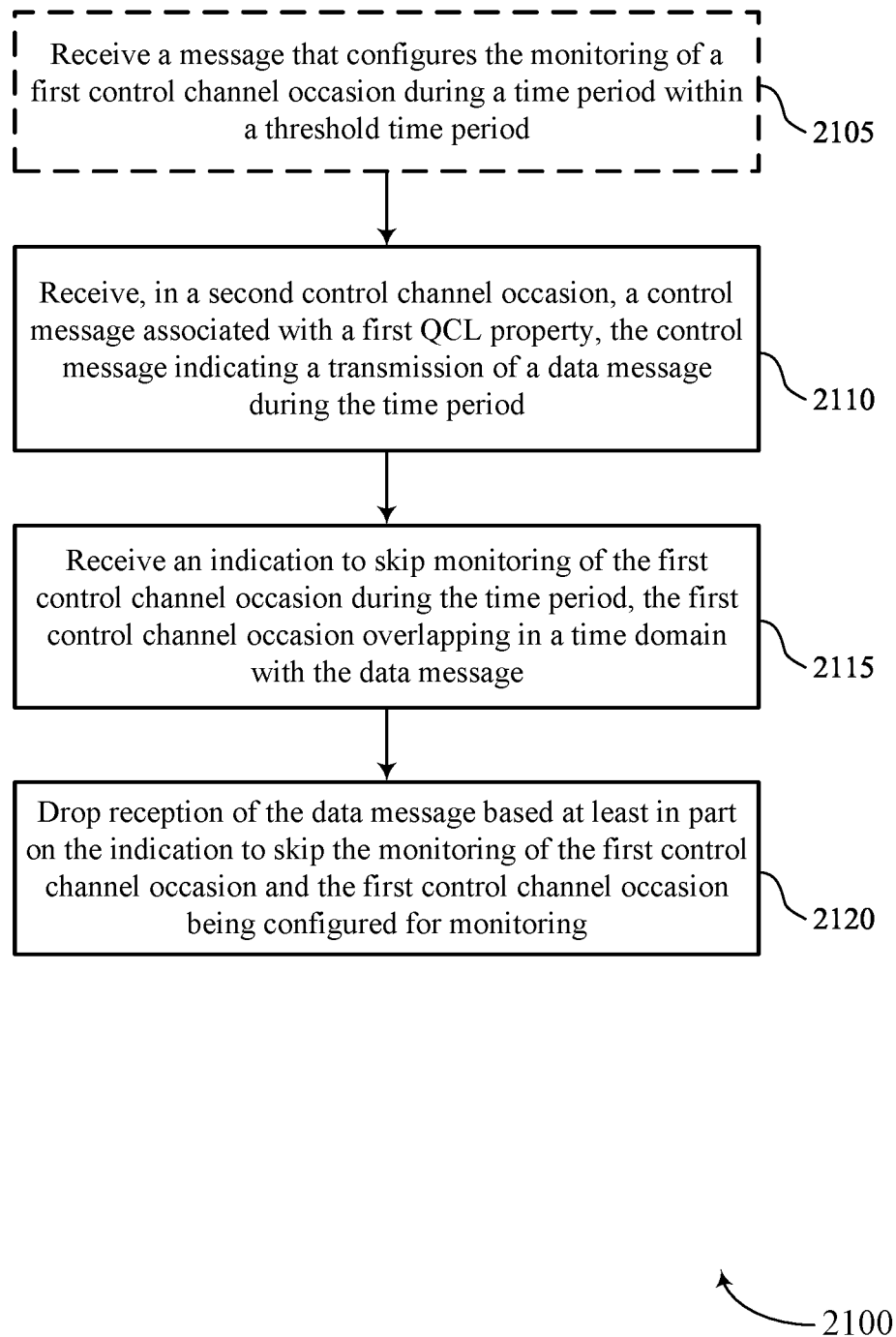

FIG. 21 shows a flowchart illustrating a method 2100 that supports techniques for communicating data channel transmissions in accordance with one or more aspects of the present disclosure. The operations of the method 2100 may be implemented by a UE or its components as described herein. For example, the operations of the method 2100 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2105, the method may include receiving a message that configures the monitoring of a first control channel occasion during a time period within a threshold time period. The operations of 2105 may be performed in accordance with examples as disclosed herein. In some examples, aspects of the operations of 2105 may be performed by a control component 1125 as described with reference to FIG. 11.

At 2110, the method may include receiving, in a second control channel occasion, a control message associated with a first QCL property, the control message indicating a transmission of a data message during the time period. The operations of 2110 may be performed in accordance with examples as disclosed herein. In some examples, aspects of the operations of 2110 may be performed by a control component 1125 as described with reference to FIG. 11.

At 2115, the method may include receiving an indication to skip monitoring of the first control channel occasion during the time period, the first control channel occasion overlapping in a time domain with the data message. The operations of 2115 may be performed in accordance with examples as disclosed herein. In some examples, aspects of the operations of 2115 may be performed by a skip component 1130 as described with reference to FIG. 11.

At 2120, the method may include dropping reception of the data message based on the indication to skip the monitoring of the first control channel occasion and the first control channel occasion being configured for monitoring. The operations of 2120 may be performed in accordance with examples as disclosed herein. In some examples, aspects of the operations of 2120 may be performed by a drop component 1140 as described with reference to FIG. 11.

Figure 22:
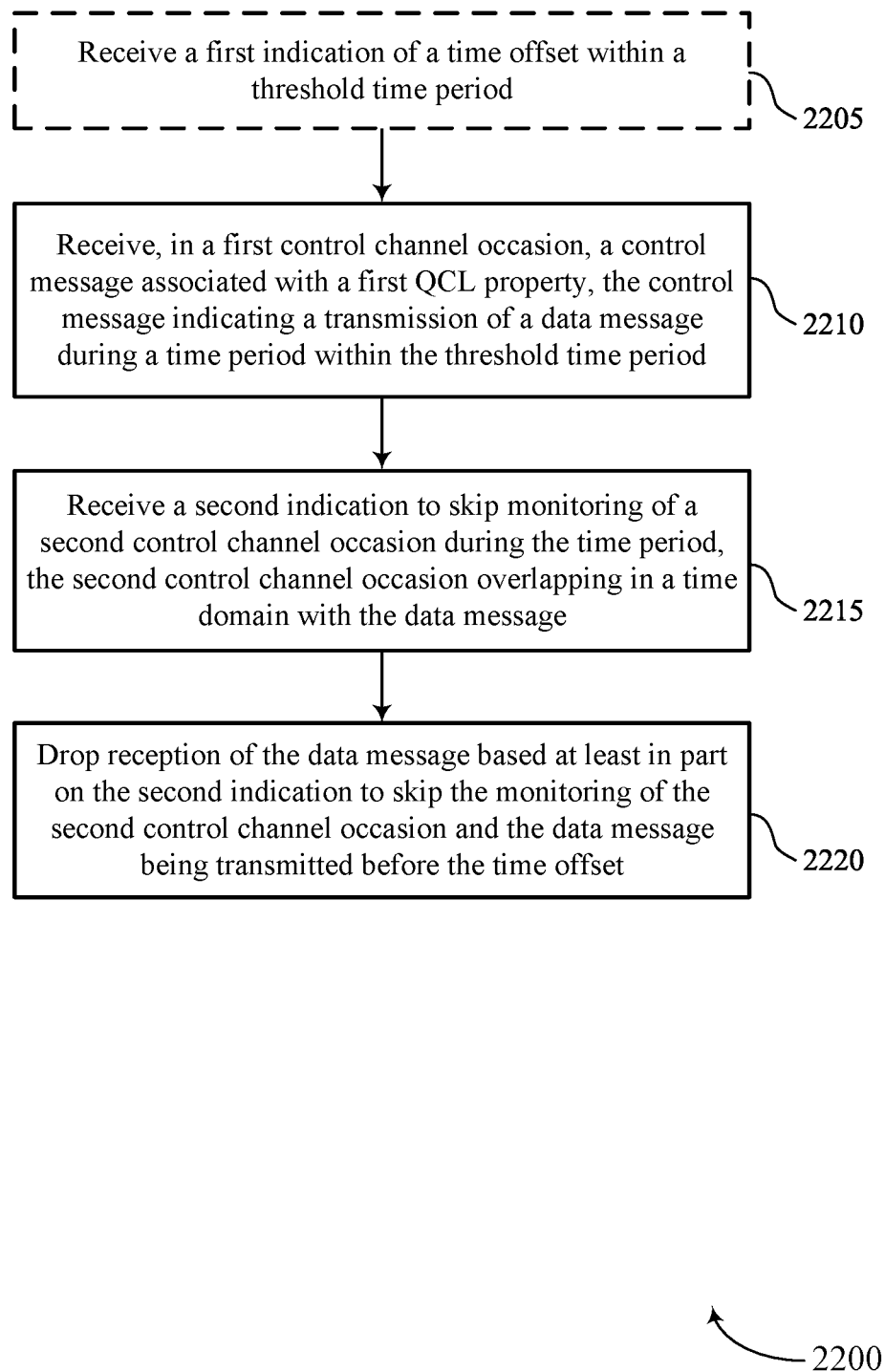

FIG. 22 shows a flowchart illustrating a method 2200 that supports techniques for communicating data channel transmissions in accordance with one or more aspects of the present disclosure. The operations of the method 2200 may be implemented by a UE or its components as described herein. For example, the operations of the method 2200 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2205, the method may include receiving a first indication of a time offset within a threshold time period. The operations of 2205 may be performed in accordance with examples as disclosed herein. In some examples, aspects of the operations of 2205 may be performed by an offset component 1150 as described with reference to FIG. 11.

At 2210, the method may include receiving, in a first control channel occasion, a control message associated with a first QCL property, the control message indicating a transmission of a data message during a time period within a threshold time period. The operations of 2210 may be performed in accordance with examples as disclosed herein. In some examples, aspects of the operations of 2210 may be performed by a control component 1125 as described with reference to FIG. 11.

At 2215, the method may include receiving a second indication to skip monitoring of a second control channel occasion during the time period, the second control channel occasion overlapping in a time domain with the data message. The operations of 2215 may be performed in accordance with examples as disclosed herein. In some examples, aspects of the operations of 2215 may be performed by a skip component 1130 as described with reference to FIG. 11.

At 2220, the method may include dropping reception of the data message based on the indication to skip the monitoring of the second control channel occasion and the data message being transmitted before the time offset. The operations of 2220 may be performed in accordance with examples as disclosed herein. In some examples, aspects of the operations of 2220 may be performed by a drop component 1140 as described with reference to FIG. 11.

Figure 23:
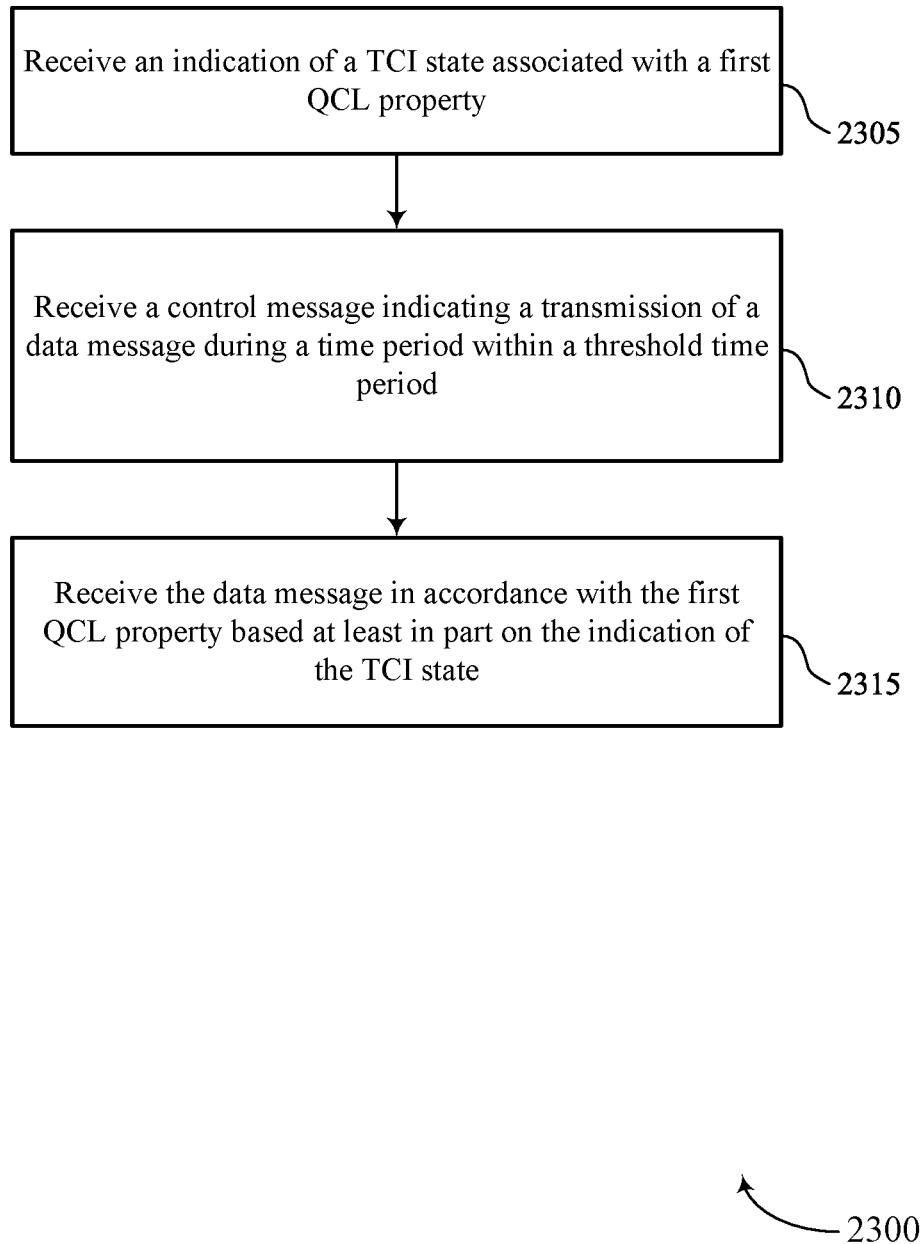

FIG. 23 shows a flowchart illustrating a method 2300 that supports techniques for communicating data channel transmissions in accordance with one or more aspects of the present disclosure. The operations of the method 2300 may be implemented by a UE or its components as described herein. For example, the operations of the method 2300 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2305, the method may include receiving an indication of a TCI state associated with a first QCL property. The operations of 2305 may be performed in accordance with examples as disclosed herein. In some examples, aspects of the operations of 2305 may be performed by a TCI state component 1145 as described with reference to FIG. 11.

At 2310, the method may include receiving a control message indicating a transmission of a data message during a time period within a threshold time period. The operations of 2310 may be performed in accordance with examples as disclosed herein. In some examples, aspects of the operations of 2310 may be performed by a control component 1125 as described with reference to FIG. 11.

At 2315, the method may include receiving the data message in accordance with the first QCL property based on the indication of the TCI state. The operations of 2315 may be performed in accordance with examples as disclosed herein. In some examples, aspects of the operations of 2315 may be performed by a data component 1135 as described with reference to FIG. 11.

Figure 24:
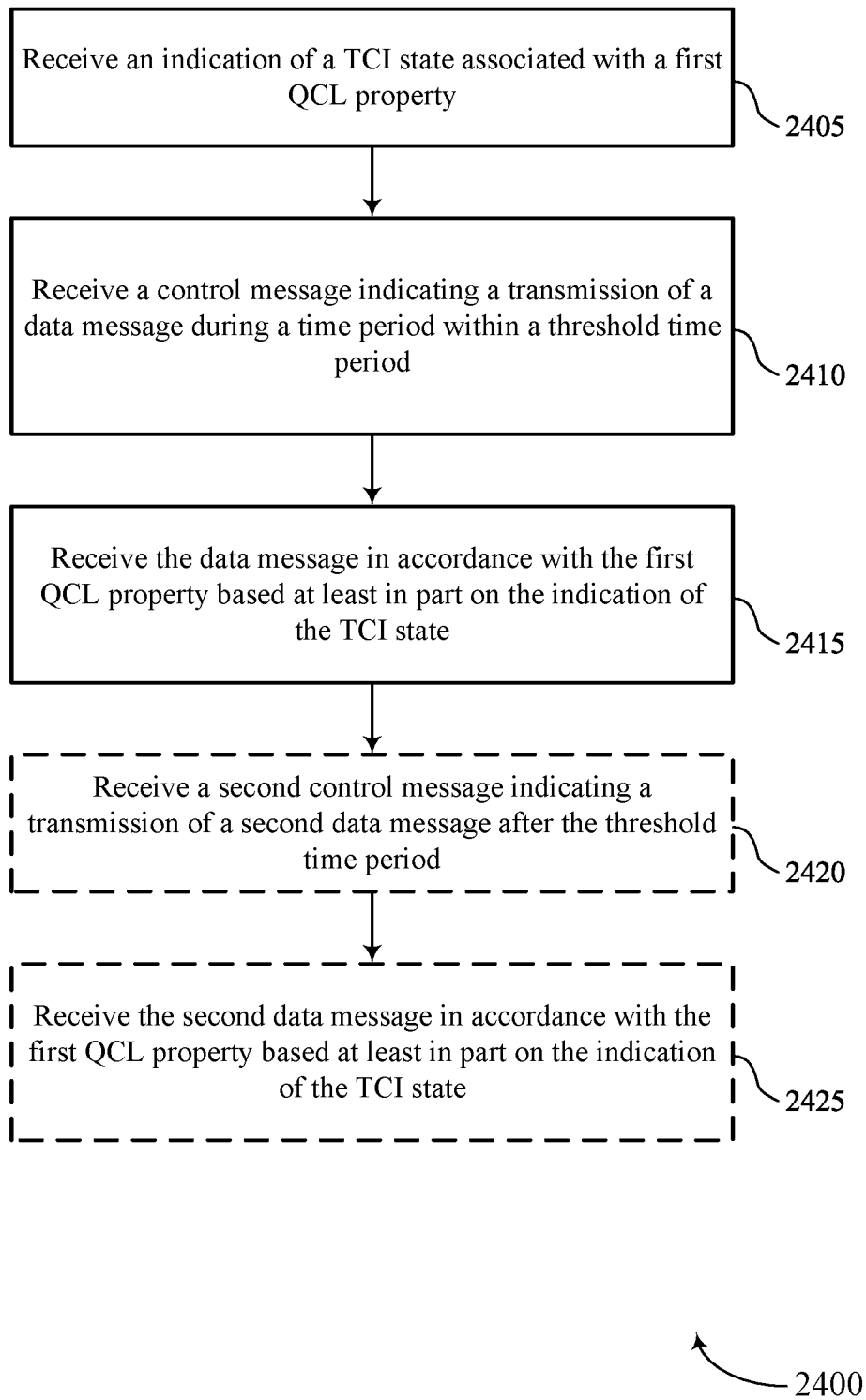

FIG. 24 shows a flowchart illustrating a method 2400 that supports techniques for communicating data channel transmissions in accordance with one or more aspects of the present disclosure. The operations of the method 2400 may be implemented by a UE or its components as described herein. For example, the operations of the method 2400 may be performed by a UE 115 as described with reference to FIGS. 1 through 12. In some examples, a UE may execute a set of instructions to control the functional elements of the UE to perform the described functions. Additionally or alternatively, the UE may perform aspects of the described functions using special-purpose hardware.

At 2405, the method may include receiving an indication of a TCI state associated with a first QCL property. The operations of 2405 may be performed in accordance with examples as disclosed herein. In some examples, aspects of the operations of 2405 may be performed by a TCI state component 1145 as described with reference to FIG. 11.

At 2410, the method may include receiving a control message indicating a transmission of a data message during a time period within a threshold time period. The operations of 2410 may be performed in accordance with examples as disclosed herein. In some examples, aspects of the operations of 2410 may be performed by a control component 1125 as described with reference to FIG. 11.

At 2415, the method may include receiving the data message in accordance with the first QCL property based on the indication of the TCI state. The operations of 2415 may be performed in accordance with examples as disclosed herein. In some examples, aspects of the operations of 2415 may be performed by a data component 1135 as described with reference to FIG. 11.

At 2420, the method may include receiving a second control message indicating a transmission of a second data message after the threshold time period. The operations of 2420 may be performed in accordance with examples as disclosed herein. In some examples, aspects of the operations of 2420 may be performed by a control component 1125 as described with reference to FIG. 11.

At 2425, the method may include receiving the second data message in accordance with the first QCL property based on the indication of the TCI state. The operations of 2425 may be performed in accordance with examples as disclosed herein. In some examples, aspects of the operations of 2425 may be performed by a data component 1135 as described with reference to FIG. 11.

Figure 25:
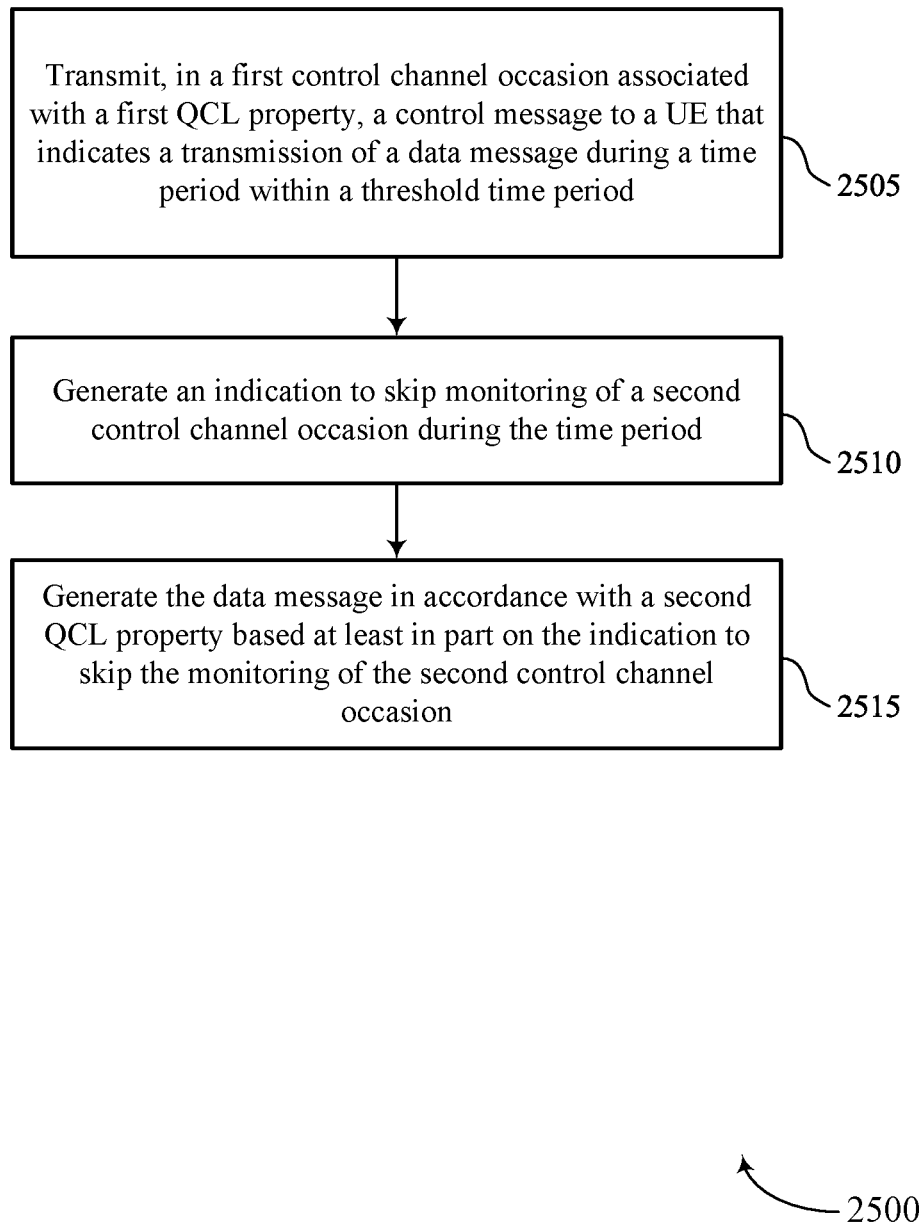

FIG. 25 shows a flowchart illustrating a method 2500 that supports techniques for communicating data channel transmissions in accordance with one or more aspects of the present disclosure. The operations of the method 2500 may be implemented by a base station or its components as described herein. For example, the operations of the method 2500 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2505, the method may include transmitting, in a first control channel occasion associated with a first QCL property, a control message to a UE that indicates a transmission of a data message during a time period within a threshold time period. The operations of 2505 may be performed in accordance with examples as disclosed herein. In some examples, aspects of the operations of 2505 may be performed by a control component 1525 as described with reference to FIG. 15.

At 2510, the method may include generating an indication to skip monitoring of a second control channel occasion during the time period. The operations of 2510 may be performed in accordance with examples as disclosed herein. In some examples, aspects of the operations of 2510 may be performed by a skip component 1530 as described with reference to FIG. 15.

At 2515, the method may include generating the data message in accordance with a second QCL property based on the indication to skip the monitoring of the second control channel occasion. The operations of 2515 may be performed in accordance with examples as disclosed herein. In some examples, aspects of the operations of 2515 may be performed by a data component 1535 as described with reference to FIG. 15.

Figure 26:
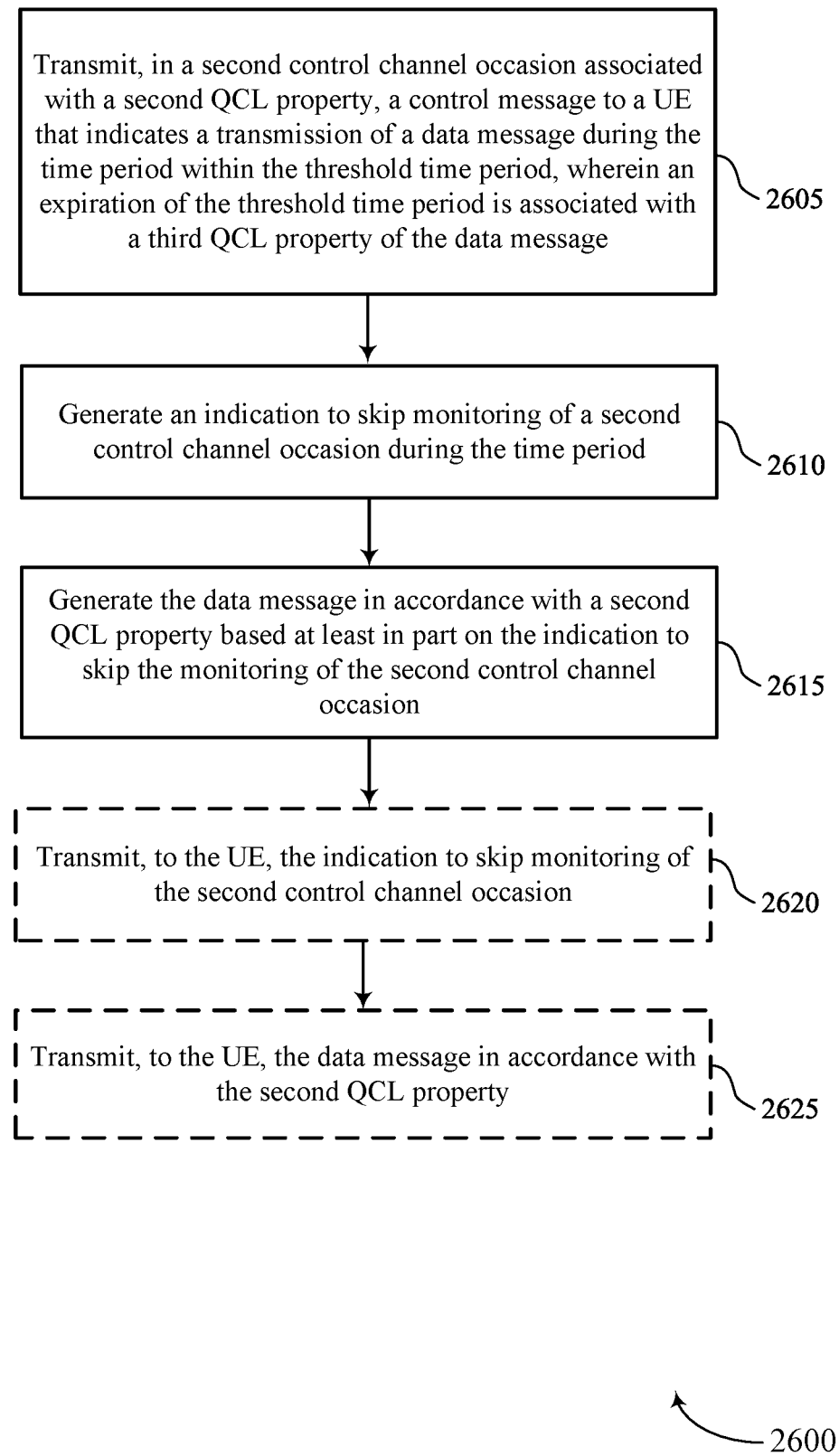

FIG. 26 shows a flowchart illustrating a method 2600 that supports techniques for communicating data channel transmissions in accordance with one or more aspects of the present disclosure. The operations of the method 2600 may be implemented by a base station or its components as described herein. For example, the operations of the method 2600 may be performed by a base station 105 as described with reference to FIGS. 1 through 8 and 13 through 16. In some examples, a base station may execute a set of instructions to control the functional elements of the base station to perform the described functions. Additionally or alternatively, the base station may perform aspects of the described functions using special-purpose hardware.

At 2605, the method may include transmitting, in a second control channel occasion associated with a second QCL property, a control message to a UE that indicates a transmission of a data message during the time period within the threshold time period. The operations of 2605 may be performed in accordance with examples as disclosed herein. In some examples, aspects of the operations of 2605 may be performed by a control component 1525 as described with reference to FIG. 15.

At 2610, the method may include generating an indication to skip monitoring of a second control channel occasion during the time period. The operations of 2610 may be performed in accordance with examples as disclosed herein. In some examples, aspects of the operations of 2610 may be performed by a skip component 1530 as described with reference to FIG. 15.

At 2615, the method may include generating the data message in accordance with the first QCL property based on the indication to skip the monitoring of the second control channel occasion. The operations of 2615 may be performed in accordance with examples as disclosed herein. In some examples, aspects of the operations of 2615 may be performed by a data component 1535 as described with reference to FIG. 15.

At 2620, the method may include transmitting, to the UE, the indication to skip monitoring of the second control channel occasion. The operations of 2620 may be performed in accordance with examples as disclosed herein. In some examples, aspects of the operations of 2620 may be performed by a skip component 1530 as described with reference to FIG. 15.

At 2625, the method may include transmitting, to the UE, the data message in accordance with the second QCL property. The operations of 2625 may be performed in accordance with examples as disclosed herein. In some examples, aspects of the operations of 2625 may be performed by a data component 1535 as described with reference to FIG. 15.

The following provides an overview of aspects of the present disclosure:

Aspect 1: A method for wireless communication at a UE, comprising: receiving a control message in a first control channel occasion associated with a first QCL property, the control message indicating a transmission of a data message during a time period within a threshold time period; receiving an indication to skip monitoring of a second control channel occasion during the time period; and receiving the data message in accordance with a second QCL property based at least in part on the indication to skip the monitoring of the second control channel occasion.

Aspect 2: The method of aspect 1, further comprising: receiving a message that configures the monitoring of the second control channel occasion, the second control channel occasion associated with the second QCL property, wherein the second QCL property is based at least in part on the second control channel occasion being configured for monitoring.

Aspect 3: The method of aspect 1, wherein the second QCL property is the first QCL property based at least in part on skipping the monitoring of the second control channel occasion and monitoring the first control channel occasion.

Aspect 4: The method of aspect 1, wherein the second QCL property corresponds to a third control channel occasion monitored during the time period based at least in part on the second control channel occasion overlapping in a time domain with the data message and skipping the monitoring of the second control channel occasion.

Aspect 5: The method of aspect 4, wherein receiving the indication comprises: receiving the indication in a first carrier different from a second carrier associated with the first control channel occasion and the data message, wherein the second control channel occasion is associated with the first carrier and the third control channel occasion is associated with the second carrier.

Aspect 6: The method of any of aspects 4 through 5, further comprising: refraining from dropping reception of the data message based at least in part on skipping the monitoring of the second control channel occasion.

Aspect 7: The method of any of aspects 1 through 6, further comprising: receiving a second indication of a time offset within the threshold time period, wherein the second QCL property is based at least in part on whether the data message is transmitted before the time offset.

Aspect 8: The method of aspect 7, wherein receiving the data message comprises: receiving the data message before the time offset, wherein the second control channel occasion is associated with the second quasi-colocation property, wherein the second quasi-colocation property is based at least in part on a configuration for the monitoring of the second control channel occasion and the processor and memory being configured to receive the data message before the time offset.

Aspect 9: The method of aspect 7, wherein receiving the data message comprises: receiving the data message after the time offset, wherein the second QCL property is the first QCL property based at least in part on receiving the data message after the time offset and skipping the monitoring of the second control channel occasion.

Aspect 10: The method of aspect 7, wherein receiving the data message comprises: receiving the data message after the time offset, wherein the indication is received in a first carrier different from a second carrier associated with the first control channel occasion and the data message, the second control channel occasion associated with the first carrier, and wherein the second QCL property corresponds to a third control channel occasion associated with the second carrier and monitored during the time period based at least in part on receiving the data message after the time offset and skipping the monitoring of the second control channel occasion.

Aspect 11: The method of any of aspects 7 through 10, further comprising: transmitting a capability message that indicates a duration for the UE to cancel the monitoring of the second control channel occasion after receiving the indication to skip the monitoring of the second control channel occasion, wherein a value of the time offset is based at least in part on the duration.

Aspect 12: The method of any of aspects 7 through 11, wherein a value of the time offset is based at least in part on an SCS associated with the control message, the data message, or both.

Aspect 13: The method of any of aspects 1 through 12, wherein a configuration of a control channel occasion comprises a CORESET for the control channel occasion and a search space set for the control channel occasion, the CORESET corresponding to a QCL property for the control channel occasion.

Aspect 14: A method for wireless communication at a UE, comprising: receiving, in a first control channel occasion, a control message associated with a first QCL property, the control message indicating a transmission of a data message during a time period within a threshold time period; receiving an indication to skip monitoring of a second control channel occasion during the time period, the second control channel occasion overlapping in a time domain with the data message; and dropping reception of the data message based at least in part on the indication to skip the monitoring of the second control channel occasion.

Aspect 15: The method of aspect 14, further comprising: receiving a message that configures the monitoring of the second control channel occasion, wherein dropping reception of the data message is based at least in part on the second control channel occasion being configured for monitoring.

Aspect 16: The method of any of aspects 14 through 15, further comprising: receiving a second indication of a time offset within the threshold time period, wherein dropping reception of the data message is based at least in part on a transmission of the data message before the time offset.

Aspect 17: The method of aspect 16, further comprising: transmitting a capability message that indicates a duration for the UE to cancel the monitoring of the second control channel occasion after receiving the indication to skip the monitoring of the second control channel occasion, wherein a value of the time offset is based at least in part on the duration.

Aspect 18: The method of any of aspects 16 through 17, wherein a value of the time offset is based at least in part on an SCS associated with the control message, the data message, or both.

Aspect 19: A method for wireless communication at a UE, comprising: receiving an indication of a TCI state associated with a first QCL property; receiving a control message indicating a transmission of a data message during a time period within a threshold time period; and receiving the data message in accordance with the first QCL property based at least in part on the indication of the TCI state.

Aspect 20: The method of aspect 19, further comprising: receiving a second control message indicating a transmission of a second data message after the threshold time period; and receiving the second data message in accordance with the first QCL property based at least in part on the indication of the TCI state.

Aspect 21: A method for wireless communication at a base station, comprising: transmitting, in a first control channel occasion associated with a first QCL property, a control message to a UE that indicates a transmission of a data message during a time period within a threshold time period; generating an indication to skip monitoring of a second control channel occasion during the time period; and generating the data message in accordance with a second QCL property based at least in part on the indication to skip the monitoring of the second control channel occasion.

Aspect 22: The method of aspect 21, further comprising: transmitting the indication to skip monitoring of the second control channel occasion to the UE; and transmitting, to the UE, the data message in accordance with the second quasi-colocation property Aspect 23: The method of any of aspects 21 through 22, further comprising: transmitting a message that configures the monitoring of the second control channel occasion, the second control channel occasion associated with the second QCL property, wherein the second QCL property is based at least in part on the second control channel occasion being configured for monitoring.

Aspect 24: The method of aspect 21, wherein the second QCL property is the same as the first QCL property based at least in part on skipping the monitoring of the second control channel occasion and monitoring the first control channel occasion.

Aspect 25: The method of aspect 21, wherein the second QCL property corresponds to a third control channel occasion monitored during the time period based at least in part on the second control channel occasion overlapping in a time domain with the data message and skipping the monitoring of the second control channel occasion.

Aspect 26: The method of aspect 25, wherein transmitting the indication comprises: transmitting the indication in a first carrier different from a second carrier associated with the first control channel occasion and the data message, wherein the second control channel occasion is associated with the first carrier and the third control channel occasion is associated with the second carrier.

Aspect 27: The method of any of aspects 21 through 26, further comprising: transmitting a second indication of a time offset within the threshold time period, wherein the second QCL property is based at least in part on whether the data message is transmitted before the time offset.

Aspect 28: The method of aspect 27, wherein transmitting the data message comprises: transmitting the data message before the time offset, wherein the second control channel occasion is associated with the second quasi-colocation property, wherein the second QCL property is based at least in part on the second control channel occasion being configured for monitoring and transmitting the data message before the time offset.

Aspect 29: The method of aspect 27, wherein transmitting the data message comprises: transmitting the data message after the time offset, wherein the second QCL property is the same as the first QCL property based at least in part on transmitting the data message after the time offset and skipping the monitoring of the second control channel occasion.

Aspect 30: The method of aspect 27, wherein transmitting the data message comprises: transmitting the data message after the time offset, wherein transmitting the indication comprises: transmitting the indication in a first carrier different from a second carrier associated with the first control channel occasion and the data message, the second control channel occasion associated with the first carrier, wherein the second QCL property corresponds to a third control channel occasion associated with the second carrier and monitored during the time period based at least in part on transmitting the data message after the time offset and skipping the monitoring of the second control channel occasion.

Aspect 31: The method of any of aspects 27 through 30, further comprising: receiving a capability message that indicates a duration for the UE to cancel the monitoring of the second control channel occasion after receiving the indication to skip the monitoring of the second control channel occasion, wherein a value of the time offset is based at least in part on the duration.

Aspect 32: The method of any of aspects 27 through 31, wherein a value of the time offset is based at least in part on an SCS associated with the control message, the data message, or both.

Aspect 33: The method of any of aspects 21 through 32, wherein a configuration of a control channel occasion comprises a CORESET for the control channel occasion and a search space set for the control channel occasion, the CORESET corresponding to a QCL property for the control channel occasion.

Aspect 34: An apparatus for wireless communication at a UE, comprising a processor; memory coupled with the processor; and instructions stored in the memory and executable by the processor to cause the apparatus to perform a method of any of aspects 1 through 13.

Aspect 35: An apparatus for wireless communication at a UE, comprising at least one means for performing a method of any of aspects 1 through 13.

Aspect 36: A non-transitory computer-readable medium storing code for wireless communication at a UE, the code comprising instructions executable by a processor to perform a method of any of aspects 1 through 13.

Aspect 37: An apparatus for wireless communication at a UE, comprising a processor; memory coupled with the processor; and instructions stored in the memory and executable by the processor to cause the apparatus to perform a method of any of aspects 14 through 18.

Aspect 38: An apparatus for wireless communication at a UE, comprising at least one means for performing a method of any of aspects 14 through 18.

Aspect 39: A non-transitory computer-readable medium storing code for wireless communication at a UE, the code comprising instructions executable by a processor to perform a method of any of aspects 14 through 18.

Aspect 40: An apparatus for wireless communication at a UE, comprising a processor; memory coupled with the processor; and instructions stored in the memory and executable by the processor to cause the apparatus to perform a method of any of aspects 19 through 20.

Aspect 41: An apparatus for wireless communication at a UE, comprising at least one means for performing a method of any of aspects 19 through 20.

Aspect 42: A non-transitory computer-readable medium storing code for wireless communication at a UE, the code comprising instructions executable by a processor to perform a method of any of aspects 19 through 20.

Aspect 43: An apparatus for wireless communication at a base station, comprising a processor; memory coupled with the processor; and instructions stored in the memory and executable by the processor to cause the apparatus to perform a method of any of aspects 21 through 33.

Aspect 44: An apparatus for wireless communication at a base station, comprising at least one means for performing a method of any of aspects 21 through 33.

Aspect 45: A non-transitory computer-readable medium storing code for wireless communication at a base station, the code comprising instructions executable by a processor to perform a method of any of aspects 21 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive a control message in a first control channel occasion associated with a first quasi-colocation property, the control message indicating a transmission of a data message during a time period within a threshold time period;
receive an indication to skip monitoring of a second control channel occasion during the time period; and
receive the data message in accordance with a second quasi-colocation property based at least in part on the indication to skip the monitoring of the second control channel occasion.

2. The UE of claim 1, wherein the one or more processors are individually or collectively further operable to execute the code to cause the UE to:
receive a message that configures the monitoring of the second control channel occasion, the second control channel occasion associated with the second quasi-colocation property,
wherein the second quasi-colocation property is based at least in part on a configuration for the monitoring of the second control channel occasion.

3. The UE of claim 1, wherein the second quasi-colocation property is the first quasi-colocation property based at least in part on the one or more processors being individually or collectively operable to cause execute the code to cause the UE to skip the monitoring of the second control channel occasion and monitor the first control channel occasion.

4. The UE of claim 1, wherein the second quasi-colocation property corresponds to a third control channel occasion monitored during the time period based at least in part on an overlap in a time domain of the second control channel occasion and the data message and the one or more processors being individually or collectively operable to cause execute the code to cause the UE to skip the monitoring of the second control channel occasion.

5. The UE of claim 4, wherein, to receive the indication, the one or more processors are individually or collectively operable to execute the code to cause the UE to:
receive the indication in a first carrier different from a second carrier associated with the first control channel occasion and the data message,
wherein the second control channel occasion is associated with the first carrier and the third control channel occasion is associated with the second carrier.

6. The UE of claim 4, wherein the one or more processors are individually or collectively further operable to execute the code to cause the UE to:
refrain from dropping reception of the data message based at least in part on the one or more processors being individually or collectively operable to cause execute the code to cause the UE to skip the monitoring of the second control channel occasion.

7. The UE of claim 1, wherein the one or more processors are individually or collectively further operable to execute the code to cause the UE to:
receive a second indication of a time offset within the threshold time period, wherein the second quasi-colocation property is based at least in part on whether the data message is received before the time offset.

8. The UE of claim 7, wherein, to receive the data message, the one or more processors are individually or collectively operable to execute the code to cause the UE to:
receive the data message before the time offset, wherein the second control channel occasion is associated with the second quasi-colocation property, wherein the second quasi-colocation property is based at least in part on a configuration for the monitoring of the second control channel occasion and the one or more processors being individually or collectively operable to cause execute the code to cause the UE to receive the data message before the time offset.

9. The UE of claim 7, wherein, to receive the data message, the one or more processors are individually or collectively operable to execute the code to cause the UE to:
receive the data message after the time offset, wherein the second quasi-colocation property is the first quasi-colocation property based at least in part on the one or more processors being individually or collectively operable to cause execute the code to cause the UE to receive the data message after the time offset and skip the monitoring of the second control channel occasion.

10. The UE of claim 7, wherein, to receive the data message, the one or more processors are individually or collectively operable to execute the code to cause the UE to:
receive the data message after the time offset, wherein the indication is received in a first carrier different from a second carrier associated with the first control channel occasion and the data message, the second control channel occasion associated with the first carrier, and wherein the second quasi-colocation property corresponds to a third control channel occasion associated with the second carrier and monitored during the time period based at least in part on the one or more processors being individually or collectively operable to cause execute the code to cause the UE to receive the data message after the time offset and skip the monitoring of the second control channel occasion.

11. The UE of claim 7, wherein the one or more processors are individually or collectively further operable to execute the code to cause the UE to:
transmit a capability message that indicates a duration for the UE to cancel the monitoring of the second control channel occasion after a reception of the indication to skip the monitoring of the second control channel occasion, wherein a value of the time offset is based at least in part on the duration.

12. The UE of claim 7, wherein a value of the time offset is based at least in part on a subcarrier spacing associated with the control message, the data message, or both.

13. The UE of claim 1, wherein a configuration of a control channel occasion comprises a control resource set for the control channel occasion and a search space set for the control channel occasion, the control resource set corresponding to a quasi-colocation property for the control channel occasion.

14. A user equipment (UE), comprising:
one or more memories storing processor-executable code; and
one or more processors coupled with the one or more memories and individually or collectively operable to execute the code to cause the UE to:
receive, in a first control channel occasion, a control message associated with a first quasi-colocation property, the control message indicating a transmission of a data message during a time period within a threshold time period;
receive an indication to skip monitoring of a second control channel occasion during the time period, the second control channel occasion overlapping in a time domain with the data message; and
drop reception of the data message based at least in part on the indication to skip the monitoring of the second control channel occasion.

15. The UE of claim 14, wherein the one or more processors are individually or collectively further operable to execute the code to cause the UE to:
receive a message that configures the monitoring of the second control channel occasion,
wherein the one or more processors are individually or collectively operable to execute the code to cause the UE to drop reception of the data message based at least in part on a configuration for monitoring the second control channel occasion.

16. The UE of claim 14, wherein the one or more processors are individually or collectively further operable to execute the code to cause the UE to:
receive a second indication of a time offset within the threshold time period, wherein the one or more processors are individually or collectively operable to execute the code to cause the UE to drop reception of the data message based at least in part on a transmission of the data message before the time offset.

17. The UE of claim 16, wherein the one or more processors are individually or collectively further operable to execute the code to cause the UE to:
transmit a capability message that indicates a duration for the UE to cancel the monitoring of the second control channel occasion after a reception of the indication to skip the monitoring of the second control channel occasion,
wherein a value of the time offset is based at least in part on the duration.

18. The UE of claim 16, wherein a value of the time offset is based at least in part on a subcarrier spacing associated with the control message, the data message, or both.

19. A user equipment (UE), comprising:
one or more memories storing processor-executable code; and
one or more processors coupled with the one or more memories and individually or collectively operable to execute the code to cause the UE to:
receive an indication of a transmission configuration indicator state associated with a first quasi-colocation property;
receive a first control message indicating a transmission of a first data message during a time period within a first threshold time period;
receive the first data message in accordance with the first quasi-colocation property based at least in part on the indication of the transmission configuration indicator state;
receive a second control message indicating a transmission of a second data message after a second threshold time period; and
receive the second data message in accordance with the first quasi-colocation property based at least in part on the indication of the transmission configuration indicator state.

20. A network device, comprising:
one or more memories storing processor-executable code; and
one or more processors coupled with the one or more memories and individually or collectively operable to execute the code to cause the network device to:
transmit, in a first control channel occasion associated with a first quasi-colocation property, a control message to a user equipment (UE) that indicates a transmission of a data message during a time period within a threshold time period;
generate an indication to skip monitoring of a second control channel occasion during the time period; and
generate the data message in accordance with a second quasi-colocation property based at least in part on the indication to skip the monitoring of the second control channel occasion.

21. The network device of claim 20, wherein the one or more processors are individually or collectively further operable to execute the code to cause the network device to:
transmit a message that configures the monitoring of the second control channel occasion, the second control channel occasion associated with the second quasi-colocation property,
wherein the second quasi-colocation property is based at least in part on a configuration for the monitoring of the second control channel occasion.

22. The network device of claim 21, wherein the second quasi-colocation property corresponds to a third control channel occasion monitored during the time period based at least in part on an overlap in a time domain of the second control channel occasion and the data message and the one or more processors being individually or collectively operable to cause execute the code to cause the network device to skip the monitoring of the second control channel occasion.

23. The network device of claim 22, wherein, to transmit the indication, the one or more processors are individually or collectively operable to execute the code to cause the network device to:
transmit the indication in a first carrier different from a second carrier associated with the first control channel occasion and the data message,
wherein the second control channel occasion is associated with the first carrier and the third control channel occasion is associated with the second carrier.

24. The network device of claim 21, wherein the one or more processors are individually or collectively further operable to execute the code to cause the network device to:
  transmit a second indication of a time offset within the threshold time period, wherein the second quasi-colocation property is based at least in part on whether the data message is transmitted before the time offset.

25. The network device of claim 24, wherein, to transmit the data message, the one or more processors are individually or collectively operable to execute the code to cause the network device to:
  transmit the data message before the time offset, wherein the second control channel occasion is associated with the second quasi-colocation property, wherein the second quasi-colocation property is based at least in part on a configuration for the monitoring of the second control channel occasion and the one or more processors being individually or collectively operable to cause execute the code to cause the network device to transmit the data message before the time offset.

26. The network device of claim 24, wherein, to transmit the data message, the one or more processors are individually or collectively operable to execute the code to cause the network device to:
  transmit the data message after the time offset, wherein the second quasi-colocation property is the same as the first quasi-colocation property based at least in part on the one or more processors being individually or collectively operable to cause execute the code to cause the network device to transmit the data message after the time offset and skip the monitoring of the second control channel occasion.

27. The network device of claim 24, wherein the one or more processors are individually or collectively further operable to execute the code to cause the network device to:
  receive a capability message that indicates a duration for the UE to cancel the monitoring of the second control channel occasion after a reception of the indication to skip the monitoring of the second control channel occasion, wherein a value of the time offset is based at least in part on the duration.

28. The network device of claim 20, wherein the second quasi-colocation property is the same as the first quasi-colocation property based at least in part on the one or more processors being individually or collectively operable to cause execute the code to cause the network device to skip the monitoring of the second control channel occasion and monitor the first control channel occasion.

29. The network device of claim 20, wherein the one or more processors are individually or collectively further operable to execute the code to cause the network device to:
  transmit the indication to skip monitoring of the second control channel occasion to the UE; and
  transmit, to the UE, the data message in accordance with the second quasi-colocation property.

* * * * *